(12) United States Patent
Ukita et al.

(10) Patent No.: US 9,866,024 B2
(45) Date of Patent: Jan. 9, 2018

(54) ELECTRIC POWER CONTROLLER, ELECTRIC POWER MANAGEMENT DEVICE, ELECTRIC POWER CONTROL METHOD, AND ELECTRIC POWER MANAGEMENT SYSTEM FOR TRADING AND DISTRIBUTING ELECTRIC POWER

(75) Inventors: Masakazu Ukita, Kanagawa (JP); Asami Yoshida, Kanagawa (JP); Shiho Moriai, Kanagawa (JP); Masanobu Katagi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 867 days.

(21) Appl. No.: 13/540,870

(22) Filed: Jul. 3, 2012

(65) Prior Publication Data
US 2013/0015708 A1 Jan. 17, 2013

(30) Foreign Application Priority Data
Jul. 15, 2011 (JP) ................................ 2011-156540

(51) Int. Cl.
*H02J 3/32* (2006.01)
*H02J 3/38* (2006.01)

(52) U.S. Cl.
CPC ................ *H02J 3/32* (2013.01); *H02J 3/383* (2013.01); *H02J 3/386* (2013.01); *H02J 3/382* (2013.01); *Y02E 10/563* (2013.01); *Y02E 10/566* (2013.01); *Y02E 10/763* (2013.01); *Y02E 70/30* (2013.01); *Y10T 307/50* (2015.04)

(58) Field of Classification Search
CPC ................................ G06F 1/26; G05B 15/02
See application file for complete search history.

(56) References Cited

U.S. PATENT DOCUMENTS

| 2008/0167756 | A1* | 7/2008 | Golden et al. ................. 700/297 |
| 2010/0306027 | A1* | 12/2010 | Haugh ............................ 705/10 |
| 2011/0153098 | A1* | 6/2011 | Tomita .................... H02J 3/008 700/287 |
| 2011/0299547 | A1* | 12/2011 | Diab ....................... G06Q 20/10 370/401 |

FOREIGN PATENT DOCUMENTS

JP 2002-233053 8/2002

\* cited by examiner

*Primary Examiner* — Jeffrey Shin
(74) *Attorney, Agent, or Firm* — Chip Law Group

(57) ABSTRACT

An energy control device, an energy management device, an energy control method, and an energy management system are provided. The energy management system includes the energy management device and the energy control device. The energy management device includes an electric power management unit configured to generate an instruction specifying a supply destination for electric power generated by an electric power generator, and includes a communication unit configured to transmit the instruction to the energy control device. The energy control device includes a power conditioner configured to distribute the electric power to the supply destination based on the instruction, and includes a control unit configured to control an operation of the power conditioner.

23 Claims, 32 Drawing Sheets

ELECTRIC POWER CONTROLLER, ELECTRIC POWER MANAGEMENT DEVICE, ELECTRIC POWER CONTROL METHOD, AND ELECTRIC POWER MANAGEMENT SYSTEM FOR TRADING AND DISTRIBUTING ELECTRIC POWER

CROSS REFERENCES TO RELATED APPLICATIONS

The present application claims priority to Japanese Priority Patent Application JP 2011-156540 filed in the Japan Patent Office on Jul. 15, 2011, the entire content of which is hereby incorporated by reference.

BACKGROUND

This application relates to an electric power controller, an electric power management device, an electric power control method, and an electric power management system.

Currently, the introduction of electric storage equipment has been promoted in companies, standard homes, and the like, the electric storage equipment including a storage battery capable of subjecting electric power to charging and discharging and being capable of storing electric power obtained owing to electric power generation equipment utilizing natural energy or electric power purchased from an electric power company.

Currently, the electric power company purchases electric power exceeding electric power consumed by the holder of the electric power generation equipment and electric storage equipment, from among the electric power stored in the electric storage equipment. However, in the future when the electric power generation equipment and the electric storage equipment will further prevail, the electric power will be traded in an electricity trading market with the development of electricity deregulation. Therefore, it may be considered that the number of persons participating in the electricity trading will increase. If it is highly likely to obtain a profit owing to participating in an electric power market, it may be considered that the number of persons intending to introduce the electric power generation equipment and the electric storage equipment and participate in the electric power market will increase.

Therefore, there has been proposed an electric storage system where the fluctuation of an electric power price is predicted in accordance with an algorithm, electric power is purchased to be stored in an electric storage equipment when a low price is predicted, and electric power stored in the electric storage equipment is sold so as to obtain a profit when a high price is predicted. An example of such an electric storage system has been disclosed in Japanese Unexamined Patent Application Publication No. 2002-233053.

SUMMARY

In the electric storage system described in Japanese Unexamined Patent Application Publication No. 2002-233053, since electric power selling is performed when the price of the electric power is predicted to be high, a person utilizing the electric storage system may expect a profit. Accordingly, not only companies but also standard homes may be provided with incentives to introduce the electric power generation equipment and the electric storage equipment.

However, there are many participants having various intentions in the electric power market, and hence it may be difficult for even a good prediction algorithm to exclude a possibility that erroneous prediction occurs. Accordingly, a loss may be likely to occur in a person holding the electric storage equipment and participating in the electricity trading.

This is because the electric storage system in Japanese Unexamined Patent Application Publication No. 2002-233053 originally intends to obtain a profit owing to an electric power price fluctuation and a price fluctuation risk may be the main premise of this system. Therefore, it may be difficult to avoid the price fluctuation risk. Namely, in the electric storage system described in Japanese Unexamined Patent Application Publication No. 2002-233053, while a profit is expected owing to the existence of the price fluctuation, it may be considered that a person avoiding the price fluctuation with regarding the price fluctuation itself as a high risk does not introduce the electric power generation equipment and the electric storage equipment.

In addition, since the electric power generation amount of natural energy electric power generation is inherently determined on the basis of natural conditions, it is difficult to generate electric power in a systematic manner so as to be adjusted to time-varying electric power demand in the same way as thermal electric power generation, hydroelectric power generation, or nuclear electric power generation, and the electric power generation amount thereof becomes unstable depending on the natural conditions. When, from among a total electric power generation amount or an electric power amount traded in the electricity trading market, an amount based on the natural energy electric power generation increases, it may be expected that, owing to the above-mentioned instability of an electric power generation amount, the fluctuation of the trading electric power price thereof becomes large. For example, if weather forecast is off the mark and solar irradiation is reduced, an electric power generation amount due to solar photovoltaic power generation is reduced beyond expectation. Therefore, electric power to be offered for sale on the electricity trading market is reduced, and an electric power price becomes high. On the other hand, if the solar irradiation increases beyond expectation, the electric power to be offered for sale increases, and the electric power price becomes cheap.

When the fluctuation of the electric power price is large, since the holder of the electric power generation equipment and the electric storage equipment may be likely to suffer a loss owing to the electricity trading, the holder hesitates to introduce the electric power generation equipment and the electric storage equipment and participate in the electricity trading. Accordingly, the prevalence of the electric power generation equipment and the electric storage equipment is interrupted. Therefore, so as to promote the prevalence of the electric power generation equipment and the electric storage equipment, it is desirable to implement programs for suppressing a risk due to the electric power price fluctuation in such an electric power market.

Accordingly, an embodiment of the present application provides an electric power controller, an electric power management device, an electric power control method, and an electric power management system, which are capable of avoiding a person utilizing the electric storage equipment and the electric power generation equipment from suffering the price fluctuation risk in the electric power market.

A first technology according to an embodiment of the present disclosure provides an energy control device including a power conditioner configured to distribute electric power generated by an electric power generator to a supply destination, and a control unit configured to control an operation of the power conditioner.

In addition, a second technology according to an embodiment of the present disclosure provides an energy management device including an electric power management unit configured to generate an instruction specifying a supply destination for electric power generated by an electric power generator, and a communication unit configured to transmit the instruction to an energy control device that at least controls supplying the electric power to the supply destination.

In addition, a third technology according to an embodiment of the present disclosure provides an energy control method including receiving an instruction from an electric power management device, the instruction specifying a supply destination of electric power generated by an electric power generator, and distributing the electric power to the supply destination based on the instruction.

Furthermore, a fourth technology according to an embodiment of the present disclosure provides an energy management system including an energy management device and an energy control device. The energy management device includes an electric power management unit configured to generate an instruction specifying a supply destination for electric power generated by an electric power generator, and a communication unit configured to transmit the instruction to an energy control device. The energy control device includes a power conditioner configured to distribute the electric power to the supply destination based on the instruction, and a control unit configured to control an operation of the power conditioner.

According to an embodiment of the present application, it may be possible to avoid the holder of electric power generation equipment and electric storage equipment from suffering a price fluctuation risk in an electric power market. Accordingly, it may be possible to promote the introduction of the electric power generation equipment and the electric storage equipment in the whole society.

Additional features and advantages are described herein, and will be apparent from the following Detailed Description and the figures.

DETAILED DESCRIPTION

Hereinafter, embodiments of the present application will be described with reference to drawings. In this regard, however, the embodiments of the present application are not only limited to the following embodiments. In addition, the description will be performed in the following order.

<1. Embodiment>
[1-1. Configuration of Electric Power Management system]
[1-2. Configurations of Electric Power Controller, Electric Storage Equipment, and Electric Power Generation Equipment]
[1-3. Configurations of Electric Power/Point Management Server and Point Exchange Server]
[1-4. Processing in Electric Power/Point Management Server: Electric Power Management Processing]
[1-5. Processing in Electric Power Controller: Processing for Obtaining Magnitude Relationship between Electric Power Selling Price, Electric Power Purchasing Price, and Charging Profit Price]
[1-6. Processing in Electric Power Controller: Processing Performed when Charging Instruction Is Received]
[1-7. Processing in Electric Power Controller: Processing Performed when Electric Power Selling Instruction Is Received]
[1-8. Processing in Electric Power Controller: Processing Performed when Autonomous Operation Instruction Is Received]
[1-9. Processing in Electric Power/Point Management Server: Point Issuing Processing]
{1-9-1. Point Issuing Processing Performed when Generated Electric Power Is not Allocated to Electric Power Selling}
{1-9-2. Point Issuing Processing Performed when Generated Electric Power Is Allocated to Electric Power Selling}
[1-10. Electric Power Control Processing Performed when it is Possible for Electric Power Controller Side to Determine Intended Use of Electric Power]
<2. Advantageous Effect Obtained Owing to Embodiment of Present Application>
<3. Example of Modification>

1. Embodiment

[1-1. Configuration of Electric Power Management System]

Figure 1:
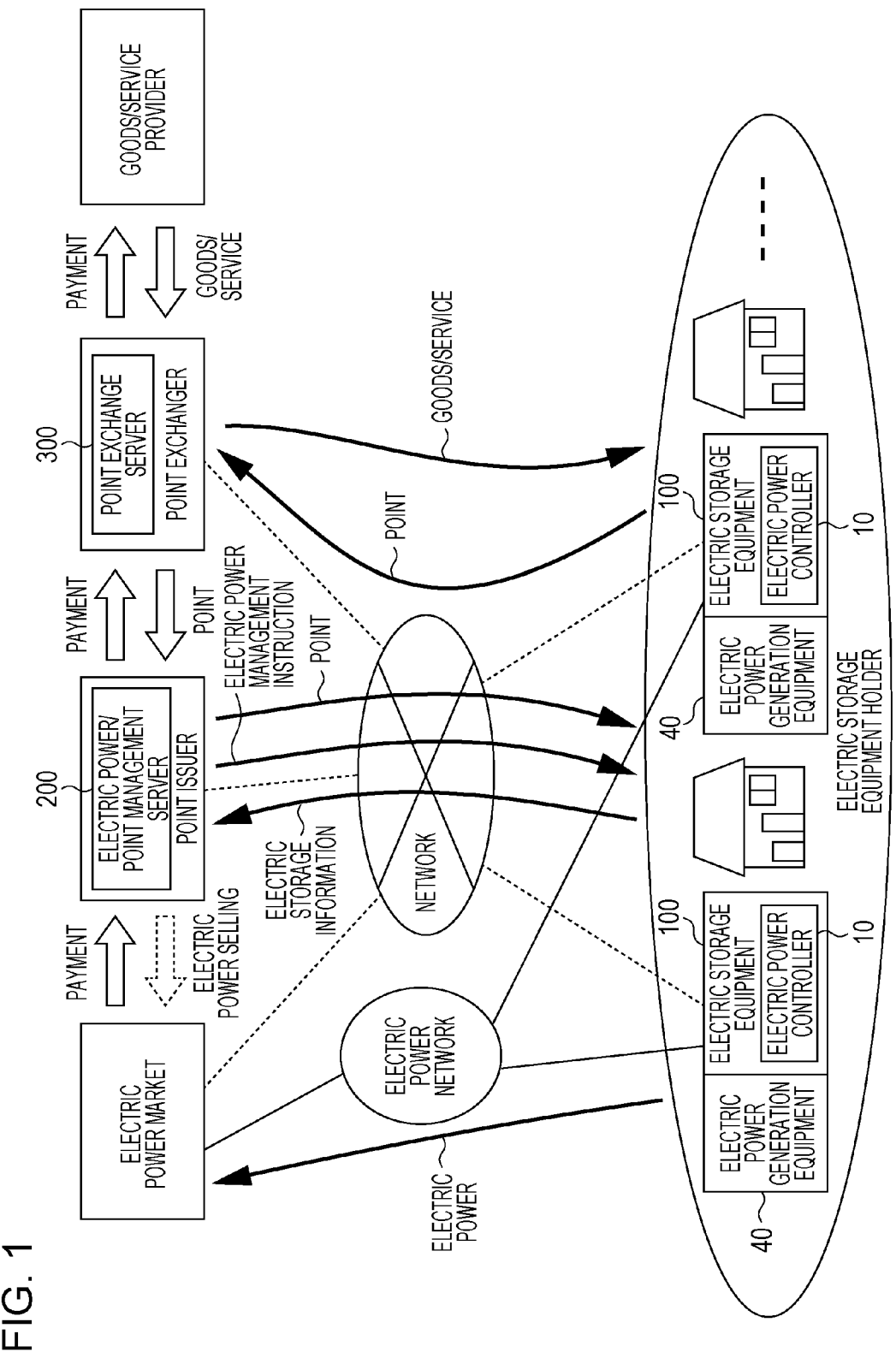
FIG. 1 is a diagram illustrating a whole configuration of an electric power management system.

FIG. 1 is a diagram illustrating the whole configuration of an electric power management system according to an embodiment of the present application. The electric power management system includes an electric power controller 10, which is connected to electric power generation equipment 40 and configures an electric storage equipment 100, and an electric power/point management server 200 issuing a point on the basis of an instruction for an electric power supply destination in the electric storage equipment 100 and an electric storage amount in the electric storage equipment 100. The electric power/point management server 200 corresponds to an electric power management device in the claims.

The electric power management system according to an embodiment of the present application obtains a profit by selling, on an electric power market, electric power obtained owing to electric power generation in the electric power generation equipment 40. In addition, the electric power management system according to an embodiment of the present application obtains an economic benefit by charging the electric storage equipment 100 with generated electric power due to the electric power generation equipment 40 and selling the electric power on the electric power market or allocating the electric power to personal consumption. In addition, in addition to electric power generation due to the electric power generation equipment 40, electric storage may be performed by purchasing electric power from the electric power market when an electric power price in the electric power market is relatively low, for example, during nighttime, and the electric power may be sold on the electric power market when the electric power price is high, thereby obtaining a profit.

A person desiring to perform electric power selling and a person desiring to perform electric power purchasing carry out electricity trading, thereby forming a market. The electric power market is such a market. While, in the past, a general electricity company has exclusively supplied electric power with respect to each area, in recent years, movements toward relaxing regulations have become active so as to freely sell and purchase electric power in addition to existing electric power companies.

The electric storage equipment 100 includes a storage battery module used for storing therein electric power, and is equipment capable of performing charging and discharging and used for electric storage. The electric storage equipment 100 is set up in private houses, collective housings such as an apartment building and the like, companies, buildings of various organizations, facilities, and the like. The electric storage equipment 100 includes the electric power controller 10 performing electric power control such as charge and discharge in a storage battery module or the like. The electric storage equipment 100 is connected to an electric power network, and performs charging due to electric power from the electric power network and discharging to the electric power network, in accordance with management due to the electric power/point management server 200. The details of the electric storage equipment 100 and the electric power controller 10 will be described later. In addition, in the following description, a person holding the electric storage equipment 100 is referred to as an electric storage equipment holder regardless of kinds such as a company, a standard home, and the like.

The electric power/point management server 200 is connected to the electric power controller 10 in the electric storage equipment 100 through a network, and issues a point in response to the electric storage amount of the electric storage equipment 100, with respect to each electric storage equipment holder. In addition, the electric power/point management server 200 is connected to the electric power market through the network, acquires an electric power price in the electric power market, and also issues an electric power supplying instruction to the electric power controller 10 to perform charging or discharging, on the basis of the electric power price. Charging the electric storage equipment 100 is performed using electric power obtained by the electric power generation equipment 40, and electric power selling on the electric power market is performed owing to discharging from the electric storage equipment 100. In addition, under the control of the electric power/point management server 200, charging may be performed owing to electric power purchasing on the electric power market.

The electric power/point management server 200 is set up in buildings, facilities, and the like of a company, a business operator, and the like (hereinafter, referred to as point issuers) that provide the electric storage equipment holder with point service. While the electric power is stored in the electric storage equipment 100 held by the electric storage equipment holder, electric power selling or electric power purchasing due to discharging or charging in the electric storage equipment is performed under the control of the electric power/point management server 200. Accordingly, the point issuer plays the role of electricity trading in the electric power market. The point issuer sells, on the electric power market, electric power from the electric power generation equipment 40 and electric power with which the electric storage equipment 100 is charged, and hence the point issuer acquires a payment according to the electric power price in the electric power market, thereby obtaining a profit. It is desirable that the electric power/point management server 200 brings a plurality of pieces of electric storage equipment under the control thereof.

Since selling and purchasing of electric power are performed under the control of the electric power/point management server 200, it may be possible for the electric storage equipment holder to participate in the electric power market without paying attention to the electric power price in the electric power market. A point is given from the electric power/point management server 200 in response to an electric storage amount in the electric storage equipment 100. As described later, since this point is exchangeable for goods/service, it may be possible for the electric storage equipment holder to obtain a profit. Accordingly, in an embodiment of the present application, the point acts in response to the electric storage amount as if the point is a currency.

In addition, an individual contract may be concluded between the electric storage equipment holder and the point issuer. For example, the individual contract may relate to whether or not it is possible for electric power obtained owing to the electric power generation equipment 40 or electric power with which the storage battery module is charged to be used as electric power used by the electric storage equipment holder for causing the electric equipment of the self to operate (hereinafter, referred to as personal consumption), whether or not it is possible to freely perform electric power selling on the basis of the intention of the electric storage equipment holder, or whether or not it is possible to store electric power in the storage battery module using midnight electric power whose price is low, or the like.

In addition, it is desirable that, in a case where electric power is subjected to personal consumption owing to the instruction of the electric storage equipment holder or electric power selling is performed owing to the intention of the electric storage equipment holder, when the electric power/point management server 200 has issued an instruction to perform charging, discharging, or the like, which instruction is prioritized may be also defined by a contract. In addition, it is desirable that whether or not it is possible for the electric storage equipment holder to perform charging or discharging on the basis of the intention thereof when the electric power/point management server 200 has issued an instruction to perform the autonomous operation of the electric storage equipment 100 may also be defined by a contract.

In addition, for example, the point issuer presents a plurality of contents of contract to the electric storage equipment holder, the electric storage equipment holder selects one of the plural contents, and hence such an individual contract between the electric storage equipment holder and the point issuer may be concluded.

While the electric power management system is configured as described above, it is desirable that, so as to utilize a point given to the electric storage equipment holder in the electric power management system, a point exchanger and a goods/service provider exist.

The point exchanger is a person that establishes an exchange office, in which a point held by the electric storage equipment holder and goods/service provided by the goods/service provider are exchanged for each other, and exchanges the point and goods/service for each other according to the request of the electric storage equipment holder. The exchange office may have the form of an actual shop, a commerce facility, or the like, and may also have a form in which goods/service is provided owing to electronic information exchange such as an electronic commerce server.

The point exchanger obtains a payment from the point issuer by transferring, to the point issuer, a point held owing to exchanging goods/service for the point. Accordingly, it may be possible for the point exchanger to obtain a profit. An exchange rate between the point and the payment may be preliminarily defined between the point issuer and the point exchanger. In addition, the point issuer and the point exchanger may also be a same person. In that case, exchanging the point and the payment for each other may not be performed.

The goods/service provider provides the point exchanger with the goods/service. When the point exchanger has exchanged the point held by the electric storage equipment holder for the goods/service, the goods/service provider receives, from the point exchanger, the payment corresponding to the exchanged point. Accordingly, it may be possible for the goods/service provider to obtain a profit.

The goods/service physically or mentally provides some kind of utility or satisfaction. In addition, from among the utility and the satisfaction, something tangible corresponds to the goods, and something intangible where no goods remains after selling or purchasing corresponds to the service.

As the goods, for example, an article, a premium ticket, or the like may be cited. More specifically, as the article, for example, convenience goods, a home electrical appliance, an electronic device, food, or the like may be cited. As the premium ticket, a gift coupon, a beer coupon, a travel coupon, a book coupon, an airline ticket, an event invitation ticket, or the like may be cited. As the service, leisure service, medical service, hospitality service, educational service, transportation service, eating-out service, consulting service, or the like may be cited. In addition, the point may also be exchanged for the point of another point service such as mileage or the like. The goods/service is not limited to the above-mentioned items, and any kind of goods/service may also be adopted if the kind of goods/service is to be the target of economic transaction.

The number of points desirable for being exchanged for various kinds of goods/service provided by the goods/service provider may be determined by the goods/service provider on the basis of an exchange rate between the point and the payment, defined between the point issuer and the point exchanger. In addition, the goods/service provider may also be the same person as the point exchanger. In addition, the goods/service provider, the point issuer, and the point exchanger may also be a same person.

In addition, in the above-mentioned description of the point exchanger, it has been described that the goods/service is provided to the electric storage equipment holder through the point exchanger. In this regard, however, a method for providing the goods/service is not limited to this example. For example, when the goods/service provider actually owns and manages a shop, a commerce facility, or the like, the electric storage equipment holder may visit the shop or the like, and the goods/service on sale at the shop or the like and the point may also be exchanged for each other between the electric storage equipment holder and the goods/service provider. In addition, the goods/service provider may transfer the point obtained owing to that exchange to the point issuer and receive a payment corresponding to the number of points.

When the exchange office of the goods/service is an electronic commerce server, the goods/service provider may also directly provide the goods/service to the electric storage equipment holder. For example, when the goods are contents available through a network, such as a moving image, music, an electronic book, and the like, the goods/service provider may also directly provide these to the electric storage equipment holder through the network.

[1-2. Configurations of Electric Power Controller, Electric Storage Equipment, and Electric Power Generation Equipment]

Figure 2:
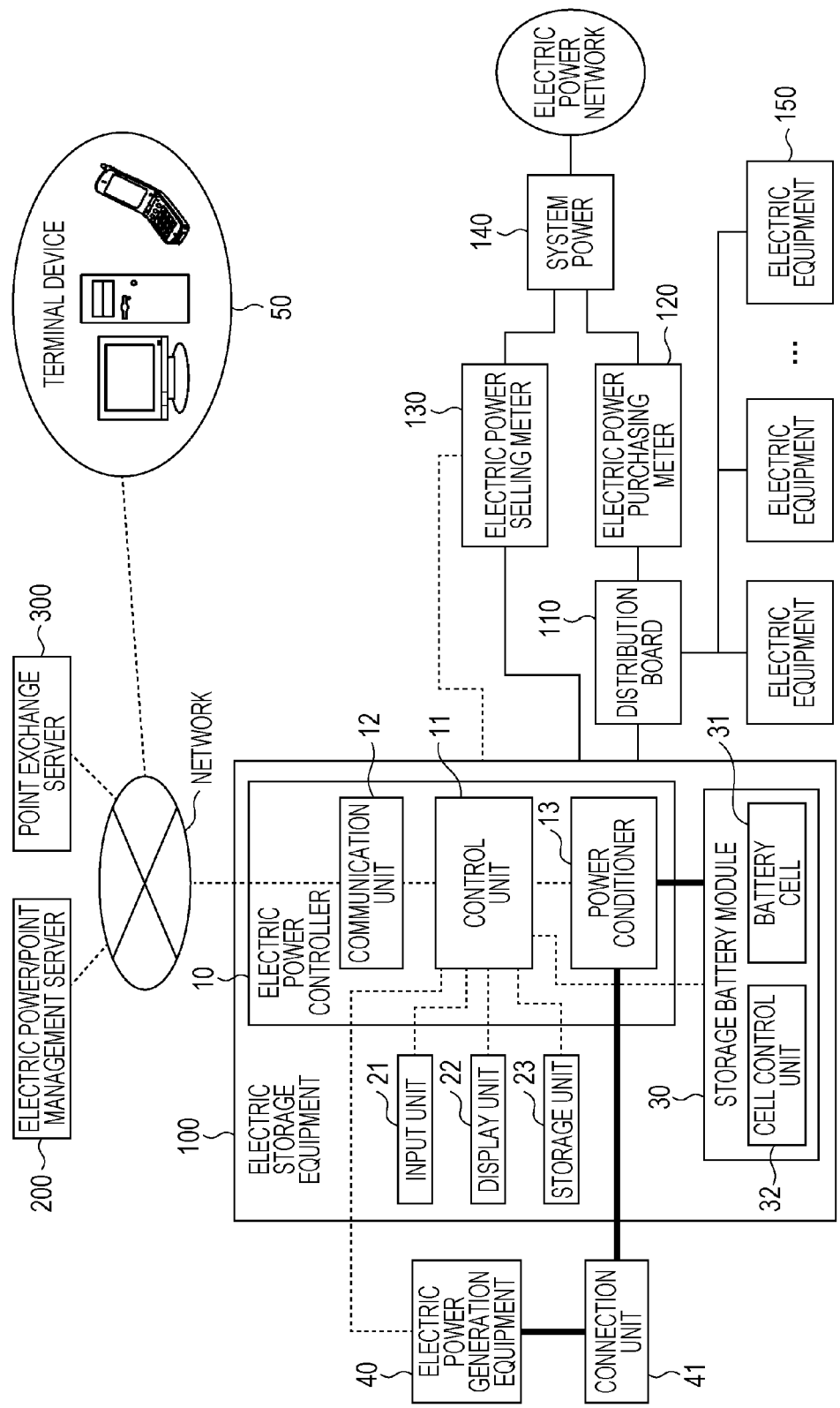
FIG. 2 is a block diagram illustrating configurations of electric storage equipment including an electric power controller and electric power generation equipment.

Next, the configurations of the electric power controller 10, the electric storage equipment 100, and the electric power generation equipment 40 will be described. FIG. 2 is a block diagram illustrating the configurations of the electric power controller 10, the electric storage equipment 100, and the electric power generation equipment 40. In addition, in FIG. 2, from among lines connecting individual blocks, a thick line indicates a DC electric power line, a thin line indicates an AC electric power line, and a dashed line indicates the transmission line of a control signal or an information signal.

The electric storage equipment 100 includes the electric power controller 10 and a storage battery module 30. The storage battery module 30 includes a battery cell 31 storing therein electric power and a cell control unit 32 performing management control of the battery cell 31. An electric battery included in the battery cell 31 may be any kind of electric battery capable of performing charging and discharging, such as a lithium-ion secondary battery, a lithium-ion polymer secondary battery, a nickel-metal hydride battery, or the like. In addition, while, in FIG. 2, the battery cell 31 is indicated as one block, the number of the battery cells 31 is not limited to one, and the plural battery cells 31 may also be used. For example, the cell control unit 32 includes a central processing unit (CPU), a random access memory (RAM), and a read only memory (ROM), a sensor managing the state of the battery cell 31 (a temperature, a charge amount, and the like). The cell control unit 32 manages the battery cell 31, and transmits, to a control unit 11 in the electric power controller 10, information indicating the state of the battery cell 31.

The electric power controller 10 includes the control unit 11, a communication unit 12, and a power conditioner 13. The electric power controller 10 performs electric power control of charging and discharging in the electric storage equipment 100 in accordance with management due to the electric power/point management server 200 provided on a point issuer side.

The control unit 11 is connected to the communication unit 12 and the power conditioner 13. For example, the control unit 11 includes a CPU, a RAM, a ROM, and the like. A program to be read by the CPU is stored in the ROM. The RAM is used as the working memory of the CPU. The CPU executes various processing operations on the basis of the program stored in the ROM, thereby controlling the whole electric power controller 10. Furthermore, the control unit 11 transmits a control signal in response to a command (hereinafter, referred to as a charging command) instructing to perform charging, a command (hereinafter, referred to as a discharging command) instructing to perform discharging, or a command (hereinafter, referred to as an autonomous operation command) instructing to autonomously operate on an electric power controller 10 side, these commands being received from the electric power/point management server 200 by the communication unit 12, and also controls mode switching in the power conditioner 13.

In addition, the control unit 11 is connected to the electric power generation equipment 40, and performs the acquisition of an electric power generation amount in the electric power generation equipment 40, the confirmation of the operating condition of the electric power generation equipment 40, and the like by establishing communication with the electric power generation equipment 40.

For example, the communication unit 12 is a network interface used for establishing communication with the electric power/point management server 200 on the point issuer side on the basis of a predetermined protocol through a network such as Internet, a dedicated line, or the like. A communication method may be any method such as wire communication, a wireless local area network (LAN), Wireless Fidelity (Wi-Fi), communication utilizing a 3G line, or the like. The electric power controller 10 receives the charging command, the discharging command, and the autonomous operation command, transmitted from the electric power/point management server 200, through the communication unit 12.

In addition, under the control of the control unit 11, the communication unit 12 transmits, to the electric power/point management server 200, electric storage amount information indicating an electric storage amount in the storage battery module 30 and electric power generation amount information indicating an electric power generation amount in the electric power generation equipment 40. In addition, the transmission of the electric storage amount information may be performed in response to a request from the electric power/point management server 200.

In addition, the communication unit 12 establishes communication, through the network, with a terminal device 50 such as a personal computer, a smartphone, a mobile phone, or the like, held by the electric storage equipment holder. Accordingly, from an outside location or the like, it may also be possible for the electric storage equipment holder to perform the confirmation of an electric storage status, a discharging status, or the like, or the setting of an operation mode, or the like.

Furthermore, the communication unit 12 may be connected, through the network, to the server of an electric power company in the electric power market or the server of a broker mediating electricity trading in the electric power market, and may acquire electric power price information in the electric power market. Furthermore, under the control of the control unit 11, the communication unit 12 may also establish communication with the server of the electric power company or the like, the communication being desirable for electricity trading such as a selling order for the electric power market or the like.

The power conditioner 13 is connected to the storage battery module 30 through the DC electric power line. In addition, the power conditioner 13 is connected to the electric power generation equipment 40 through the DC electric power line and a connection unit 41. In addition, using the AC electric power line, the power conditioner 13 is connected to system power 140 through a distribution board 110 and an electric power purchasing meter 120. Furthermore, using the AC electric power line, the power conditioner 13 is connected to the system power 140 through an electric power selling meter 130.

The power conditioner 13 includes a bidirectional inverter, performs conversion between alternating-current power and direct-current power, and outputs electric power to a predetermined output destination. The power conditioner 13 outputs, to the storage battery module 30, generated electric power obtained by the electric power generation equipment 40. Accordingly, the storage battery module 30 is charged. In addition, so as to subject the generated electric power obtained by the electric power generation equipment 40 to electric power selling, the power conditioner 13 outputs the generated electric power to the system power 140. Furthermore, so as to subject the generated electric power obtained by the electric power generation equipment 40 to personal consumption, the power conditioner 13 outputs the generated electric power to the distribution board 110. The generated electric power is supplied to the electric equipment 150 through the distribution board 110.

In addition, the power conditioner 13 extracts electric power from the storage battery module 30, and outputs the electric power to the system power 140 for the sake of the electric power selling. Furthermore, the power conditioner 13 extracts electric power from the storage battery module 30, and outputs the electric power to the distribution board 110 for the sake of the personal consumption.

Furthermore, the power conditioner 13 converts, into direct-current power, alternating-current power from the system power 140, acquired owing to the electric power purchasing, and outputs the direct-current power to the storage battery module 30. Accordingly, charging the storage battery module 30 owing to the electric power purchasing is performed.

The power conditioner 13 operates in every one of three modes such as the charging mode, the discharging mode, and the autonomous operation mode. The charging mode is a mode in which electric power obtained owing to electric power generation in the electric power generation equipment 40 is stored in the storage battery module 30. In addition, when electric power purchasing from the electric power market is available, an operation is also performed in which electric power obtained owing to the electric power purchasing is stored in the storage battery module 30. The discharging mode is a mode in which the storage battery module 30 is discharged. The autonomous operation mode is a mode in which electric power is output to no output destination.

Such switching of an operation in the power conditioner 13 is performed by a control signal from the control unit 11. Namely, under the control of the control unit 11, the output destination of electric power is switched by the power conditioner 13. In addition, the power conditioner 13 measures a discharged electric power amount when the storage battery module 30 is discharged, and measures an electric power amount subjected to charging when the storage battery module 30 is charged.

In the present embodiment, electric power obtained by the electric power generation equipment 40 is supplied to the storage battery module 30, and hence charging is performed. Furthermore, charging owing to the electric power purchasing may be performed by supplying electric power from the electric power network to the storage battery module 30. In addition, the power conditioner 13 sends electric power extracted from the storage battery module 30 to the electric power network through the system power 140, and hence electric power selling is performed.

In addition, when the electric power selling is performed by outputting electric power from the power conditioner 13 to the system power 140, an electric power amount (selling electric power amount) output from the power conditioner 13 to the system power 140 is measured by the electric power selling meter 130. The electric power selling meter 130 measures an electric power amount, and may also measure a time when the measurement is performed. The electric power selling meter 130 is connected to the control unit 11, and notifies the control unit 11 of the measured selling electric power amount. In addition, so as to secure the reliability of a measurement result, the electric power selling meter 130 may obtain predetermined certification due to the point issuer or the like.

In addition, it is desirable that the power conditioner 13 includes an electric power meter (sensor) for measuring electric power passing through the storage battery module 30, the DC electric power line, and the DC electric power line connecting the power conditioner 13 and the electric power generation equipment 40 to each other. It may also be possible for the control unit 11 to acquire the electric storage amount information and the electric power generation amount information on the basis of a measurement result due to the electric power meter included in the power conditioner 13.

While the electric power controller 10 is configured in such a way as described above, an input unit 21, a display unit 22, and a storage unit 23 are also connected to the control unit 11 in the electric power controller 10. The input unit 21 is an input mechanism used by a user for inputting an instruction to the electric power controller 10. For example, the input unit 21 includes a touch screen, a button, a switch, a dial, or the like, which is integrated with the display unit 22. When an input to the input unit 21 is performed, a control signal corresponding to that input is generated to be output to the control unit 11. In addition, the control unit 11 performs arithmetic processing or control corresponding to that control signal.

For example, the display unit 22 is a display mechanism including a liquid crystal display (LCD), a plasma display panel (PDP), an organic electro luminescence (EL) panel, or the like. In the display unit 22, various kinds of information such as a charging status and a discharging status in the electric storage equipment 100, a point given from the point issuer, contract information between the electric storage equipment holder and the point issuer, and the like are displayed.

The storage unit 23 is a storage medium including a hard disk, a flash memory, or the like. The storage unit 23 stores and holds therein point information indicating a point issued from the point issuer, contract information indicating the content of the contract between the electric storage equipment holder and the point issuer, authentication information used for performing authentication with respect to the electric power/point management server 200, and the like. The point information, the contract information, and the like stored in the storage unit 23 are displayed by the display unit 22. Accordingly, it may be possible for the electric storage equipment holder to confirm a point currently held by the self, the history of decrease or increase in a past point, the contents of contract, and the like. As the contract information stored in the storage unit 23, for example, information may be cited that relates to whether the electric power controller 10 prioritizes an instruction from the electric storage equipment holder or an instruction from the electric power/point management server 200. This contract information is used in electric power control due to the control unit 11.

In addition, when the point issuer and the point exchanger are a same company or organization and service relating to the electric power management system is provided as so-called cloud service on Internet, the storage unit 23 may be unnecessary. All of the above-mentioned various kinds of information are managed and stored in the electric power/point management server 200 on the point issuer side.

The electric power controller 10 and the electric storage equipment 100 are configured in such a way as described above. In addition, in the present embodiment, the electric power generation equipment 40 is connected to the power conditioner 13 through the connection unit 41.

It is desirable that the electric power generation equipment 40 is electric power generation equipment utilizing energy whose environmental load is low, namely, energy called natural energy, renewable energy, or the like. For example, the electric power generation equipment 40 is electric power generation equipment utilizing sunlight, solar heat, wind power, hydraulic power, Low head hydro power, tidal power, wave power, the temperature difference of water, an ocean current, biomass, geothermal power, the energy of sound or oscillation, or the like. In addition, the electric power generation equipment 40 may also be electric power generation equipment generating electric power owing to human power, such as an exercise bike equipped with an electric power generation function, a floor (called an electric power generation floor or the like) including a mechanism where a person walks, thereby generating electric power, or the like. In this regard, however, the electric power generation equipment 40 is not limited to equipment utilizing the above-mentioned examples, and may also be any piece of equipment if the equipment adopts an electric power generation method whose environmental load is low.

Electric power obtained by the electric power generation equipment 40 is supplied to the power conditioner 13, and is used for charging in the storage battery module 30, discharging for electric power selling, or personal consumption, under the control of the control unit 11 in the electric power controller 10.

In addition, a plurality of pieces of electric equipment 150 are connected to the distribution board 110 provided between the power conditioner 13 and the system power 140. Electric power obtained by the electric power generation equipment 40 and electric power stored in the storage battery module 30 are sent to the electric equipment 150 through the power conditioner 13 and the distribution board 110. Accordingly, it may be possible for the electric storage equipment holder to use the electric equipment 150. In addition, electric power from the system power 140 is sent to the electric equipment 150 through the distribution board 110, and hence, it may also be possible for the electric storage equipment holder to use the electric equipment 150.

In a standard home, examples of the electric equipment 150 includes electronic devices such as a television receiver, an audio device, and the like, and home electrical appliances such as a refrigerator, a microwave oven, a washing machine, air-conditioning equipment, and the like. In addition, a personal computer, a copy machine, a facsimile, a printer, air-conditioning equipment, and the like may be cited in a company. Furthermore, lighting equipment, air-conditioning equipment, transportation equipment such as an elevator or the like may be cited in a store, a commerce facility, or the like.

[1-3. Configurations of Electric Power/Point Management Server and Point Exchange Server]

Figure 3A:
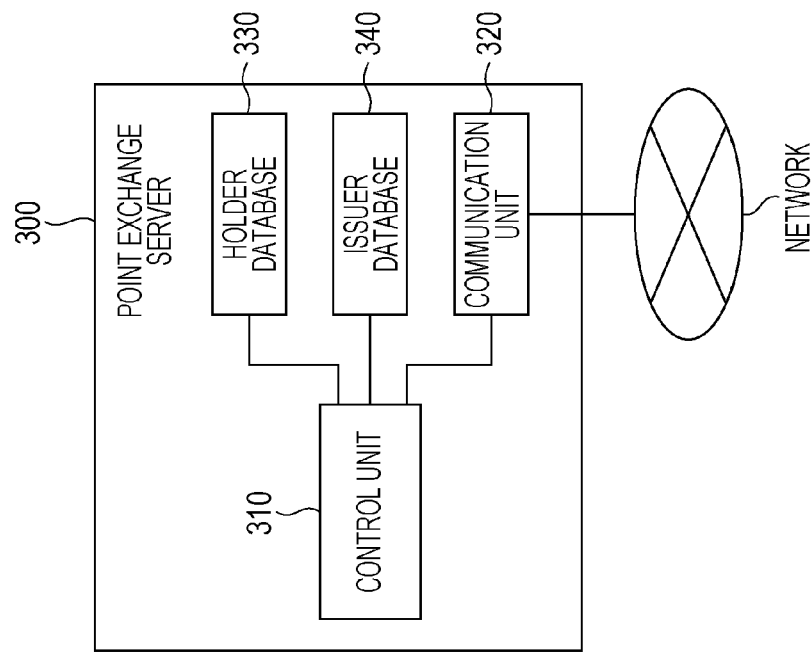
FIG. 3A is a block diagram illustrating a configuration of an electric power/point management server.

Next, the electric power/point management server 200 used on the point issuer side will be described. FIG. 3A is a block diagram illustrating the configuration of the electric power/point management server 200. The electric power/point management server 200 includes a communication unit 210, a control unit 220, an electric power management unit 221, a point rate determination unit 222, a point issuing unit 223, a holder database 230, and an exchanger database 240.

For example, the communication unit 210 is a network interface used for establishing communication with the electric storage equipment 100 on the basis of a predetermined protocol through a network such as Internet or the like. A communication method may be any method such as wire communication, a wireless LAN, Wi-Fi, communication utilizing a 3G line, or the like. The communication unit 210 transmits, to the electric power controller 10, the charging command, the discharging command, and the autonomous operation command, issued by the electric power management unit 221.

In addition, the communication unit 210 receives the electric storage amount information indicating the electric storage amount stored in the storage battery module 30 and the electric power generation amount information indicating the electric power generation amount in the electric power generation equipment 40, transmitted from the electric power controller 10. In addition, the transmission of the electric storage amount information, performed in the electric power controller 10, is performed in response to a request from the electric power/point management server 200. In addition, the communication unit 210 is connected, through the network, to the server of the electric power company in the electric power market or the server of the broker mediating electricity trading in the electric power market, and acquires the electric power price information in the electric power market. Furthermore, under the instruction of the electric power management unit 221, the communication unit 210 establishes communication with the server of the electric power company or the like, the communication being desirable for the electricity trading such as a selling order for the electric power market or the like.

For example, the control unit 220 includes a CPU, a RAM, a ROM, and the like. A program to be read by the CPU is stored in the ROM. The RAM is used as the working memory of the CPU. The CPU executes various processing operations on the basis of the program stored in the ROM, thereby controlling the whole electric power/point management server 200. In addition, by executing a predetermined program, the CPU functions as the electric power management unit 221, the point rate determination unit 222, and the point issuing unit 223.

Using the electric power price information, the electric power generation amount information indicating the electric power generation amount in the electric power generation equipment 40, and the like, received by the communication unit 210, the electric power management unit 221 determines, on the basis of a predetermined algorithm, a charge amount to be directed to the storage battery module 30, an electric power selling amount to be directed to the electric power market, and a personal consumption amount to be allocated to personal consumption, and issues the charging command, the discharging command, and the autonomous operation command. The detail of electric power management processing performing command issuing and command transmission will be described later.

The point rate determination unit 222 determines a rate (hereinafter, referred to as a point rate) between a point given to the electric storage equipment holder and the electric storage amount in the storage battery module 30 indicated by the electric storage amount information. In the present embodiment, in response to the electric storage amount in the storage battery module 30, the point is given to the electric storage equipment holder. Point rate information indicating the point rate is supplied to the point issuing unit 223.

The point issuing unit 223 issues the point on the basis of the electric storage amount in the storage battery module 30, indicated by the electric storage amount information, and the point rate information supplied from the point rate determination unit 222. The issued point is managed in the holder database 230 or the like, with respect to each electric storage equipment holder. In addition, point information indicating the issued point may be transmitted to the electric power controller 10 through the network. The details of the point rate determination and the point management will be described later.

The holder database 230 stores therein holder information serving as information relating to the electric storage equipment holder holding the electric storage equipment 100. As the holder information, the name, the address, the phone number, the electric storage equipment identification information, the electric power generation equipment identification information, and the authentication information, and the like of the electric storage equipment holder may be cited. In this regard, however, the holder information is not limited to these pieces of information. As the holder information, any kind of information may be cited if agreement for the acquisition of the information with the electric storage equipment holder is obtained and the information is considered to be capable of being used on the point issuer side.

In addition, the contract information indicating the content of contract between the point issuer and the electric storage equipment holder is also stored in the holder database 230. It may be possible for the electric power management unit 221 to refer to the contract information at the time of the electric power management processing.

For example, when a contract between the electric storage equipment holder and the point issuer is concluded, the electric storage equipment holder presents the holder information in writing or the like, the point issuer inputs the holder information to the holder database 230, and hence the holder information is stored. In addition, at the start of the use of the electric power management system by the electric storage equipment holder, the display unit 22 in the electric power controller 10 may be caused to display an input screen urging the electric storage equipment holder to input the holder information. When, using the input unit 21, the electric storage equipment holder inputs in accordance with the instruction of the input screen, the input holder information is transmitted to the holder database 230 through the network and stored therein.

The exchanger database 240 stores therein exchanger information serving as information relating to a point exchanger. As the exchanger information, the name, the company name, the organization name, the address, the phone number, the contents of contract, and the like of the point exchanger may be cited. In this regard, however, the exchanger information is not limited to these pieces of information. As the holder information, any kind of information may be cited if agreement for the acquisition of the information with the point exchanger is obtained and the information is considered to be capable of being used on the point issuer side.

For example, when a contract between the point issuer and the point exchanger is concluded, the point exchanger presents the exchanger information in writing or the like, the point issuer inputs the exchanger information to the exchanger database 240, and hence the exchanger information is stored. In addition, by performing transmission/reception through the network, the exchanger information may be stored in the exchanger database 240. In addition, when a same company, a same organization, or the like manages the point issuer and the point exchanger, the exchanger information and the exchanger database 240 may be unnecessary.

Figure 3B:
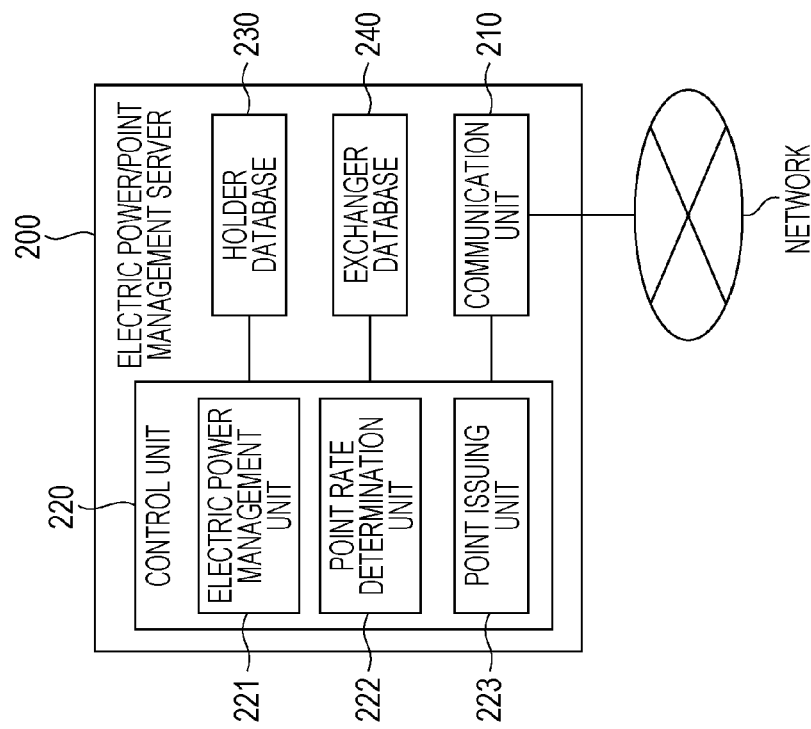
FIG. 3B is a block diagram illustrating a configuration of a point exchange server.

Next, a point exchange server 300 used on a point exchanger side will be described. FIG. 3B is a block diagram illustrating the configuration of the point exchange server 300. The point exchange server 300 includes a control unit 310, a communication unit 320, a holder database 330, and an issuer database 340.

The control unit 310 includes a CPU, a RAM, a ROM, and the like, and executes various processing operations on the basis of a program, thereby controlling the whole point exchange server 300.

For example, the communication unit 320 is a network interface used for establishing communication with the electric storage equipment 100 on the basis of a predetermined protocol through a network such as Internet or the like. The point exchange server 300 is connected to the electric storage equipment holder through the network. Accordingly, it may be possible to exchange the point and the goods/service through the network. In this regard, however, when service relating to the electric power management system is provided as cloud service, the point is sent from the point issuer to the point exchanger under the instruction of the electric storage equipment holder. In addition, through the network, the communication unit 320 may provide something available (an electronic book, a music content, a video content, various kinds of coupons, or the like) from among the goods/service. In addition, as described above, the exchange of the point and the goods/service may be performed in the actual exchange office.

The holder database 330 stores therein holder information serving as information relating to the electric storage equipment holder. As the holder information, the name, the address, the phone number, the registration number, the history of the exchange of the goods/service, and the like of the electric storage equipment holder may be cited. In this regard, however, the holder information is not limited to these pieces of information. As the holder information, any kind of information may be cited if agreement for the acquisition of the information with the electric storage equipment holder is obtained and the information is considered to be capable of being used on the point exchanger side. In addition, with respect to the holder information, the same holder information as that stored in the holder database 230 in the electric power/point management server 200 may be shared.

The issuer database 340 stores therein issuer information serving as information relating to the point issuer. As the issuer information, the name, the company name, the organization name, the address, the phone number, the contents of contract, and the like of the point issuer may be cited. In this regard, however, the issuer information is not limited to these pieces of information. As the holder information, any kind of information may be cited if agreement for the acquisition of the information with the point issuer is obtained and the information is considered to be capable of being used on the point exchanger side.

[1-4. Processing in Electric Power/Point Management Server: Electric Power Management Processing]

Next, processing performed by the electric power/point management server 200 will be described. The processing performed in the electric power/point management server 200 is divided into electric power management processing instructing the electric power controller 10 to perform charging, electric power selling, and an autonomous operation and point issuing processing issuing a point to the electric storage equipment holder.

Figure 4:
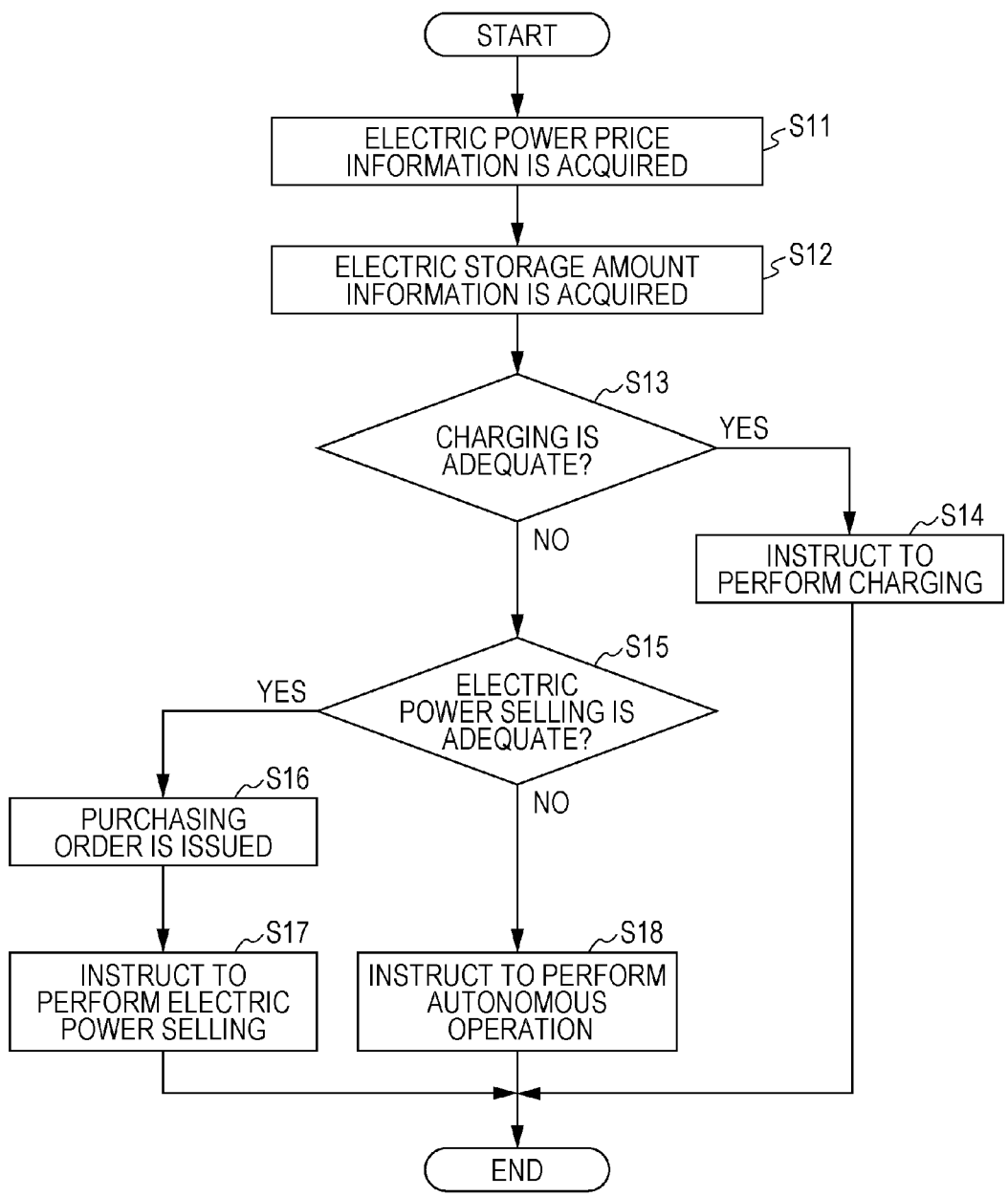
FIG. 4 is a flowchart illustrating a flow of electric power management processing performed by the electric power/point management server.

First, the electric power management processing will be described. FIG. 4 is a flowchart illustrating the flow of the electric power management processing. First, in Step S11, the electric power price information in the electric power market is acquired from the server of the electric power company in the electric power market, the broker mediating electricity trading in the electric power market, or the like. Next, in Step S12, the electric storage amount information indicating the electric storage amount in the storage battery module 30 is acquired from the electric power controller 10. In addition, the acquisition of the electric storage amount information is not only performed when the electric power management processing is performed, but may also be continuously performed on a periodic basis. In that case, in the electric power management processing, processing is performed on the basis of an electric storage amount indicated by the latest electric storage amount information at that time.

Next, in Step S13, it is determined whether or not the execution of charging is adequate. For example, a predetermined electric power purchasing threshold price may be preliminarily defined, and, by comparing an electric power price in the electric power market with the electric power purchasing threshold price, it may be possible to determine whether or not the execution of charging is adequate. When the electric power price in the electric power market is lower than the electric power purchasing threshold price, it is determined that electric power purchasing is adequate. In addition, for example, using the following method described in Japanese Unexamined Patent Application Publication No. 2002-233053, it may be possible to determine whether or not the electric power purchasing is adequate.

First, the time series data of the electric power price information received in the above-mentioned Step S11 is stored, the analysis of an electric power price fluctuation and temporal fluctuation prediction are performed, and the optimum purchasing amount and the optimum purchasing timing of electric power are determined. First, by analysing the time series data of a past electric power price, the fluctuation prediction value (reference prediction value) of the electric power price is calculated. As a method for predicting a future value from the past time series data, a pattern analysis based on a neural network may be cited, for example. Furthermore, so as to perform highly accurate prediction, using the correlative relationship of the electric power price when an external factor such as past weather information, an electric power demand trend, or the like has occurred, the fluctuation sensitivity of the electric power price may be calculated to be reflected in prediction. For example, when it is understood that the electric power price increases by 1 yen/kWh with an increase by 1° C. in an atmosphere temperature, the fluctuation sensitivity for the weather condition turns out to be 1 yen/(kWh·° C.). By reflecting this fluctuation sensitivity in the reference prediction value, the prediction value (purchasing electric power price prediction value) of the electric power price, taking into consideration the external factor such as the weather condition, the electric power demand trend, or the like, is calculated using the following Expression.

Purchasing Electric Power Price Prediction Value=Reference Prediction Value (Calculated from Time Series Data)×Sensitivity for Weather Condition×Sensitivity for External Factor [Expression 1]

Furthermore, the calculated purchasing electric power price prediction value and the time series data of the past electric power price are subjected to statistical processing, and the expectation value (electric power purchasing reference price) of the minimum value of the electric power price before a given timing is calculated. In addition, when the electric power price in the electric power market, indicated by the electric power price information, is below this electric power purchasing reference price, it is determined that the electric power purchasing is adequate. On the other hand, when the electric power price indicated by the electric power price information exceeds this electric power purchasing reference price, it is determined that the electric power purchasing is not adequate.

In addition, an algorithm used for determining the charging is not limited to the above-mentioned algorithm, and any algorithm may be used if the algorithm determines a sales amount and a selling timing from a price fluctuation in the electric power market, the prediction value thereof, and an electric power amount available for sale. For example, it may be possible to alter and use a program so that the program is suited to the electric power market, the program being used for automatic sale and purchase in another existing market, for example, a stock market.

When, in Step S13, it is determined that the electric power purchasing is adequate, the processing proceeds to Step S14

(Step S13: Yes). In addition, in Step S14, the charging command is transmitted that instructs the electric power controller 10 under the control to perform charging. In addition, in the charging command, a charging time, an electric power amount to be used for charging, and the like may also be prescribed along with the charging instruction.

On the other hand, in Step S13, it is determined that the electric power purchasing is not adequate, the processing proceeds to Step S15 (Step S13: No).

In addition, in Step S15, it is determined whether or not electric power selling is adequate. For example, a predetermined electric power selling threshold price may be preliminarily defined, and, by comparing an electric power price in the electric power market with the electric power selling threshold price, it may be possible to determine whether or not the electric power selling is adequate. When the electric power price in the electric power market is higher than the electric power selling threshold price, it is determined that electric power selling is adequate. In addition, for example, using the following method described in Japanese Unexamined Patent Application Publication No. 2002-233053, it may be possible to determine whether or not the electric power selling is adequate.

The electric power selling price is defined by multiplying the electric storage amount by the electric power price. In addition, a cost associated with the operation of the electric storage device occurs in electric storage. For ease of explanation, it is assumed that, with respect to the cost necessary for the electric storage, a set amount of money is necessary every day. A profit due to the operation of the electric storage system is determined in accordance with the following Expressions.

Profit Due to Operation of Electric Storage System=Electric Power Selling Rate−Electric Power Purchasing Rate−Electric Storage Cost [Expression 2]

Electric Power Purchasing Rate=Purchasing Electric Power Amount×Electric Power Price at Purchasing Timing [Expression 3]

Electric Power Selling Rate=Purchasing Electric Power Amount×(100−Discharging Rate (%/Day)×Number of Days of Electric Storage)× Electric Power Price at Selling Timing [Expression 4]

Electric Storage Cost=Cost Unit Value (¥/Day)× Number of Days of Electric Storage [Expression 5]

The temporal fluctuation prediction of the electric power price is performed on the basis of the same method as described above, and the prediction value (the selling profit prediction value of the electric power) due to the electric storage system operation is calculated. By subjecting this prediction value to statistical processing, the expectation value (electric power selling reference profit) of the maximum value of a profit before a given timing is calculated, and when a profit calculated at a time exceeds the electric power selling reference profit, it is determined that the electric power selling is adequate.

In addition, an algorithm used for determining the electric power selling is not limited to the above-mentioned algorithm, and any algorithm may be used if the algorithm determines a sales amount and a selling timing from a price fluctuation in the electric power market, the prediction value thereof, and an electric power amount available for sale. For example, it may be possible to alter and use a program so that the program is suited to the electric power market, the program being used for automatic sale and purchase in another existing market, for example, the stock market.

When, in Step S15, it is determined that the electric power selling is adequate, the processing proceeds to Step S16 (Step S15: Yes). Next, in Step S16, a purchasing order is issued to the electric power market. In addition, after a buying or selling transaction with the electric power market has been closed, the discharging command is transmitted to the electric power controller 10 in Step S17. In addition, in the discharging command, a discharging time, an electric power amount to be discharged, and the like may also be prescribed along with the discharging instruction.

On the other hand, in Step S15, it is determined that the electric power selling is not adequate, the processing proceeds to Step S18 (Step S15: No). The case where the processing proceeds to Step S18 corresponds to a case where the electric power purchasing is not adequate and the electric power selling is also not adequate. In this case, the electric power/point management server 200 transmits the autonomous operation instruction command to the electric power controller 10 so that the electric power controller 10 does not operate in response to an instruction from the electric power/point management server 200, but operates in the judgment of the electric power controller 10 itself.

The electric power management processing is performed in such a way as described above. The electric power/point management server 200 determines a relationship between the electric power stored in the electric storage equipment 100 and the electric power price in the electric power market, and the electric power stored in the electric storage equipment 100 is traded. Accordingly, it may be possible for the point issuer to obtain a profit. In addition, it is not necessary for the electric storage equipment holder to pay attention to the electric power price in the electric power market.

[1-5. Processing in Electric Power Controller: Processing for Obtaining Magnitude Relationship Between Electric Power Selling Price, Electric Power Purchasing Price, and Charging Profit Price]

Figure 5:
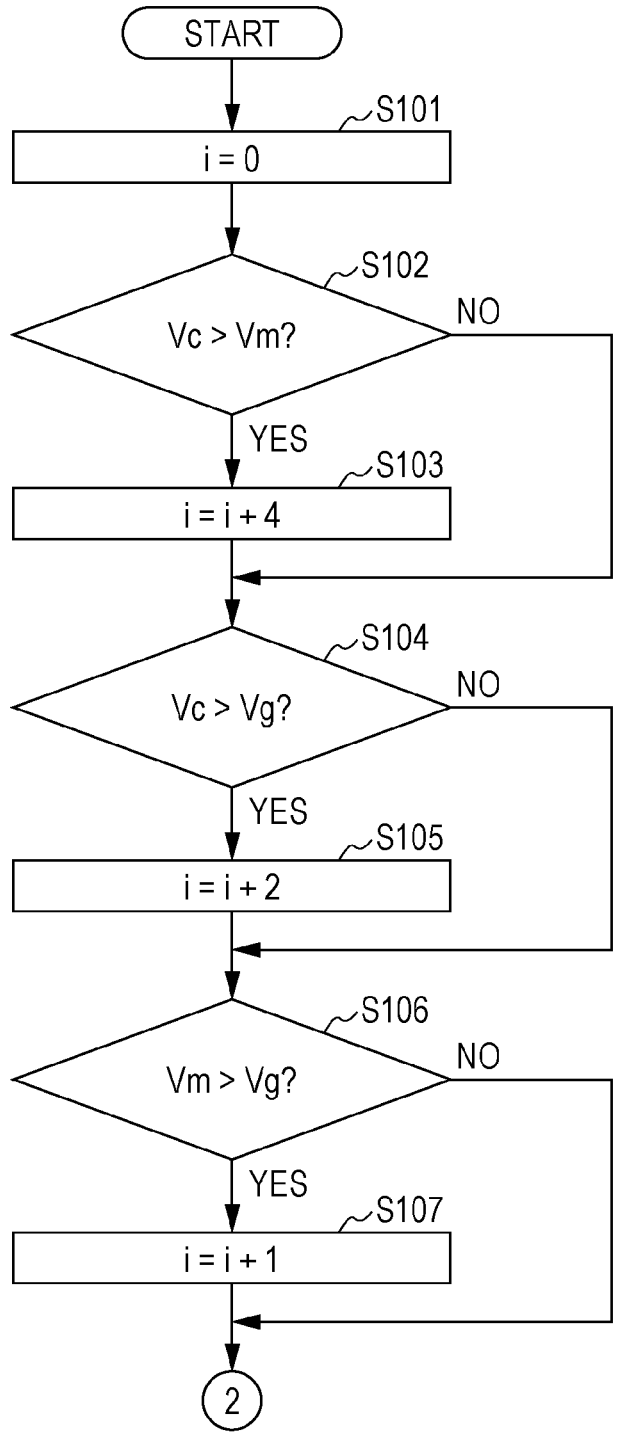
FIG. 5 is a flowchart illustrating a flow of processing for obtaining a magnitude relationship between an electric power selling price, an electric power purchasing price, and a charging profit price.
Figure 6:
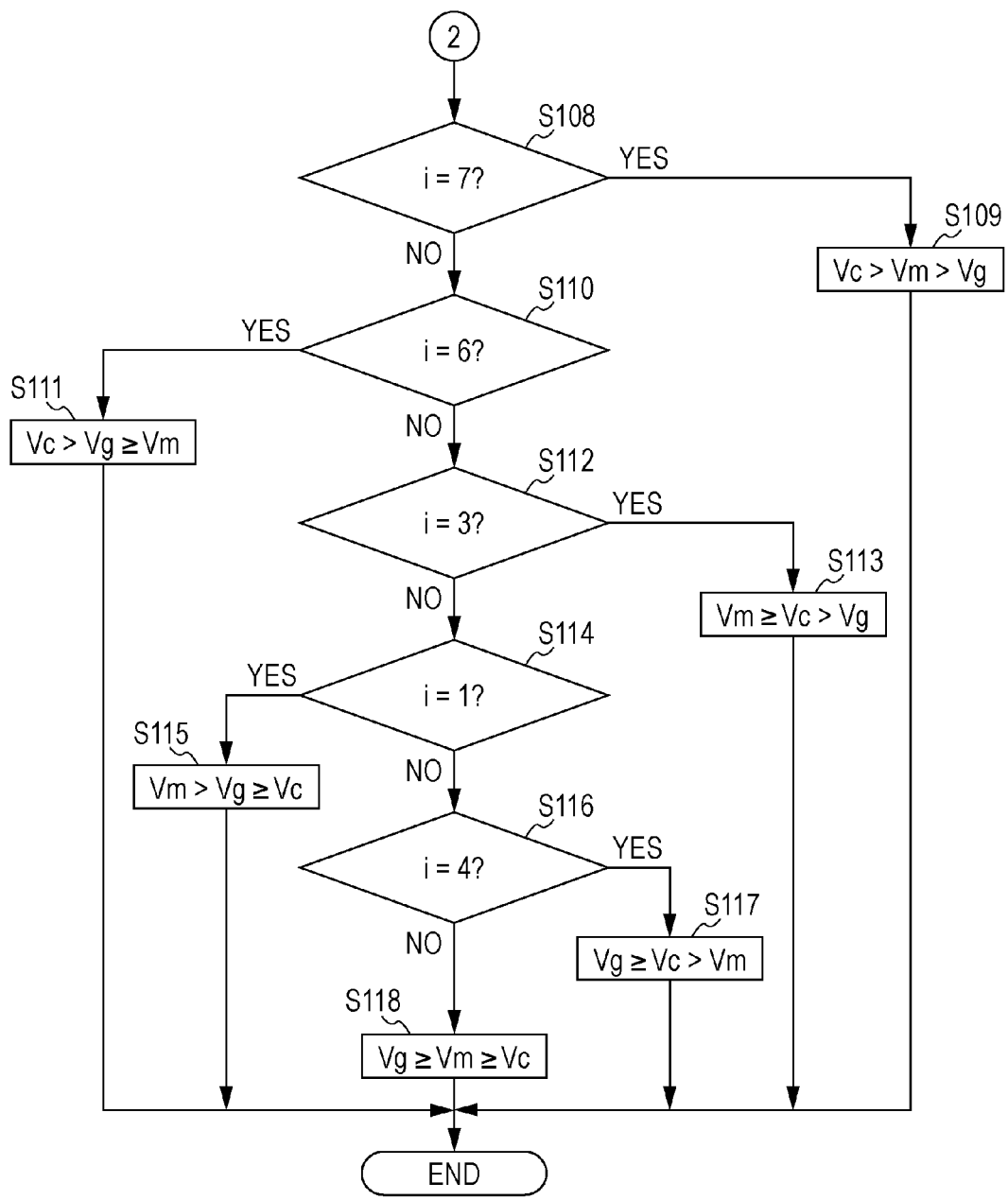
FIG. 6 is a flowchart illustrating a flow of the processing for obtaining the magnitude relationship between the electric power selling price, the electric power purchasing price, and the charging profit price.

Next, processing performed in the electric power controller 10 will be described with reference to FIG. 5 to FIG. 24. The following processing is performed by the control unit 11 in the electric power controller 10. In the processing, first, a magnitude relationship between an electric power selling price (hereinafter, referred to as an electric power selling price Vm) when generated electric power obtained by the electric power generation equipment 40 is sold to the electric power company or on the electric power market, an electric power price (hereinafter, referred to as an electric power purchasing price Vg) when electric power is purchased from the electric power company, and an economic value (hereinafter, referred to as a charging profit price Vc) due to the execution of charging. The charging profit price Vc corresponds to a "predetermined price" in the claims. FIG. 5 and FIG. 6 are flowcharts illustrating the flow of processing for obtaining a magnitude relationship between these prices.

In addition, the electric power selling price Vm and the electric power purchasing price Vg are not fixed but fluctuate. For example, when electric power is sold to the electric power company, the electric power selling price Vm may be likely to be set to a premium price separately, with respect to electric power generated on the basis of a specific electric power generation method (for example, solar photovoltaic power generation or the like). In addition, depending on the governmental policy of a country in which the electric power company exists, the electric power selling price Vm may vary in some cases. When the electric power is sold on the electric power market, the electric power selling price Vm may fluctuate depending on the situation of the electricity trading.

In addition, the electric power purchasing price Vg may be likely to fluctuate depending on a purchase time zone, for example, when the midnight electric power is purchased, the electric power purchasing price Vg becomes a low price. Furthermore, depending on the governmental policy of a country in which the system according to an embodiment of the present application is implemented, the electric power purchasing price Vg may also fluctuate.

The charging profit price Vc indicating an economic value due to the execution of the charging may be calculated from an equation of "a rate between a charge amount and a point×a monetary value per point". The rate between the charge amount and the point is the rate of a point given to an increase in a charge amount in the storage battery module 30. In addition, the monetary value per point indicates how much value the point has as actual money.

For example, the rate between the charge amount and the point is 1 point per 1 kwh. A calculation method for the rate between the charge amount and the point will be described later. In addition, for example, when the number of points exchangeable for the goods/service worth 1000 yen is 100, a monetary value per point is 10 yen per point. Accordingly, on the basis of the equation of "a rate between a charge amount and a point×a monetary value per point", the charging profit price Vc in this case is "(1 point/1 kwh)×(10 yen/1 point)=10 yen/1 kwh", namely, 10 yen per 1 kwh. In this regard, however, this value is an example for description. This charging profit price Vc is a value when being viewed from the electric storage equipment holder, and does not indicate a value when being viewed from the point issuer.

The flowcharts of FIG. 5 and FIG. 6 will be described. First, in Step S101, "i=0" is set. In the flowcharts of FIG. 5 and FIG. 6, on the basis of the final value of "i", a relationship between the electric power selling price Vm, the electric power purchasing price Vg, and the charging profit price Vc is obtained. Subsequently, in Step S102, it is determined whether or not the charging profit price Vc is larger than the electric power selling price Vm. When the charging profit price Vc is larger than the electric power selling price Vm (Step S102: Yes), the processing proceeds to Step S103, and processing for setting "i=i+4" is performed.

Next, the processing proceeds to Step S104. In addition, when, in the above-mentioned Step S102, it is determined that the charging profit price Vc is less than or equal to the electric power selling price Vm, the processing also proceeds to Step S104 (Step S102: No). In addition, in Step S104, it is determined whether or not the charging profit price Vc is larger than the electric power purchasing price Vg. When the charging profit price Vc is larger than the electric power purchasing price Vg (Step S104: Yes), the processing proceeds to Step S105, and processing for setting "i=i+2" is performed.

Next, the processing proceeds to Step S106. In addition, when, in the above-mentioned Step S104, it is determined that the charging profit price Vc is less than or equal to the electric power purchasing price Vg, the processing also proceeds to Step S106 (Step S104: No). In addition, in Step S106, it is determined whether or not the electric power selling price Vm is larger than the electric power purchasing price Vg. When the electric power selling price Vm is larger than the electric power purchasing price Vg (Step S106: Yes), the processing proceeds to Step S107, and processing for setting "i=i+1" is performed.

Next, the processing proceeds to Step S108. In addition, when, in the above-mentioned Step S106, it is determined that the electric power selling price Vm is less than or equal to the electric power purchasing price Vg, the processing also proceeds to Step S108 (Step S106: No). In addition, in Step S108, it is determined whether or not "i=7" is satisfied. When "i=7" is satisfied (Step S108: Yes), the processing proceeds to Step S109, and it is determined that the relationship between the electric power selling price Vm, the electric power purchasing price Vg, and the charging profit price Vc is "Vc>Vm>Vg".

When, in Step S108, it is determined that "i=7" is not satisfied (Step S108: No), the processing proceeds to Step S110, and it is determined whether or not "i=6" is satisfied. When "i=6" is satisfied (Step S110: Yes), the processing proceeds to Step S111, and it is determined that the relationship between the electric power selling price Vm, the electric power purchasing price Vg, and the charging profit price Vc is "Vc>Vg≥Vm".

When, in Step S110, it is determined that "i=6" is not satisfied (Step S110: No), the processing proceeds to Step S112, and it is determined whether or not "i=3" is satisfied. When "i=3" is satisfied (Step S112: Yes), the processing proceeds to Step S113, and it is determined that the relationship between the electric power selling price Vm, the electric power purchasing price Vg, and the charging profit price Vc is "Vm≥Vc>Vg".

When, in Step S112, it is determined that "i=3" is not satisfied (Step S112: No), the processing proceeds to Step S114, and it is determined whether or not "i=1" is satisfied. When "i=1" is satisfied (Step S114: Yes), the processing proceeds to Step S115, and it is determined that the relationship between the electric power selling price Vm, the electric power purchasing price Vg, and the charging profit price Vc is "Vm>Vg≥Vc".

When, in Step S114, it is determined that "i=1" is not satisfied (Step S114: No), the processing proceeds to Step S116, and it is determined whether or not "i=4" is satisfied. When "i=4" is satisfied (Step S116: Yes), the processing proceeds to Step S117, and it is determined that the relationship between the electric power selling price Vm, the electric power purchasing price Vg, and the charging profit price Vc is "Vg≥Vc>Vm".

When, in Step S116, it is determined that "i=4" is not satisfied (Step S116: No), the processing proceeds to Step S118, and it is determined that the relationship between the electric power selling price Vm, the electric power purchasing price Vg, and the charging profit price Vc is "Vg≥Vm≥Vc". In addition, a case where, in Step S116, it is determined that "i=4" is not satisfied corresponds to "i=0".

In addition, the flowcharts illustrated in FIG. 5 and FIG. 6 are examples of processing for obtaining the relationship between the electric power selling price Vm, the electric power purchasing price Vg, and the charging profit price Vc. The sequence of individual steps is not limited to FIG. 5 and FIG. 6. In addition, as the processing itself, any kind of processing may also be adopted if the processing is capable of obtaining the relationship between the electric power selling price Vm, the electric power purchasing price Vg, and the charging profit price Vc.

[1-6. Processing in Electric Power Controller: Processing Performed when Charging Instruction is Received]

Next, electric power control processing performed in the electric power controller 10 when a charging instruction has been issued from the electric power/point management server 200 will be described with reference to FIG. 7 to FIG. 12. The processing is performed on the basis of the relationship between the electric power selling price Vm, the electric power purchasing price Vg, and the charging profit price Vc, obtained owing to the processing illustrated in FIG. 5 and FIG. 6. In addition, it is assumed that, between the electric storage equipment holder and the point issuer, a contract has been concluded where it is possible for the electric storage equipment holder to allocate generated electric power to personal consumption.

In addition, each processing operation described later is based on the principle that (1) "the number of times the storage battery module 30 is charged or discharged is preferably reduced and the life of the storage battery module 30 is preferably lengthened" and (2) "undesirable processing is not executed and trouble is avoided".

Accordingly, for example, when "the charging profit price Vc=the electric power purchasing price Vg" is satisfied, while it is possible to perform charging owing to the execution of electric power purchasing, there may not be an economic benefit. Therefore, so as to lengthen the life of the storage battery module 30, it is preferable not to perform charging owing to the execution of electric power purchasing. Alternatively, when "the charging profit price Vc=the electric power selling price Vm" is satisfied, even if the generated electric power due to the electric power generation equipment 40 is subjected to electric power selling or charging, an economic benefit may not vary. Accordingly, it is preferable not to perform charging, so as to lengthen the life of the storage battery module 30. In addition, even if the electric power stored in the storage battery module 30 is subjected to electric power selling, since there may not be an economic benefit, it is preferable not to perform discharging, so as to lengthen the life of the storage battery module 30.

In addition, alternatively, when "the electric power selling price Vm=the electric power purchasing price Vg" is satisfied, in every one of a case where the generated electric power due to the electric power generation equipment 40 is subjected to electric power selling by performing discharging and a case where the generated electric power due to the electric power generation equipment 40 is allocated to personal consumption, an economic benefit may not vary. Accordingly, if the principle of (2) "undesirable processing is not executed and trouble is avoided" is followed, the personal consumption is prioritized.

In the following description, it is assumed that a charge amount prescribed by the electric power/point management server 200 is a "prescribed charge amount Pchrg*". In addition, it is assumed that a generated electric power obtained owing to the electric power generation equipment 40 is an "electric power generation amount Pgen".

In addition, it is assumed that an electric power with which the storage battery module 30 is charged is a "charge amount Pchrg" (in this regard, however, Pchrg>0) and electric power extracted from the storage battery module 30 is a "discharge amount (−Pchrg)" (in this regard, however, Pchrg<0).

In addition, electric power sold to the electric power market is referred to as an "electric power selling amount Psell". In addition, a minimum value among the maximum allowable electric power values of individual configuration elements (various kinds of instruments, lines, and the like) in the electric storage equipment 100, the configuration elements being located on a path through which electric power passes in the electric storage equipment 100 at the time of electric power selling, namely, the maximum allowable electric power of the electric storage equipment 100 at the time of electric power selling, is referred to as an "electric power selling allowable amount Psell_max".

In addition, a minimum value among the maximum allowable electric power values of individual configuration elements (various kinds of instruments, lines, and the like) in the electric storage equipment 100, the configuration elements being located on a path through which electric power passes in the electric storage equipment 100 at the time of charging, namely, the maximum allowable electric power of the electric storage equipment 100 at the time of charging, is referred to as a "charge allowable amount Pchrg_max".

In addition, from among electric power obtained owing to the electric power generation, electric power used for personal consumption is referred to as a "personal consumption amount Pcons". Furthermore, total electric power the electric storage equipment holder can consume within his or her home or building is referred to as a "total personal consumption amount Pcons_max".

In addition, it is desirable that a system including the electric storage equipment 100 and the electric power generation equipment 40 is designed so as to satisfy the condition of "the electric power generation amount Pgen≤the electric power selling allowable amount Psell_max+the personal consumption amount Pcons". This condition means that it is possible to consume the whole electric power generation amount Pgen in discharging and personal consumption. When the electric power selling allowable amount Psell_max, which is the maximum allowable electric power of the electric storage equipment 100 at the time of discharging, is larger than the maximum generated electric power of the electric power generation equipment 40, this condition is satisfied.

In addition, it is desirable that the electric power controller 10 recognizes in advance the charge allowable amount Pchrg_max and the electric power selling allowable amount Psell_max in the electric storage equipment 100, and stores and holds therein these amounts. In addition, it is desirable that the "total personal consumption amount Pcons_max" in the home, building, or the like of the electric storage equipment holder holding the electric storage equipment 100 is also stored and held. For example, at the time of the introduction of the system according to an embodiment of the present application, these are calculated by an installation operator who performs the introduction operation thereof, the point issuer, or the like and set in the electric power controller 10.

In addition, it is assumed that, under the condition of "the prescribed charge amount Pchrg*≤the charge allowable amount Pchrg_max", the electric power/point management server 200 issues a charging instruction to perform charging by the amount of the "prescribed charge amount Pchrg*". This is because even if an instruction is issued so as to subject electric power to charging, the electric power exceeding the charge allowable amount Pchrg_max serving as the maximum allowable electric power of the electric storage equipment 100 at the time of charging, it is difficult to subject, to charging, an amount greater than or equal to the charge allowable amount Pchrg_max. It is desirable that when a new electric power controller 10 has been connected, the electric power/point management server 200 requests the electric power controller 10 to transmit the charge allowable amount Pchrg_max, and stores the acquired charge allowable amount Pchrg_max in the holder database 230 with respect to the electric storage equipment 100 of each electric storage equipment holder. In addition, when issuing a charging instruction to the electric power controller 10, the electric power management unit 221 refers to the charge allowable amount Pchrg_max, and issues the charging instruction with the charge allowable amount Pchrg_max being set as an upper limit.

Figure 7:
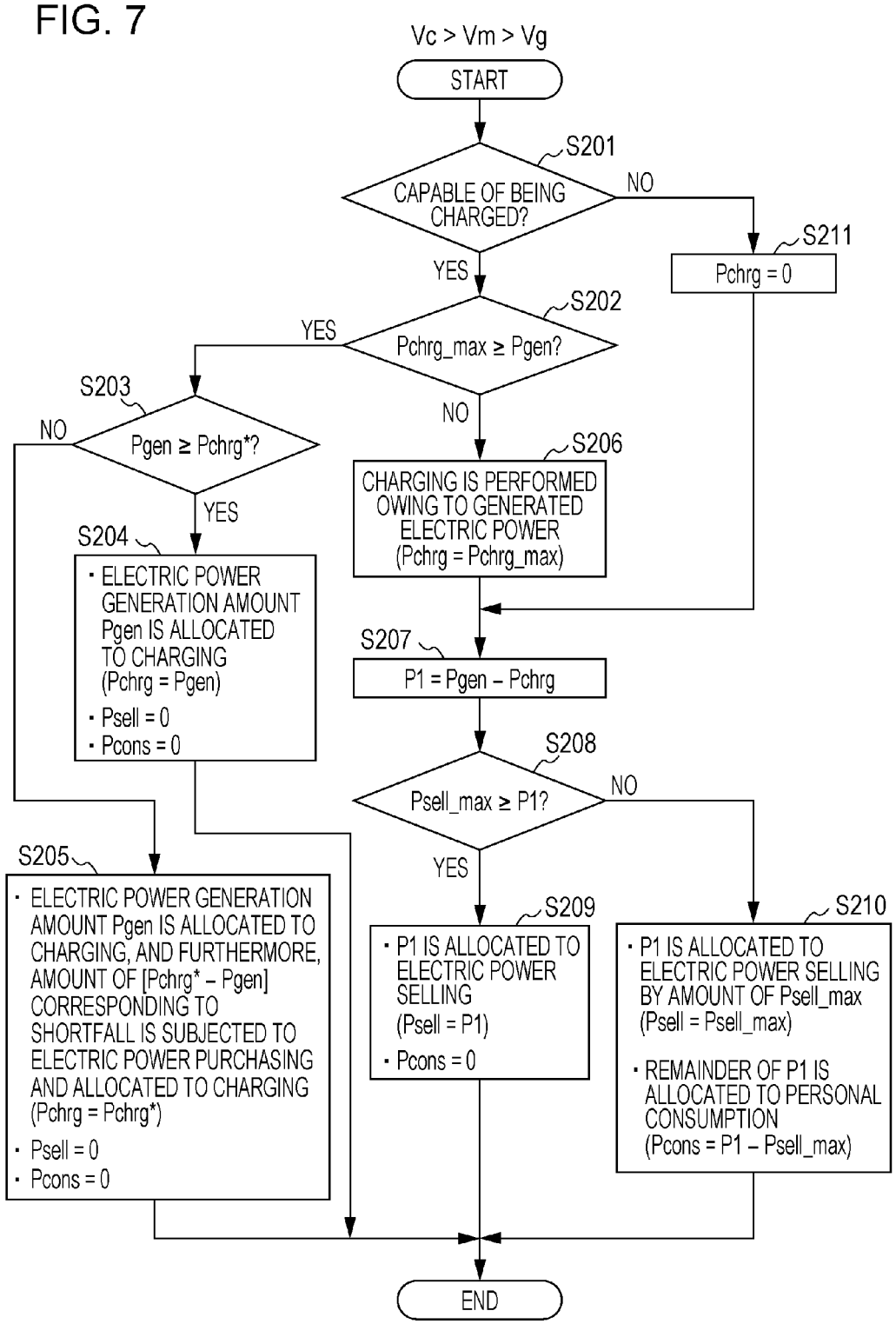
FIG. 7 is a flowchart illustrating a flow of processing performed in the electric power controller when a charging instruction is issued by the electric power/point management server.

First, a case where, in the processing illustrated in FIG. 5 and FIG. 6, it has been determined that a magnitude relationship between the electric power selling price Vm, the electric power purchasing price Vg, and the charging profit price Vc is "Vc>Vm>Vg" will be described on the basis of a flowchart in FIG. 7. First, in Step S201, it is determined whether or not the storage battery module 30 is in a state of being capable of being charged. The charge amount information indicating the charge amount of the storage battery module 30 at the time of the determination is acquired, it is confirmed whether or not the amount of space capable of being charged exists, and hence it is determined whether or not the storage battery module 30 is capable of being charged. When, in Step S201, it is determined that the storage battery module 30 is capable of being charged, the processing proceeds to Step S202 (Step S201: Yes).

Next, in Step S202, it is determined whether or not the charge allowable amount Pchrg_max is greater than or equal to the electric power generation amount Pgen. It may be possible to obtain the electric power generation amount Pgen by acquiring the electric power generation amount information indicating the electric power generation amount from the electric power generation equipment 40. When the charge allowable amount Pchrg_max is greater than or equal to the electric power generation amount Pgen, the processing proceeds to Step S203 (Step S202: Yes).

Next, in Step S203, it is determined whether or not the electric power generation amount Pgen is greater than or equal to the prescribed charge amount Pchrg*. When the electric power generation amount Pgen is greater than or equal to the prescribed charge amount Pchrg*, the processing proceeds to Step S204 (Step S203: Yes). In addition, in Step S204, the control unit 11 controls the power conditioner 13 so as to allocate the generated electric power to charging the storage battery module 30.

Since the charge allowable amount Pchrg_max is greater than or equal to the electric power generation amount Pgen, it may be possible to allocate the whole electric power generation amount Pgen to charging. Accordingly, "the charge amount Pchrg=the electric power generation amount Pgen" is satisfied. Since, among the electric power selling price Vm, the electric power purchasing price Vg, and the charging profit price Vc, the charging profit price Vc is the highest, it is desirable to perform charging whose amount is as large as possible. In addition, since the whole electric power generation amount Pgen is allocated to charging, "the electric power selling amount Psell=0" and "the personal consumption amount Pcons=0" are satisfied.

On the other hand, when, in Step S203, it is determined that the electric power generation amount Pgen is not greater than or equal to the prescribed charge amount Pchrg*, the processing proceeds to Step S205 (Step S203: No). In addition, in Step S205, the control unit 11 controls the power conditioner 13 so as to allocate the whole electric power generation amount Pgen to charging. In this regard, however, since the electric power generation amount Pgen is less than the prescribed charge amount Pchrg*, it is difficult to meet the prescribed charge amount Pchrg* only using the electric power generation amount Pgen. Therefore, the control unit 11 controls the power conditioner 13 so as to perform electric power purchasing by the amount of "the prescribed charge amount Pchrg*-the electric power generation amount Pgen" corresponding to a shortfall and allocate that amount to charging. Accordingly, "the charge amount Pchrg=the prescribed charge amount Pchrg*" is satisfied, and it may be possible to perform charging corresponding to the prescribed charge amount Pchrg*. In addition, since the whole electric power generation amount Pgen is allocated to charging, "the electric power selling amount Psell=0" and "the personal consumption amount Pcons=0" are satisfied.

The description returns to Step S202. When, in Step S202, it is determined that the charge allowable amount Pchrg_max is less than the electric power generation amount Pgen, the processing proceeds to Step S206 (Step S202: No). In addition, in Step S206, the control unit 11 controls the power conditioner 13 so as to allocate the generated electric power to charging. In this regard, however, since the charge allowable amount Pchrg_max is less than the electric power generation amount Pgen and it is difficult to allocate the whole electric power generation amount Pgen to charging, charging is performed with the charge allowable amount Pchrg_max being set as an upper limit. Accordingly, "the charge amount Pchrg=the charge allowable amount Pchrg_max" is satisfied.

Next, in Step S207, a difference between the electric power generation amount Pgen and the charge amount Pchrg is calculated as P1. The P1 indicates surplus electric power that has remained without being used for charging when the electric power generation amount Pgen has been allocated to charging. Next, in Step S208, it is determined whether or not the electric power selling allowable amount Psell_max is greater than or equal to the P1. When the electric power selling allowable amount Psell_max is greater than or equal to the P1, the processing proceeds to Step S209 (Step S208: Yes).

In addition, in Step S209, the control unit 11 controls the power conditioner 13 so as to allocate the whole P1 to electric power selling. Accordingly, "the electric power selling amount Psell=the P1" is satisfied. This is because while the electric power/point management server 200 has issued the charging instruction and hence charging has been performed, electric power has remained, and furthermore, since the electric power selling price Vm is higher than the electric power purchasing price Vg, it is appropriate to allocate whole surplus generated electric power to electric power selling. Accordingly, it is difficult to perform the personal consumption of the generated electric power, and "the personal consumption amount Pcons=0" is satisfied.

On the other hand, when, in Step S208, it is determined that the electric power selling allowable amount Psell_max is less than the P1, the processing proceeds to Step S210 (Step S208: No). In addition, in Step S210, the control unit 11 controls the power conditioner 13 so as to allocate the P1 to electric power selling. This is because since the electric power selling price Vm is higher than the electric power purchasing price Vg, it is appropriate to preferably allocate the surplus generated electric power to electric power selling. In this regard, however, since the electric power selling allowable amount Psell_max is less than the P1 and it is difficult to allocate the whole P1 to electric power selling, electric power selling is performed with the electric power selling allowable amount Psell_max being set as an upper limit. Accordingly, the remainder of the P1 occurs. Therefore, while "the personal consumption amount Pcons=the P1−the electric power selling allowable amount Psell_max" is assumed, it is desirable to allocate a difference between the P1 and the electric power selling allowable amount Psell_max corresponding to the electric power selling amount to personal consumption.

The description returns to Step S201. When, in Step S201, it is determined that the storage battery module 30 is not capable of being charged, the processing proceeds to Step S211 (Step S201: No). In addition, in Step S211, the charge amount Pchrg is set to "0". This is because, as described above, since the electric power/point management server 200 regularly acquires an electric storage amount in the storage battery module 30 for the sake of point issuing, it is supposed that the storage battery module 30 is not determined not to be capable of being charged if the charging instruction is issued with the electric storage amount being recognized. Accordingly, in this case, "the charge amount Pchrg=0" is satisfied. In addition, in this case, as error processing, it is desirable to notify the electric storage equipment holder of that effect owing to a display in the display unit 22 or the like or notify the electric power/point management server 200 of that effect.

In this way, since the charging instruction has been issued from the electric power/point management server 200, furthermore, the relationship between the electric power selling price Vm, the electric power purchasing price Vg, and the charging profit price Vc is "Vc>Vm>Vg", and the charging profit price Vc is the highest, the processing is performed so as to prioritize charging.

Figure 8:
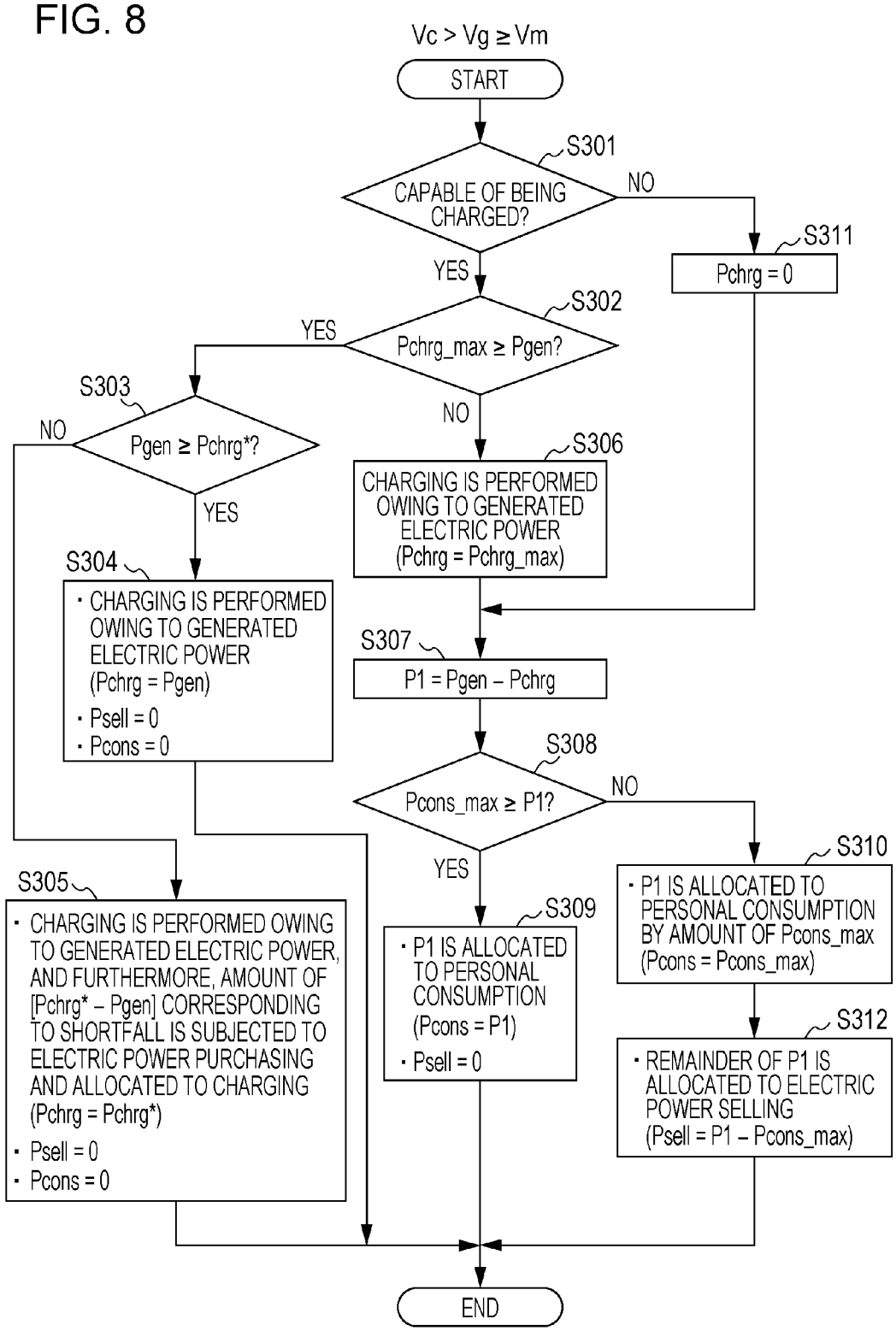
FIG. 8 is a flowchart illustrating a flow of processing performed in the electric power controller when a charging instruction is issued by the electric power/point management server.

Next, a case where the charging instruction has been issued from the electric power/point management server 200 and furthermore, it has been determined that the magnitude relationship between the electric power selling price Vm, the electric power purchasing price Vg, and the charging profit price Vc is "Vc>Vg≥Vm" will be described on the basis of a flowchart in FIG. 8. In addition, since Steps S301 to S307 are the same as Steps S201 to S207 in the flowchart in FIG. 7, the description thereof will be omitted. The description will be performed on and after Step S308. In addition, since Step S311 is the same as Step S211 in the flowchart in FIG. 7, the description thereof will be omitted.

In Step S308, it is determined whether or not the total personal consumption amount Pcons_max is greater than or equal to the P1. As described above, the P1 indicates surplus electric power that has remained when the electric power generation amount Pgen has been allocated to charging. When the total personal consumption amount Pcons_max is greater than or equal to the P1, the processing proceeds to Step S309 (Step S308: Yes).

In addition, in Step S309, the control unit 11 controls the power conditioner 13 so as to allocate the whole P1 to personal consumption. Accordingly, "the personal consumption amount Pcons=the P1" is satisfied. This is because since the electric power selling price Vm is lower than the electric power purchasing price Vg, allocating the surplus generated electric power to personal consumption has an economic benefit compared with selling the surplus generated electric power. Since the total personal consumption amount Pcons_max is greater than or equal to the P1, it may be possible to regard the whole P1 as the personal consumption amount Pcons. In addition, since it is difficult to perform electric power selling, "the electric power selling amount Psell=0" is satisfied.

On the other hand, when, in Step S308, it is determined that the total personal consumption amount Pcons_max is less than the P1, the processing proceeds to Step S310 (Step S308: No). In addition, in Step S310, the control unit 11 controls the power conditioner 13 so as to allocate the P1 to personal consumption. This is because since the electric power selling price Vm is lower than the electric power purchasing price Vg, allocating the surplus generated electric power to personal consumption has an economic benefit compared with selling the surplus generated electric power. In this regard, however, since the total personal consumption amount Pcons_max is less than the P1, electric power is allocated to personal consumption with the total personal consumption amount Pcons_max being set as an upper limit. Accordingly, "the personal consumption amount Pcons=the total personal consumption amount Pcons_max" is satisfied.

Since the total personal consumption amount Pcons_max is less than the P1, the remainder of the P1 occurs even if the P1 is allocated to personal consumption. In addition, the generated electric power has already been allocated to charging and personal consumption. Therefore, in Step S312, the control unit 11 controls the power conditioner 13 so as to allocate the remainder of the P1 to electric power selling with "the electric power selling amount Psell=the P1−the total personal consumption amount Pcons_max" being assumed.

In this way, since the charging instruction has been issued from the electric power/point management server 200, furthermore, the relationship between the electric power selling price Vm, the electric power purchasing price Vg, and the charging profit price Vc is "Vc>Vg≥Vm", and the charging profit price Vc is the highest, the processing is performed so as to prioritize charging.

Figure 9:
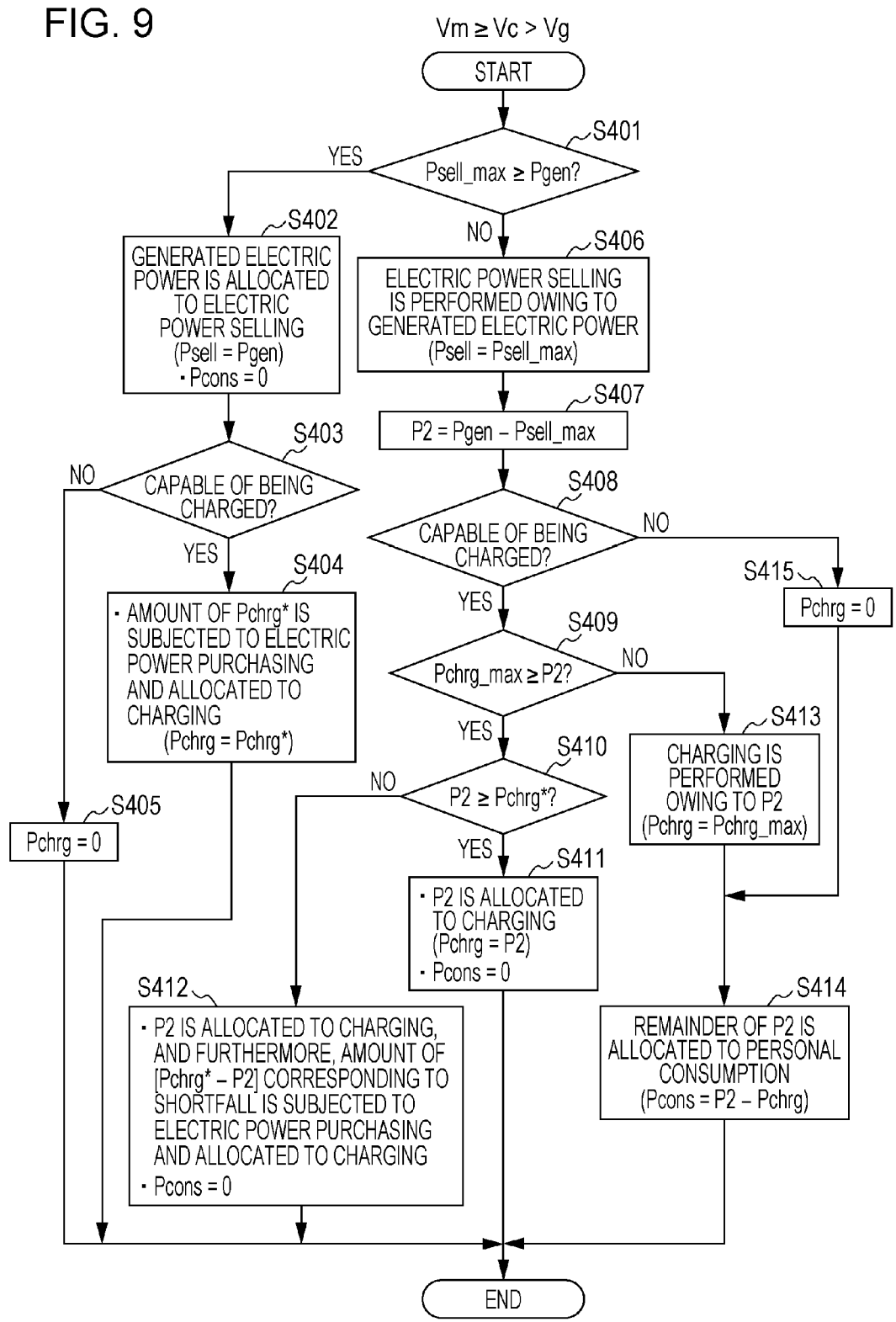
FIG. 9 is a flowchart illustrating a flow of processing performed in the electric power controller when a charging instruction is issued by the electric power/point management server.

Next, a case where the charging instruction has been issued from the electric power/point management server 200 and furthermore, it has been determined that a relationship between the electric power selling price Vm, the electric power purchasing price Vg, and the charging profit price Vc is "Vm≥Vc>Vg" will be described on the basis of a flowchart in FIG. 9. In addition, since Step S405 and Step 415 are the same as Step S211 in the flowchart in FIG. 7, the description thereof will be omitted.

First, in Step S401, it is determined whether or not the electric power selling allowable amount Psell_max is greater than or equal to the electric power generation amount Pgen. When the electric power selling allowable amount Psell_max is greater than or equal to the electric power generation amount Pgen, the processing proceeds to Step S402 (Step S401: Yes). In addition, in Step S402, the control unit 11 controls the power conditioner 13 so as to allocate the generated electric power to electric power selling. Since the electric power selling allowable amount Psell_max is greater than or equal to the electric power generation amount Pgen, it may be possible to allocate the whole electric power generation amount Pgen to electric power selling. Accordingly, "the electric power selling amount Psell=the electric power generation amount Pgen" is satisfied. Since the electric power selling price Vm is the highest, allocating the whole electric power generation amount Pgen to electric power selling has an economic benefit. Therefore, the whole generated electric power is allocated to electric power selling in this way. In addition, since the whole electric power generation amount Pgen is regarded as the electric power selling amount Psell, "the personal consumption amount Pcons=0" is satisfied.

Next, in Step S403, it is determined whether or not the storage battery module 30 is capable of being charged. When the storage battery module 30 is capable of being charged, the processing proceeds to Step S404. In addition, in Step S404, the control unit 11 controls the power conditioner 13 so as to charge the storage battery module 30 owing to electric power purchasing with "the charge amount Pchrg=the Pchrg*" being assumed. This is because the electric power purchasing price Vg is the lowest.

The description returns to Step S401. When, in Step S401, it is determined that the electric power selling allowable amount Psell_max is less than the electric power generation amount Pgen, the processing proceeds to Step S406 (Step S401: No). In addition, in Step S406, the control unit 11 controls the power conditioner 13 so as to allocate the generated electric power to electric power selling. In this regard, however, since the electric power selling allowable amount Psell_max is less than the electric power generation amount Pgen, it is difficult to allocate the whole electric power generation amount Pgen to electric power selling, and electric power selling is performed with the electric power selling allowable amount Psell_max being set as an upper limit. Accordingly, "the electric power selling amount Psell=the electric power selling allowable amount Psell_max" is satisfied. This is because since the electric power selling price Vm is the highest, performing electric power selling provides an economic benefit for the electric storage equipment holder.

Next, in Step S407, a difference between the electric power generation amount Pgen and the electric power selling allowable amount Psell_max is calculated as P2. Since the electric power generation amount Pgen is greater than or equal to the electric power selling allowable amount Psell_max, when electric power selling is performed with "the electric power selling amount Psell=the electric power selling allowable amount Psell_max" being assumed, the remainder of the electric power generation amount Pgen occurs. This P2 indicates electric power that has remained without being used for electric power selling.

Next, in Step S408, it is determined whether or not the storage battery module 30 is capable of being charged. When the storage battery module 30 is capable of being charged, the processing proceeds to Step S409 (Step S408: Yes).

Next, in Step S409, it is determined whether or not the charge allowable amount Pchrg_max is greater than or equal to the P2. When the charge allowable amount Pchrg_max is greater than or equal to the P2, the processing proceeds to Step S410 (Step S409: Yes).

Next, in Step S410, it is determined whether or not the P2 is greater than or equal to the prescribed charge amount Pchrg*. The P2 is greater than or equal to the prescribed charge amount Pchrg*, the processing proceeds to Step S411 (Step S410: Yes). In addition, in Step S411, the control unit 11 controls the power conditioner 13 so as to allocate the whole P2 to charging. As described above, since the electric power selling allowable amount Psell_max is less than the electric power generation amount Pgen, it is difficult to allocate the whole electric power generation amount Pgen to electric power selling. However, since the storage battery module 30 is capable of being charged, and furthermore, the charging profit price Vc is greater than or equal to the electric power purchasing price Vg, if it is difficult to perform electric power selling, performing charging has an economic benefit. Accordingly, "the charge amount Pchrg=the P2" is satisfied.

On the other hand, when, in Step S410, it is determined that the charge allowable amount Pchrg_max is less than the P2, the processing proceeds to Step S412 (Step S410: No). In addition, in Step S412, the control unit 11 controls the power conditioner 13 so as to allocate the whole P2 to charging. In this regard, however, since the P2 is less than the prescribed charge amount Pchrg*, it is difficult to meet the prescribed charge amount Pchrg* only using the P2. Therefore, the control unit 11 controls the power conditioner 13 so as to compensate for "the prescribed charge amount Pchrg*−the P2" corresponding to a shortfall, by performing electric power purchasing, and perform charging with "the charge amount Pchrg=the prescribed charge amount Pchrg*" being assumed. In addition, since first the generated electric power is allocated to electric power selling, and furthermore, the remainder of the P2 is allocated to charging, it is difficult to allocate the electric power generation amount Pgen to personal consumption, and "the personal consumption amount Pcons=0" is satisfied.

The description returns to Step S409. When, in Step S409, it is determined that the charge allowable amount Pchrg_max is less than the P2, the processing proceeds to Step S413 (Step S409: No). In addition, in Step S413, the control unit 11 controls the power conditioner 13 so as to allocate the P2 to charging. In this regard, however, since the charge allowable amount Pchrg_max is less than the P2 and it is difficult to allocate the whole P2 to charging, charging is performed with the charge allowable amount Pchrg_max being set as an upper limit. Accordingly, "the charge amount Pchrg=the charge allowable amount Pchrg_max" is satisfied.

Next, in Step S414, the control unit 11 controls the power conditioner 13 so as to allocate, to personal consumption, the remainder of the P2 allocated to charging in the above-mentioned Step S413. Accordingly, "the personal consumption amount Pcons=the P2−the charge allowable amount Pchrg_max" is satisfied.

In this way, since the relationship between the electric power selling price Vm, the electric power purchasing price Vg, and the charging profit price Vc is "Vm≥Vc>Vg", and the electric power selling price Vm is the highest, processing is performed so as to prioritize electric power selling while charging is performed so as to meet the prescribed charge amount Pchrg*.

Figure 10:
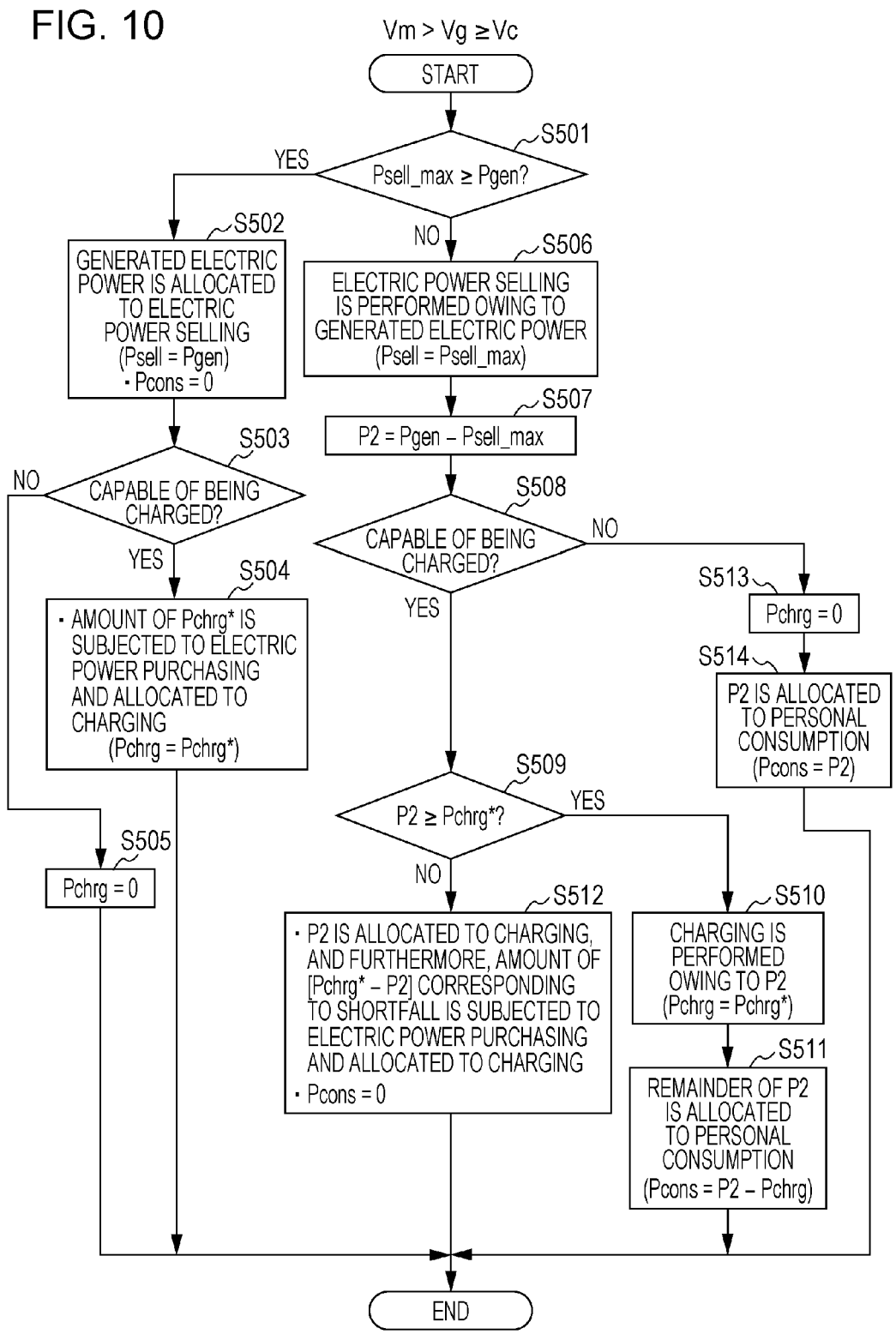
FIG. 10 is a flowchart illustrating a flow of processing performed in the electric power controller when a charging instruction is issued by the electric power/point management server.

Next, a case where the charging instruction has been issued from the electric power/point management server 200 and furthermore, it has been determined that the relationship between the electric power selling price Vm, the electric power purchasing price Vg, and the charging profit price Vc is "Vm>Vg≥Vc" will be described on the basis of a flowchart in FIG. 10. In addition, since Steps S501 to S508 are the same as Steps S401 to S408 in the flowchart in FIG. 9, the description thereof will be omitted.

When, in Step S508, it is determined that the storage battery module 30 is capable of being charged, the processing proceeds to Step S509 (Step S508: Yes). Next, in Step S509, it is determined whether or not the P2 is greater than or equal to the prescribed charge amount Pchrg*. The P2 indicates electric power that has remained without being used for electric power selling when the generated electric power has been allocated to the electric power selling with "the electric power selling amount Psell=the electric power selling allowable amount Psell_max" being assumed. When the P2 is greater than or equal to the prescribed charge amount Pchrg*, the processing proceeds to Step S510 (Step S509: Yes). In addition, in Step S510, the control unit 11 controls the power conditioner 13 so as to allocates, to charging, part of the P2, which corresponds to the prescribed charge amount Pchrg*. Accordingly, "the charge amount Pchrg=the prescribed charge amount Pchrg*" is satisfied. Accordingly, it is possible to meet a charge amount prescribed by the electric power/point management server 200.

Since the P2 is greater than or equal to the prescribed charge amount Pchrg*, when, in Step S510, charging is performed with "the charge amount Pchrg=the prescribed charge amount Pchrg*" being assumed, a remainder corresponding to "the P2−the charge amount Pchrg" occurs. Therefore, next, in Step S511, the control unit 11 controls the power conditioner 13 so as to allocate "the P2−the charge amount Pchrg" serving as the remainder of the P2 to personal consumption. This is because since the electric power selling has already been preferably performed and charging corresponding to an amount prescribed by the electric power/point management server 200 has already been performed, if the remainder of electric power still occurs, allocating the remainder of electric power to personal consumption is effective.

The description returns to Step S509. When, in Step S509, it is determined that the P2 is less than the prescribed charge amount Pchrg*, the processing proceeds to Step S512 (Step S509: No). In addition, in Step S512, the control unit 11 controls the power conditioner 13 so as to allocate the P2 to charging. In this regard, however, since the P2 is less than the prescribed charge amount Pchrg*, it is difficult to meet the prescribed charge amount Pchrg* only using the P2. Therefore, the control unit 11 controls the power conditioner 13 so as to compensate for "the prescribed charge amount Pchrg*–the P2" corresponding to a shortfall, by performing electric power purchasing, and perform charging with "the charge amount Pchrg=the prescribed charge amount Pchrg*" being assumed. In addition, since the electric power generation amount Pgen is allocated to electric power selling, and furthermore, the P2 is allocated to charging, it is difficult to allocate the generated electric power to personal consumption, and "the personal consumption amount Pcons=0" is satisfied.

The description returns to Step S508. When, in Step S508, it is determined that the storage battery module 30 is not capable of being charged, the processing proceeds to Step S513 (Step S508: No). In addition, in Step S513, "the charge amount Pchrg=0" is satisfied, and furthermore, the same error processing as that described in Step S211 is performed. Next, in Step S514, the control unit 11 controls the power conditioner 13 so as to allocate the P2 to personal consumption.

In this way, since the relationship between the electric power selling price Vm, the electric power purchasing price Vg, and the charging profit price Vc is "Vm>Vg≥Vc", and the electric power selling price Vm is the highest, processing is performed so as to prioritize electric power selling while charging is performed so as to meet the prescribed charge amount Pchrg*.

Figure 11:
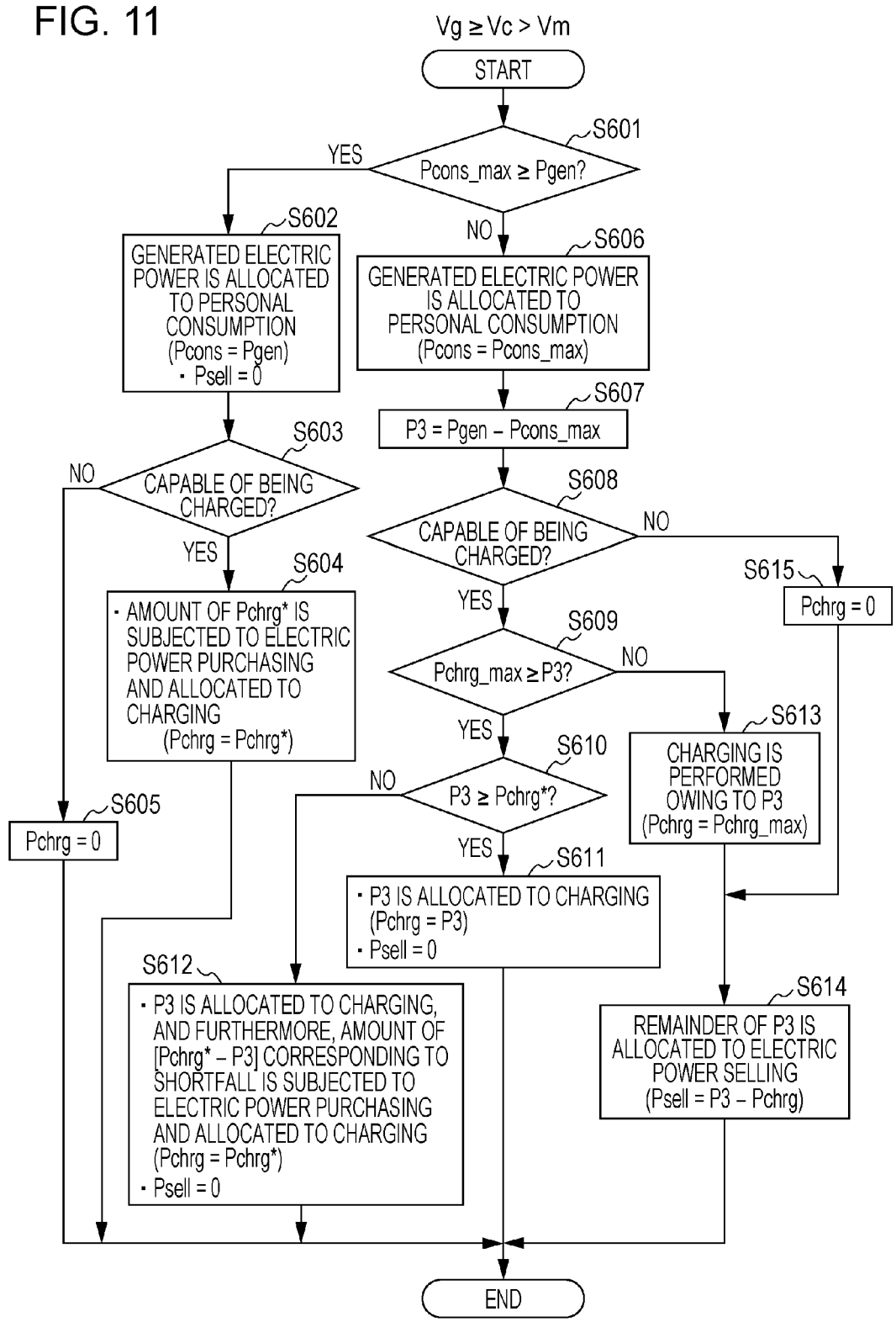
FIG. 11 is a flowchart illustrating a flow of processing performed in the electric power controller when a charging instruction is issued by the electric power/point management server.

Next, a case where the charging instruction has been issued from the electric power/point management server 200 and furthermore, it has been determined that the relationship between the electric power selling price Vm, the electric power purchasing price Vg, and the charging profit price Vc is "Vg≥Vc>Vm" will be described on the basis of a flowchart in FIG. 11. In addition, since Steps S605 and S615 are the same as Step S211 in the flowchart in FIG. 7, the description thereof will be omitted.

First, in Step S601, it is determined whether or not the total personal consumption amount Pcons_max is greater than or equal to the electric power generation amount Pgen. When the total personal consumption amount Pcons_max is greater than or equal to the electric power generation amount Pgen, the processing proceeds to Step S602 (Step S601: Yes).

In addition, in Step S602, the control unit 11 controls the power conditioner 13 so as to allocate the generated electric power to personal consumption. Since the total personal consumption amount Pcons_max is greater than or equal to the electric power generation amount Pgen, it may be possible to allocate the whole electric power generation amount Pgen to personal consumption. Accordingly, "the personal consumption amount Pcons=the electric power generation amount Pgen" is satisfied. This is because since the electric power selling price Vm is the lowest, and the charging profit price Vc is the second lowest, even if the electric power generation amount Pgen is allocated to charging or electric power selling, the electric storage equipment holder does not obtain an economic benefit. In addition, since the whole electric power generation amount Pgen is allocated to personal consumption, the electric power selling is not performed, and "the Psell=0" is satisfied.

Next, in Step S603, it is determined whether or not the storage battery module 30 is capable of being charged. When the storage battery module 30 is capable of being charged, the processing proceeds to Step S604. In addition, in Step S604, the control unit 11 controls the power conditioner 13 so as to perform electric power purchasing corresponding to the prescribed charge amount Pchrg* and perform charging. Accordingly, "the charge amount Pchrg=the prescribed charge amount Pchrg*" is satisfied. Since, in Step S602, the electric power generation amount Pgen has been allocated to personal consumption, it is desirable to perform charging owing to electric power purchasing. Accordingly, it may be possible to meet the prescribed charge amount Pchrg* from the electric power/point management server 200.

The description returns to Step S601. When, in Step S601, it is determined that the total personal consumption amount Pcons_max is less than the electric power generation amount Pgen, the processing proceeds to Step S606 (Step S601: No). In addition, in Step S606, the control unit 11 controls the power conditioner 13 so as to allocate the generated electric power to personal consumption. In this regard, however, since the total personal consumption amount Pcons_max is less than the electric power generation amount Pgen, the electric power generation amount Pgen is allocated to personal consumption with the total personal consumption amount Pcons_max being set as an upper limit. Accordingly, "the personal consumption amount Pcons=the total personal consumption amount Pcons_max" is satisfied. This is because since the electric power selling price Vm is the lowest, and the charging profit price Vc is the second lowest, even if the electric power generation amount Pgen is allocated to charging or electric power selling, the electric storage equipment holder does not obtain an economic benefit.

Next, in Step S607, "the electric power generation amount Pgen–the total personal consumption amount Pcons_max" is calculated as P3. Since the total personal consumption amount Pcons_max is less than the electric power generation amount Pgen, the P3 indicates electric power that has remained with the electric power generation amount Pgen being allocated to personal consumption.

Next, in Step S608, it is determined whether or not the storage battery module 30 is capable of being charged. When, in Step S608, it is determined that the storage battery module 30 is capable of being charged, the processing proceeds to Step S609 (Step S608: Yes). Next, in Step S609, it is determined whether or not the charge allowable amount Pchrg_max is greater than or equal to the P3.

When the charge allowable amount Pchrg_max is greater than or equal to the P3, the processing proceeds to Step S610 (Step S609: Yes). In addition, in Step S610, it is determined whether or not the P3 is greater than or equal to the prescribed charge amount Pchrg*. When the P3 is greater than or equal to the prescribed charge amount Pchrg*, the processing proceeds to Step S611 (Step S610: Yes).

In addition, in Step S611, the control unit 11 controls the power conditioner 13 so as to allocate the whole P3 to charging. Accordingly, "the Pchrg=the P3" is satisfied. This is because since the electric power selling price Vm is lower than the charging profit price Vc, allocating the remainder of electric power to charging provides an economic benefit for the electric storage equipment holder, compared with allocating the remainder of electric power to electric power selling. In addition, since the whole P3 is allocated to charging, electric power selling is not performed, and "the Psell=0" is satisfied.

On the other hand, when, in Step S610, it is determined that the P3 is not greater than or equal to the prescribed charge amount Pchrg*, the processing proceeds to Step S612 (Step S610: No). In addition, in Step S612, the control unit 11 controls the power conditioner 13 so as to allocate the P3 to charging. In this regard, however, since the P3 is less than the prescribed charge amount Pchrg*, it is difficult to perform charging corresponding to the prescribed charge amount Pchrg* only using the P3. Therefore, the control unit 11 controls the power conditioner 13 so as to compensate for "the prescribed charge amount Pchrg*-the P3" corresponding to a shortfall, by performing electric power purchasing. Accordingly, "the charge amount Pchrg=the prescribed charge amount Pchrg*" is satisfied, and it may be possible to perform charging corresponding to the prescribed charge amount Pchrg* serving as a charge amount prescribed by the electric power/point management server 200. In addition, since the whole P3 is allocated to charging, "the electric power selling amount Psell=0" is satisfied.

The description returns to Step S609. When, in Step S609, the charge allowable amount Pchrg_max is less than the P3, the processing proceeds to Step S613 (Step S609: No). In addition, in Step S613, the control unit 11 controls the power conditioner 13 so as to allocate the P3 to charging. This is because since the charging profit price Vc is higher than the electric power selling price Vm, allocating the remainder of electric power to electric storage provides an economic benefit for the electric storage equipment holder. In this regard, however, since the charge allowable amount Pchrg_max is less than the P3 and it is difficult to allocate the whole P3 to charging, charging is performed with the charge allowable amount Pchrg_max being set as an upper limit. Accordingly, "the charge amount Pchrg=the charge allowable amount Pchrg_max" is satisfied.

It is difficult to allocate the whole P3 to charging in the above-mentioned Step S613. Accordingly, a remainder corresponding to "the P3-the charge amount Pchrg" occurs. Therefore, next, in Step S614, the control unit 11 controls the power conditioner 13 so as to allocate the remainder of electric power to electric power selling. Accordingly, "the electric power selling amount Psell=the P3-the charge amount Pchrg" is satisfied. The reason why electric power selling is performed in this way is because when the remainder of electric power occurs even if the electric power generation amount Pgen has been allocated to personal consumption and further allocated to charging, it is appropriate to sell the remainder of electric power.

In this way, since the relationship between the electric power selling price Vm, the electric power purchasing price Vg, and the charging profit price Vc is "Vg≥Vc>Vm", the electric power selling price Vm is low, and the charging profit price Vc is high, processing is performed so as to prioritize personal consumption while charging is performed so as to meet the prescribed charge amount Pchrg*.

Figure 12:
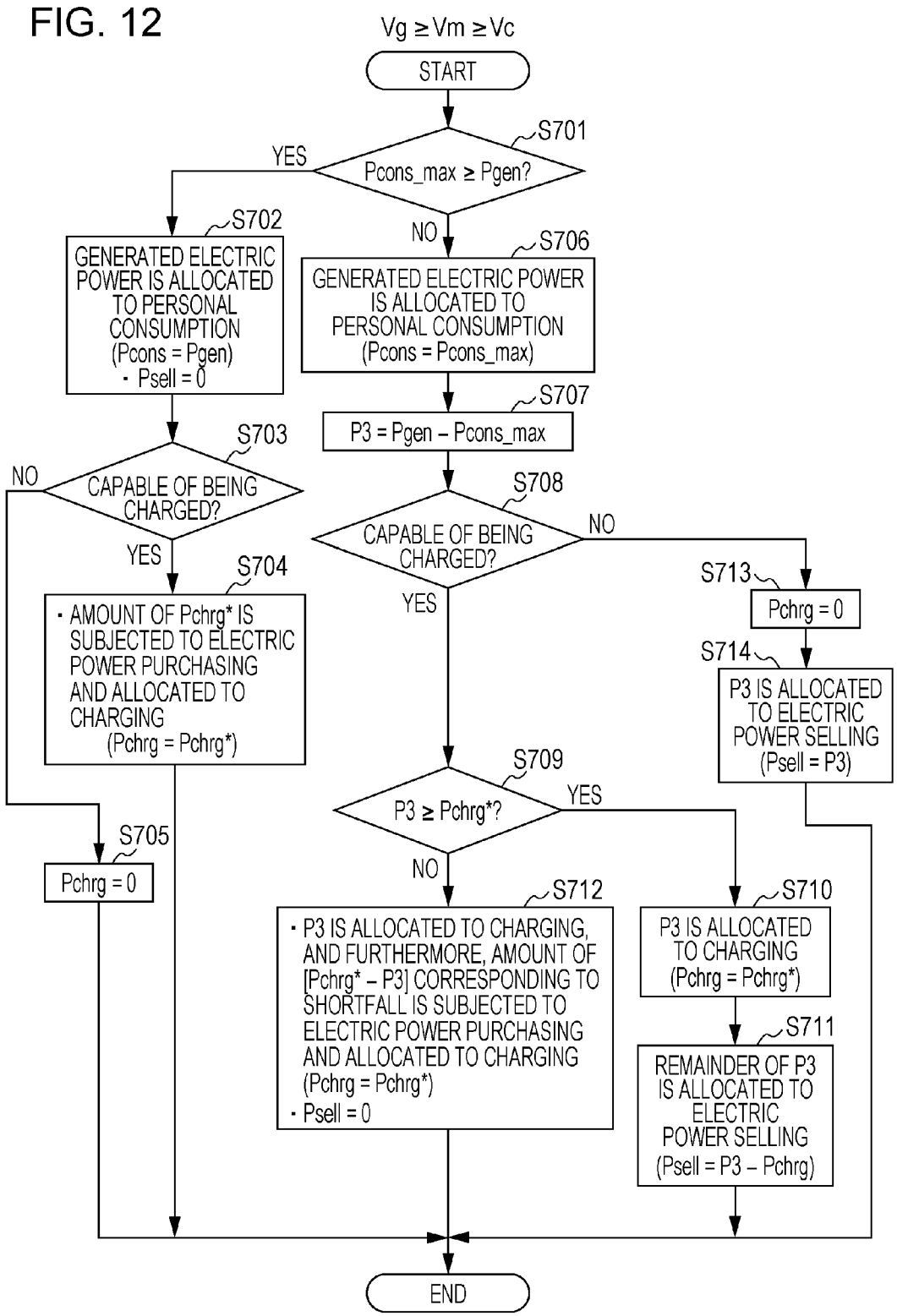
FIG. 12 is a flowchart illustrating a flow of processing performed in the electric power controller when a charging instruction is issued by the electric power/point management server.

Next, a case where the charging instruction has been issued from the electric power/point management server 200 and furthermore, it has been determined that the relationship between the electric power selling price Vm, the electric power purchasing price Vg, and the charging profit price Vc is "Vg≥Vm≥Vc" will be described on the basis of a flowchart in FIG. 12. In addition, since Steps S701 to S708 are the same as Steps S601 to S608 in the flowchart in FIG. 11, the description thereof will be omitted. The description will be performed on and after Step S709.

In Step S709, it is determined whether or not the P3 is greater than or equal to the prescribed charge amount Pchrg*. When the P3 is greater than or equal to the prescribed charge amount Pchrg*, the processing proceeds to Step S710 (Step S709: Yes).

In addition, in Step S710, the control unit 11 controls the power conditioner 13 so as to allocate the P3 to charging. Since the P3 is greater than or equal to the prescribed charge amount Pchrg*, it may be possible to meet the prescribed charge amount Pchrg* by allocating the P3 to charging. Accordingly, "the charge amount Pchrg=the prescribed charge amount Pchrg*" is satisfied.

Since the P3 is greater than or equal to the prescribed charge amount Pchrg*, when, in Step S710, the P3 is allocated with "the charge amount Pchrg=the prescribed charge amount Pchrg*" being assumed, the remainder of the P3 occurs. Therefore, next, in Step S711, the control unit 11 controls the power conditioner 13 so as to allocate the remainder of electric power, "the P3-the charge amount Pchrg", to electric power selling. Accordingly, "the electric power selling amount Psell=the P3-the charge amount Pchrg" is satisfied. This is because when the remainder of electric power occurs even if the electric power generation amount Pgen has been allocated to personal consumption and further allocated to charging, it is appropriate to sell the remainder of electric power.

On the other hand, when, in Step S709, it is determined that the P3 is not greater than or equal to the prescribed charge amount Pchrg*, the processing proceeds to Step S712 (Step S709: No). In addition, in Step S712, the control unit 11 controls the power conditioner 13 so as to allocate the P3 to charging. In this regard, however, since the P3 is less than the prescribed charge amount Pchrg*, it is difficult to perform charging corresponding to the prescribed charge amount Pchrg* only using the P3. Therefore, the control unit 11 controls the power conditioner 13 so as to compensate for "the prescribed charge amount Pchrg*-the P3" corresponding to a shortfall, by performing electric power purchasing. Accordingly, "the charge amount Pchrg=the prescribed charge amount Pchrg*" is satisfied, and it may be possible to perform charging corresponding to the prescribed charge amount Pchrg* serving as a charge amount prescribed by the electric power/point management server 200. In addition, since the whole P3 is allocated to charging, electric power selling is not performed, and "the electric power selling amount Psell=0" is satisfied.

The description returns to Step S708. When, in Step S708, it is determined that the storage battery module 30 is not capable of being charged, the processing proceeds to Step S713 (Step S708: No). In addition, in Step S713, "the charge amount Pchrg=0" is satisfied, and furthermore, the same error processing as that described in Step S211 is performed. Next, in Step S714, the control unit 11 controls the power conditioner 13 so as to allocate the P3 to electric power selling. This is because since personal consumption corresponding to the total personal consumption amount Pcons_max has already been performed and furthermore, it is difficult to perform charging, it is appropriate to allocate the remainder of electric power to electric power selling.

In this way, since the relationship between the electric power selling price Vm, the electric power purchasing price Vg, and the charging profit price Vc is "Vg≥Vm≥Vc", the electric power purchasing price Vg is high, and the charging profit price Vc is low, processing is performed so as to prioritize personal consumption while charging is performed so as to meet the prescribed charge amount Pchrg*.

[1-7. Processing in Electric Power Controller: Processing Performed when Electric Power Selling Instruction is Received]

Next, electric power control processing performed in the electric power controller 10 when an electric power selling instruction has been issued from the electric power/point management server 200 will be described with reference to FIG. 13 to FIG. 18. The processing is performed on the basis of the relationship between the electric power selling price Vm, the electric power purchasing price Vg, and the charging profit price Vc, obtained owing to the processing illustrated in FIG. 5 and FIG. 6. In addition, in the following description, it is assumed that, between the electric storage equipment holder and the point issuer, a contract has been concluded where it is possible for the electric storage equipment holder to allocate generated electric power to personal consumption and it is possible to allocate electric power to personal consumption.

In the following description, it is assumed that an electric power selling amount prescribed in an electric power selling instruction from the electric power management unit 221 in the electric power/point management server 200 is a "prescribed electric power selling amount Psell*". It is assumed that, under the condition of "the Psell*≤the Psell_max", the electric power management unit 211 in the electric power/point management server 200 issues the electric power selling instruction so as to perform electric power selling corresponding to "the prescribed electric power selling amount Psell*". This is because even if electric power selling is prescribed whose amount exceeds the electric power selling allowable amount Psell_max serving as a maximum electric power the electric storage equipment 100 can subjects to electric power selling, it is difficult to subject, to electric power selling, an amount greater than or equal to the electric power selling allowable amount Psell_max. When a new electric power controller 10 has been connected, the electric power/point management server 200 requests the electric power controller 10 to transmit data indicating the electric power selling allowable amount Psell_ max, and acquires the electric power selling allowable amount Psell_max. In addition, it is desirable that the acquired electric power selling allowable amount Psell_max is stored in the holder database 230 with respect to the electric storage equipment 100 of each electric storage equipment holder. In addition, when issuing the electric power selling instruction to the electric power controller 10, the electric power management unit 221 refers to the electric power selling allowable amount Psell_max, and issues the electric power selling instruction with the electric power selling allowable amount Psell_max being set as an upper limit. The definitions of the other terms are the same as those in [1-6. Processing in Electric Power Controller: Processing Performed when Charging Instruction Is Received].

Figure 13:
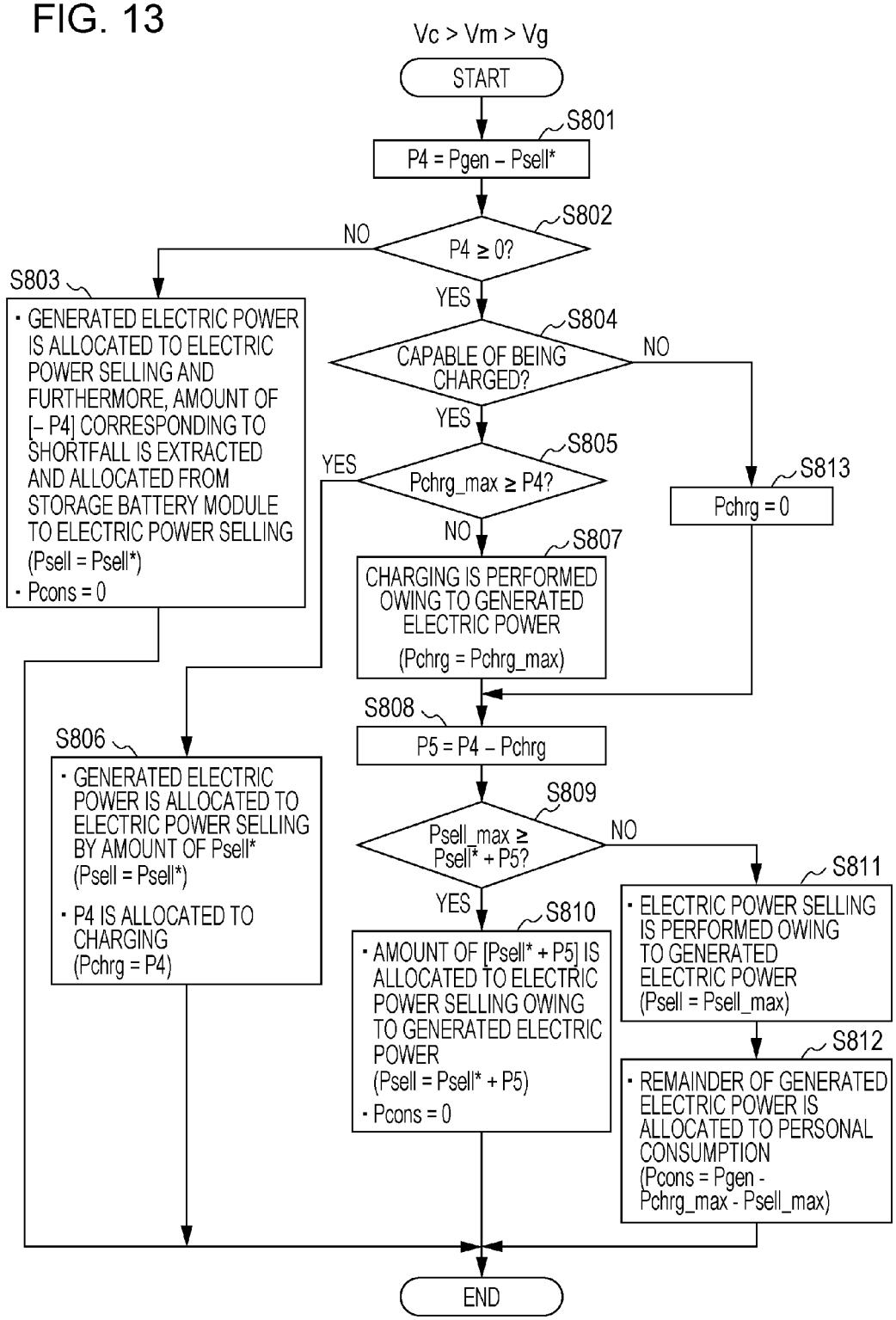
FIG. 13 is a flowchart illustrating a flow of processing performed in the electric power controller when an electric power selling instruction is issued by the electric power/point management server.

First, a flowchart in FIG. 13 will be described. FIG. 13 is the flowchart illustrating a case where an instruction for electric power selling has been issued from the electric power/point management server 200 and furthermore, the relationship between the electric power selling price Vm, the electric power purchasing price Vg, and the charging profit price Vc is "Vc>Vm>Vg". In addition, since Step S813 is the same as Step S211 in the flowchart in FIG. 7, the description thereof will be omitted.

First, in Step S801, a difference between the electric power generation amount Pgen and the prescribed electric power selling amount Psell* is calculated as P4. Next, in Step S802, it is determined whether or not the P4 is greater than or equal to "0". This determines whether or not it is possible to meet the prescribed electric power selling amount Psell* only using the electric power generation amount Pgen. When the P4 is greater than or equal to "0", it may be possible to meet the prescribed electric power selling amount Psell* only using the electric power generation amount Pgen. On the other hand, when the P4 is less than "0", it is difficult to meet the prescribed electric power selling amount Psell* only using the electric power generation amount Pgen, and when the electric power generation amount Pgen is only used, a shortfall of electric power, which corresponds to "−P4", occurs.

When, in Step S802, it is determined that the P4 is less than "0", the processing proceeds to Step S803 (Step S802: No). In addition, in Step S803, the control unit 11 controls the power conditioner 13 so as to allocate the electric power generation amount Pgen to electric power selling and furthermore, extract and allocate the "−P4" corresponding to the shortfall from the storage battery module 30 to electric power selling. Accordingly, it may be possible to meet the prescribed electric power selling amount Psell* serving as an electric power selling amount prescribed by the electric power/point management server 200. Accordingly, "the electric power selling amount Psell=the prescribed electric power selling amount Psell*" is satisfied. In addition, since the whole electric power generation amount Pgen is allocated to electric power selling and is not allocated to personal consumption, "the personal consumption amount Pcons=0" is satisfied.

On the other hand, when, in Step S802, it is determined that the P4 is greater than or equal to "0", the processing proceeds to Step S804 (Step S803: Yes). Next, in Step S804, it is determined whether or not the storage battery module 30 is capable of being charged, and when the storage battery module 30 is capable of being charged, the processing proceeds to Step S805 (Step S804: Yes).

In addition, in Step S805, it is determined whether or not the charge allowable amount Pchrg_max is greater than or equal to the P4. When the charge allowable amount Pchrg_ max is greater than or equal to the P4, the processing proceeds to Step S806 (Step S805: Yes). In addition, in Step S806, the control unit 11 controls the power conditioner 13 so as to allocate generated electric power corresponding to the prescribed electric power selling amount Psell to electric power selling. Since, in the above-mentioned Step S802, it has been determined that the P4 serving as the difference between the electric power generation amount Pgen and the prescribed electric power selling amount Psell* is greater than or equal to "0", and the electric power generation amount Pgen is greater than or equal to the prescribed electric power selling amount Psell*, it may be possible to perform electric power selling corresponding to the prescribed electric power selling amount Psell*, only using the electric power generation amount Pgen.

Furthermore, since the electric power generation amount Pgen is larger than the prescribed electric power selling amount Psell* by an amount corresponding to the P4, the control unit 11 controls the power conditioner 13 so as to allocate the P4 to charging. Since, in the above-mentioned Step S805, it has been determined that the charge allowable amount Pchrg_max is greater than or equal to the P4, it may be possible to allocate the whole P4 to charging. The reason why the P4 is allocated to charging is because since the charging profit price Vc is higher than the electric power selling price Vm and the electric power purchasing price Vg, when the remainder of generated electric power occurs, allocating the surplus electric power to charging provides an economic benefit for the electric storage equipment holder.

On the other hand, when, in Step S805, it is determined that the charge allowable amount Pchrg_max is not greater than or equal to the P4, the processing proceeds to Step S807 (Step S805: No). In addition, in Step S807, the control unit 11 controls the power conditioner 13 so as to allocate the generated electric power to charging. In this regard, however, since the charge allowable amount Pchrg_max is less than the P4, charging is performed with the charge allowable amount Pchrg_max being set as an upper limit. Accordingly, "the charge amount Pchrg=the charge allowable amount Pchrg_max" is satisfied.

Next, in Step S808, the value of "the P4−the charge amount Pchrg" is calculated as P5. Since, in the abovementioned Step S805, the P4 is greater than or equal to the charge allowable amount Pchrg_max, and in Step S807, charging corresponding to the charge allowable amount Pchrg_max has been performed, the P5 indicates a remaining amount after the P4 has been charged.

Next, in Step S809, it is determined whether or not the electric power selling allowable amount Psell_max is greater than or equal to the sum of the prescribed electric power selling amount Psell* and the P5. When "the electric power selling allowable amount Psell_max≥the prescribed electric power selling amount Psell*+the P5" is satisfied, the processing proceeds to Step S810 (Step S809: Yes).

In addition, in Step S810, the control unit 11 controls the power conditioner 13 so as to allocate, to electric power selling, "the prescribed electric power selling amount Psell*+the P5" serving as the remainder of the generated electric power. Since, in Step S802, it has been determined that the electric power generation amount Pgen is greater than or equal to the prescribed electric power selling amount Psell* and furthermore, charging in Step S807 is performed by allocating the P4 serving as the difference between the electric power generation amount Pgen and the prescribed electric power selling amount Psell*, the remainder of the generated electric power is greater than or equal to the prescribed electric power selling amount Psell*. Accordingly, it may be possible to perform electric power selling corresponding to the prescribed electric power selling amount Psell* serving as a prescribed electric power selling amount. In addition, since the whole remainder of the generated electric power is allocated to electric power selling, it is difficult to allocate the generated electric power to personal consumption, and "the personal consumption amount Pcons=0" is satisfied.

On the other hand, in Step S809, it is determined that "the electric power selling allowable amount Psell_max the prescribed electric power selling amount Psell*+the P5" is not satisfied, the processing proceeds to Step S811 (Step S809: No). In addition, in Step S811, the control unit 11 controls the power conditioner 13 so as to allocate the generated electric power to electric power selling. In this regard, however, since the electric power selling allowable amount Psell_max is not greater than or equal to the sum of the prescribed electric power selling amount Psell* and the P5, electric power selling is performed with the electric power selling allowable amount Psell_max being set as an upper limit. Accordingly, "the electric power selling amount Psell=the electric power selling allowable amount Psell_max" is satisfied.

Furthermore, in Step S812, the control unit 11 controls the power conditioner 13 so as to allocate, to personal consumption, an amount according to "the electric power generation amount Pgen−the charge allowable amount Pchrg_max−the electric power selling allowable amount Psell_max" serving as the remainder of the electric power generation amount Pgen.

In this way, since the relationship between the electric power selling price Vm, the electric power purchasing price Vg, and the charging profit price Vc is "Vc>Vm>Vg", and the charging profit price Vc is the highest, processing is performed so as to prioritize charging while electric power selling is performed so as to meet the prescribed electric power selling amount Psell*.

Figure 14:
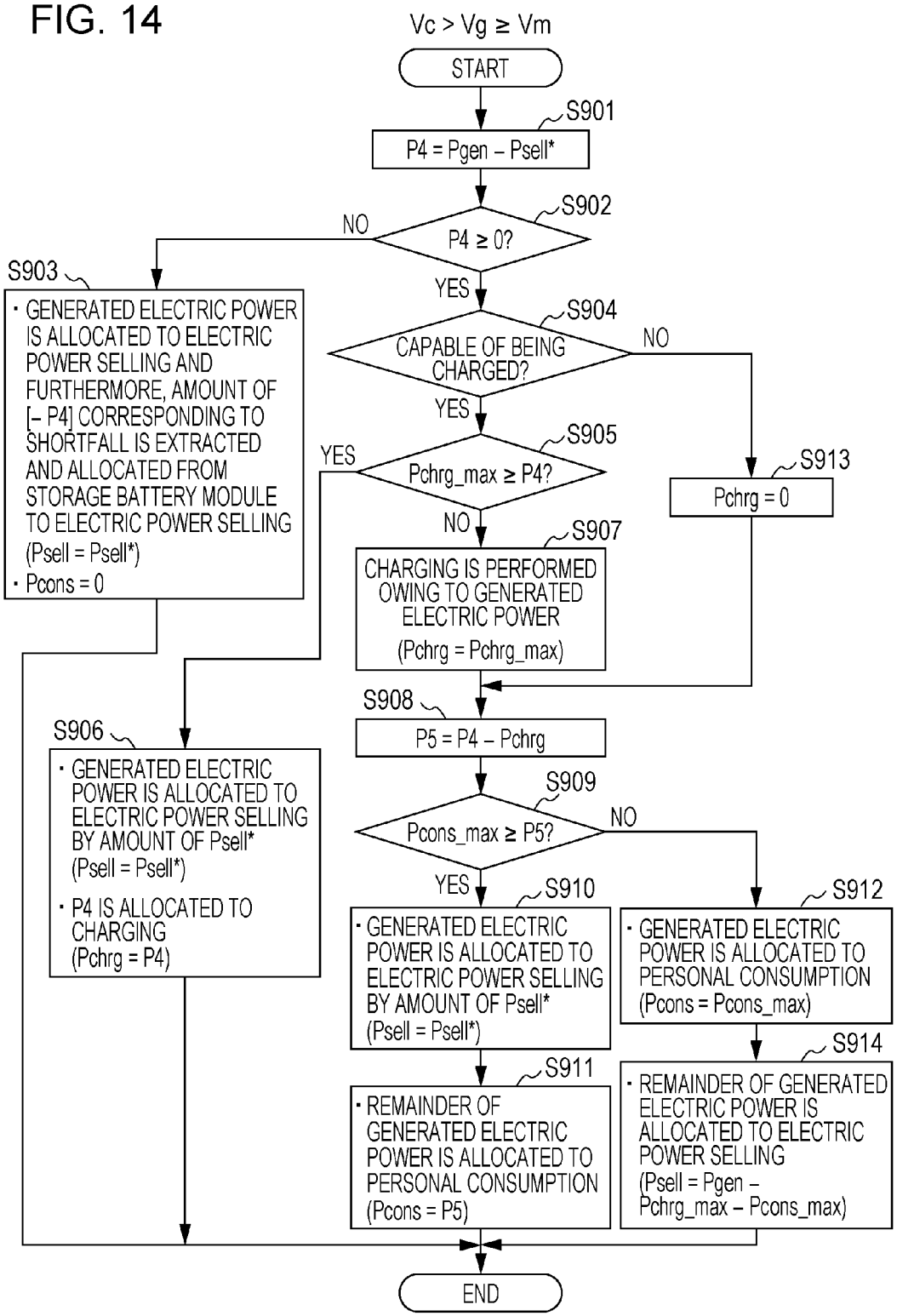
FIG. 14 is a flowchart illustrating a flow of processing performed in the electric power controller when an electric power selling instruction is issued by the electric power/point management server.

Next, a case where the electric power selling instruction has been issued from the electric power/point management server 200 and furthermore, it has been determined that the relationship between the electric power selling price Vm, the electric power purchasing price Vg, and the charging profit price Vc is "Vc>Vg≥Vm" will be described on the basis of a flowchart in FIG. 14. In addition, since Steps S901 to S908 in FIG. 14 are the same as Steps S801 to S808 in FIG. 13, the description thereof will be omitted. In addition, since Step S913 is the same as Step S211 in the flowchart in FIG. 7, the description thereof will be omitted. The description will be performed on and after Step S909.

In Step S909, it is determined whether or not the total personal consumption amount Pcons_max is greater than or equal to the P5. The P5 is calculated from "the P4−the charge amount Pchrg", and indicates the remaining amount of the generated electric power when the electric power generation amount Pgen is allocated to electric power selling corresponding to the electric power selling amount prescribed by the electric power/point management server 200 and furthermore, is allocated to charging. When the total personal consumption amount Pcons_max is greater than or equal to the P5, the processing proceeds to Step S910 (Step S909: Yes).

In addition, in Step S910, the control unit 11 controls the power conditioner 13 so as to allocate generated electric power corresponding to the prescribed electric power selling amount Psell* to electric power selling. Accordingly, electric power selling is performed that corresponds to the prescribed electric power selling amount Psell* serving as an electric power selling amount prescribed by the electric power/point management server 200. Furthermore, in Step S911, the control unit 11 controls the power conditioner 13 so as to allocate, to personal consumption, part of the generated electric power, which corresponds to the P5. Since, in Step S909, it has been determined that the total personal consumption amount Pcons_max is greater than or equal to the P5, it may be possible to allocate, to personal consumption, the whole electric power P5 that has remained by performing electric power selling corresponding to the prescribed electric power selling amount Psell*.

On the other hand, when, in Step S909, it is determined that the total personal consumption amount Pcons_max is not greater than or equal to the P5, the processing proceeds to Step S912 (Step S909: No). In addition, in Step S912, the control unit 11 controls the power conditioner 13 so as to allocate the generated electric power to personal consumption. In this regard, however, the total personal consumption amount Pcons_max is less than the P5, and it is difficult to allocate, to personal consumption, the whole P5 serving as an amount obtained by removing the prescribed electric power selling amount Psell* and the charge amount Pchrg from the generated electric power. Accordingly, electric power is allocated to personal consumption with the total personal consumption amount Pcons_max being set as an upper limit, and "the personal consumption amount Pcons=the total personal consumption amount Pcons_max" is satisfied.

Furthermore, in Step S914, the control unit 11 controls the power conditioner 13 so as to allocate, to electric power selling, "the electric power generation amount Pgen−the charge allowable amount Pchrg_max−the total personal consumption amount Pcons_max" serving as the remainder of the generated electric power.

In this way, since the relationship between the electric power selling price Vm, the electric power purchasing price Vg, and the charging profit price Vc is "Vc>Vg≥Vm", and the charging profit price Vc is the highest, processing is performed so as to prioritize charging while electric power selling is performed so as to meet the prescribed electric power selling amount Psell*.

Figure 15:
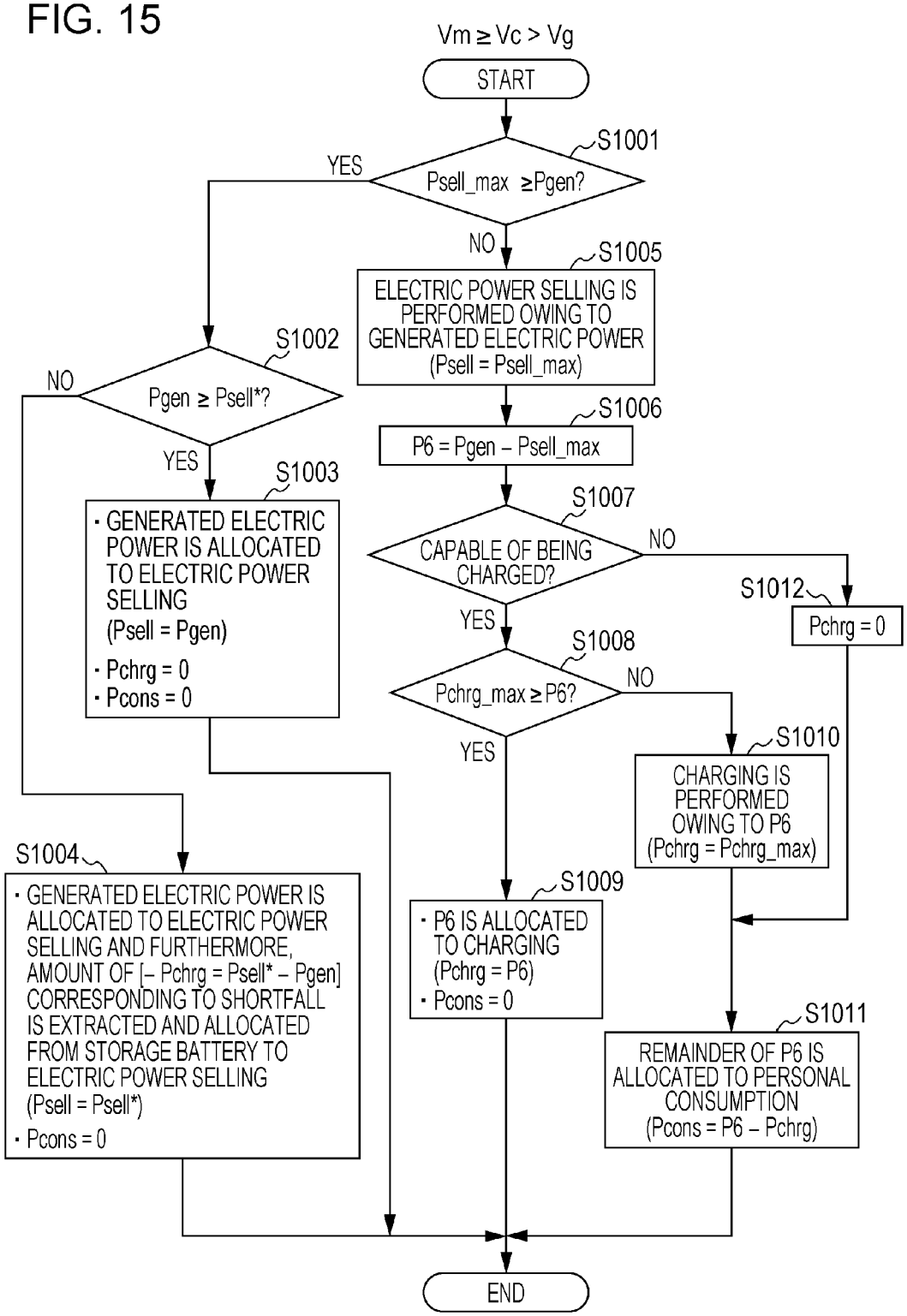
FIG. 15 is a flowchart illustrating a flow of processing performed in the electric power controller when an electric power selling instruction is issued by the electric power/point management server.

Next, a case where the electric power selling instruction has been issued from the electric power/point management server 200 and furthermore, it has been determined that the relationship between the electric power selling price Vm, the electric power purchasing price Vg, and the charging profit price Vc is "Vm≥Vc>Vg" will be described on the basis of a flowchart in FIG. 15. In addition, since Step S1012 is the same as Step S211 in the flowchart in FIG. 7, the description thereof will be omitted.

First, in Step S1001, it is determined whether or not the electric power selling allowable amount Psell_max is greater than or equal to the electric power generation amount Pgen. When the electric power selling allowable amount Psell_max is greater than or equal to the electric power generation amount Pgen (Step S1001: Yes), the processing proceeds to Step S1002, and it is determined whether or not the electric power generation amount Pgen is greater than or equal to the prescribed electric power selling amount Psell*. When the electric power generation amount Pgen is greater than or equal to the prescribed electric power selling amount Psell*, the processing proceeds to Step S1003 (Step S1002: Yes).

In addition, in Step S1003, the control unit 11 controls the power conditioner 13 so as to allocate the whole generated electric power to electric power selling. This is because since the electric power selling price Vm is the highest, and an electric power selling instruction has been issued from the electric power/point management server 200, it is appropriate to preferably perform electric power selling. Furthermore, since the electric power selling allowable amount Psell_max is greater than or equal to the electric power generation amount Pgen, it may be possible to allocate the whole electric power generation amount Pgen to electric power selling. In addition, since the whole electric power generation amount Pgen is allocated to electric power selling, "the charge amount Pchrg=0" and "the personal consumption amount Pcons=0" are satisfied.

On the other hand, when, in Step S1002, it is determined that the electric power generation amount Pgen is not greater than or equal to the prescribed electric power selling amount Psell*, the processing proceeds to Step S1004 (Step S1002: No). In addition, in Step S1004, the control unit 11 controls the power conditioner 13 so as to allocate the generated electric power to electric power selling. In this regard, however, since the electric power generation amount Pgen is less than the prescribed electric power selling amount Psell*, it is difficult to perform electric power selling corresponding to the prescribed electric power selling amount Psell*, only using the electric power generation amount Pgen. Therefore, the control unit 11 controls the power conditioner 13 so as to extract, from the storage battery module, "the prescribed electric power selling amount Psell*−the electric power generation amount Pgen" corresponding to a shortfall, as a discharge amount (−Pchrg), and allocate "the prescribed electric power selling amount Psell*−the electric power generation amount Pgen" to electric power selling. Accordingly, it may be possible to perform electric power selling corresponding to the prescribed electric power selling amount Psell*. In addition, since the whole electric power generation amount Pgen is allocated to electric power selling, "the personal consumption amount Pcons=0" is satisfied.

The description returns to Step S1001. When, in Step S1001, it is determined that the electric power selling allowable amount Psell_max is not greater than or equal to the electric power generation amount Pgen, the processing proceeds to Step S1005 (Step S1001: No). In addition, in Step S1005, the control unit 11 controls the power conditioner 13 so as to allocate the generated electric power to electric power selling. In this regard, however, since the electric power selling allowable amount Psell_max is not greater than or equal to the electric power generation amount Pgen, it is difficult to allocate the whole electric power generation amount Pgen to electric power selling. Accordingly, electric power selling is performed with the electric power selling allowable amount Psell_max being set as an upper limit, and "the electric power selling amount Psell=the electric power selling allowable amount Psell_max" is satisfied.

Next, in Step S1006, a difference between the electric power generation amount Pgen and the electric power selling allowable amount Psell_max is calculated as P6 with "the P6=the electric power generation amount Pgen−the electric power selling allowable amount Psell_max" being assumed. Since, in Step S1005, part of the electric power generation amount Pgen, which corresponds to the electric power selling allowable amount Psell_max, is allocated to electric power selling, the P6 indicates the remaining amount of the electric power generation amount Pgen.

Next, in Step S1007, it is determined whether or not the storage battery module 30 is capable of being charged. When the storage battery module 30 is capable of being charged, the processing proceeds to Step S1008 (Step S1007: Yes).

Next, in Step S1008, it is determined whether or not the charge allowable amount Pchrg_max is greater than or equal to the P6. When the charge allowable amount Pchrg_max is greater than or equal to the P6, the processing proceeds to Step S1009 (Step S1008: Yes).

In addition, in Step S1009, the control unit 11 controls the power conditioner 13 so as to allocate the P6 to charging. Accordingly, "the charge amount Pchrg=the P6" is satisfied. This is because since the charging profit price Vc is the second highest after the electric power selling price Vm, allocating, to charging, electric power remaining owing to electric power selling provides an economic benefit for the electric storage equipment holder. In addition, since the whole P6 serving as the remaining amount of the electric power generation amount Pgen is allocated to charging, the personal consumption amount Pcons turns out to be "0".

On the other hand, when, in Step S1008, it is determined that the charge allowable amount Pchrg_max is less than the P6, the processing proceeds to Step S1010 (Step S1008: No). In addition, in Step S1010, the control unit 11 controls the power conditioner 13 so as to allocate the P6 to charging. In this regard, however, since the charge allowable amount Pchrg_max is less than the P6, charging is performed with the charge allowable amount Pchrg_max being set as an upper limit. Accordingly, "the charge amount Pchrg=the charge allowable amount Pchrg_max" is satisfied.

Next, in Step S1011, the control unit 11 controls the power conditioner 13 so as to allocate "the P6–the charge amount Pchrg" to personal consumption. This means that when electric power selling has been performed in Step S1005, charging has been performed in Step S1010, and generated electric power has still remained, the remainder of electric power is allocated to personal consumption.

In this way, since the relationship between the electric power selling price Vm, the electric power purchasing price Vg, and the charging profit price Vc is "Vm≥Vc>Vg", and the electric power selling price Vm is the highest, processing is performed so as to prioritize electric power selling, followed by charging, while charging is performed so as to meet the prescribed electric power selling amount Psell*.

Figure 16:
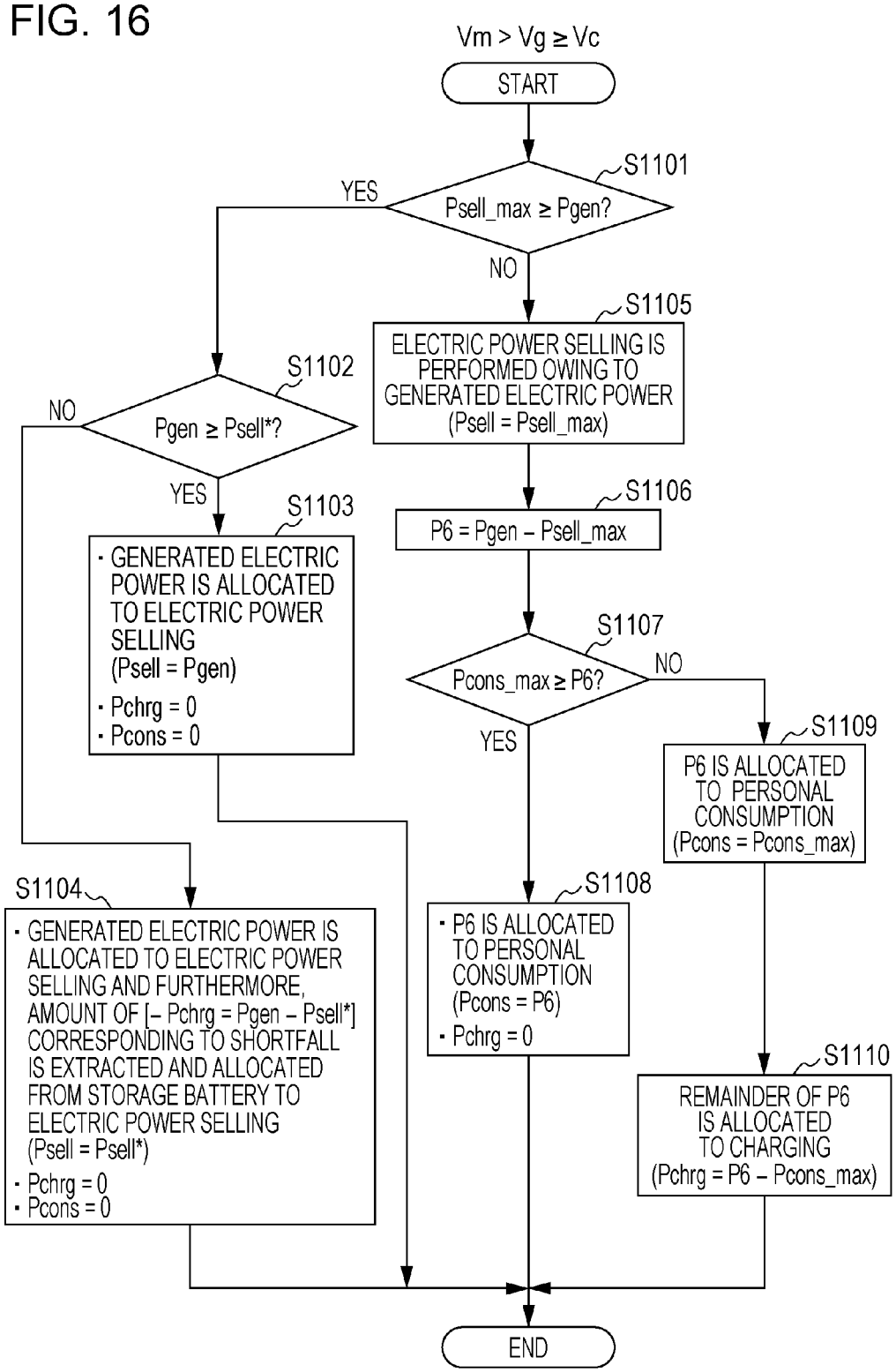
FIG. 16 is a flowchart illustrating a flow of processing performed in the electric power controller when an electric power selling instruction is issued by the electric power/point management server.

Next, a case where the electric power selling instruction has been issued from the electric power/point management server 200 and furthermore, it has been determined that the relationship between the electric power selling price Vm, the electric power purchasing price Vg, and the charging profit price Vc is "Vm>Vg≥Vc" will be described on the basis of a flowchart in FIG. 16. In addition, since Steps S1101 to S1106 in FIG. 16 are the same as Steps S1001 to S1006 in FIG. 15, the description thereof will be omitted. The description will be performed on and after Step S1107.

In Step S1107, it is determined whether or not the total personal consumption amount Pcons_max is greater than or equal to the P6, and when the total personal consumption amount Pcons_max is greater than or equal to the P6, the processing proceeds to Step S1108 (Step S1107: Yes). In addition, in Step S1108, the control unit 11 controls the power conditioner 13 so as to allocate the P6 to personal consumption. This is because since the charging profit price Vc is the lowest, when the remainder of the generated electric power occurs after electric power selling has performed, allocating the surplus electric power to personal consumption has an economic benefit, compared with allocating the surplus electric power to charging. In addition, since the whole P6 is allocated to personal consumption, charging is not performed, and "the charge amount Pchrg=0" is satisfied.

On the other hand, when, in Step S1107, it is determined that the total personal consumption amount Pcons_max is less than the P6, the processing proceeds to Step S1109 (Step S1107: No). In addition, in Step S1109, the control unit 11 controls the power conditioner 13 so as to allocate the P6 to personal consumption. In this regard, however, since the total personal consumption amount Pcons_max is less than the P6, personal consumption is performed with the total personal consumption amount Pcons_max being set as an upper limit. Accordingly, "the personal consumption amount Pcons=the total personal consumption amount Pcons_max" is satisfied.

Furthermore, in Step S1110, the control unit 11 controls the power conditioner 13 so as to allocate the remainder of the P6 to charging. This is because when electric power selling has been performed, personal consumption has been performed, and electric power has still remained, it is appropriate to allocate the electric power to charging. Since, in Step S1109, part of the P6, which corresponds to the total personal consumption amount Pcons_max, has been allocated to personal consumption, an electric power amount allocated to charging in Step S1110 turns out to be "the P6–the total personal consumption amount Pcons_max".

In this way, since the relationship between the electric power selling price Vm, the electric power purchasing price Vg, and the charging profit price Vc is "Vm>Vg≥Vc", and the electric power selling price Vm is the highest, processing is performed with the execution of electric power selling being prioritized so as to meet the prescribed electric power selling amount Psell*.

Figure 17:
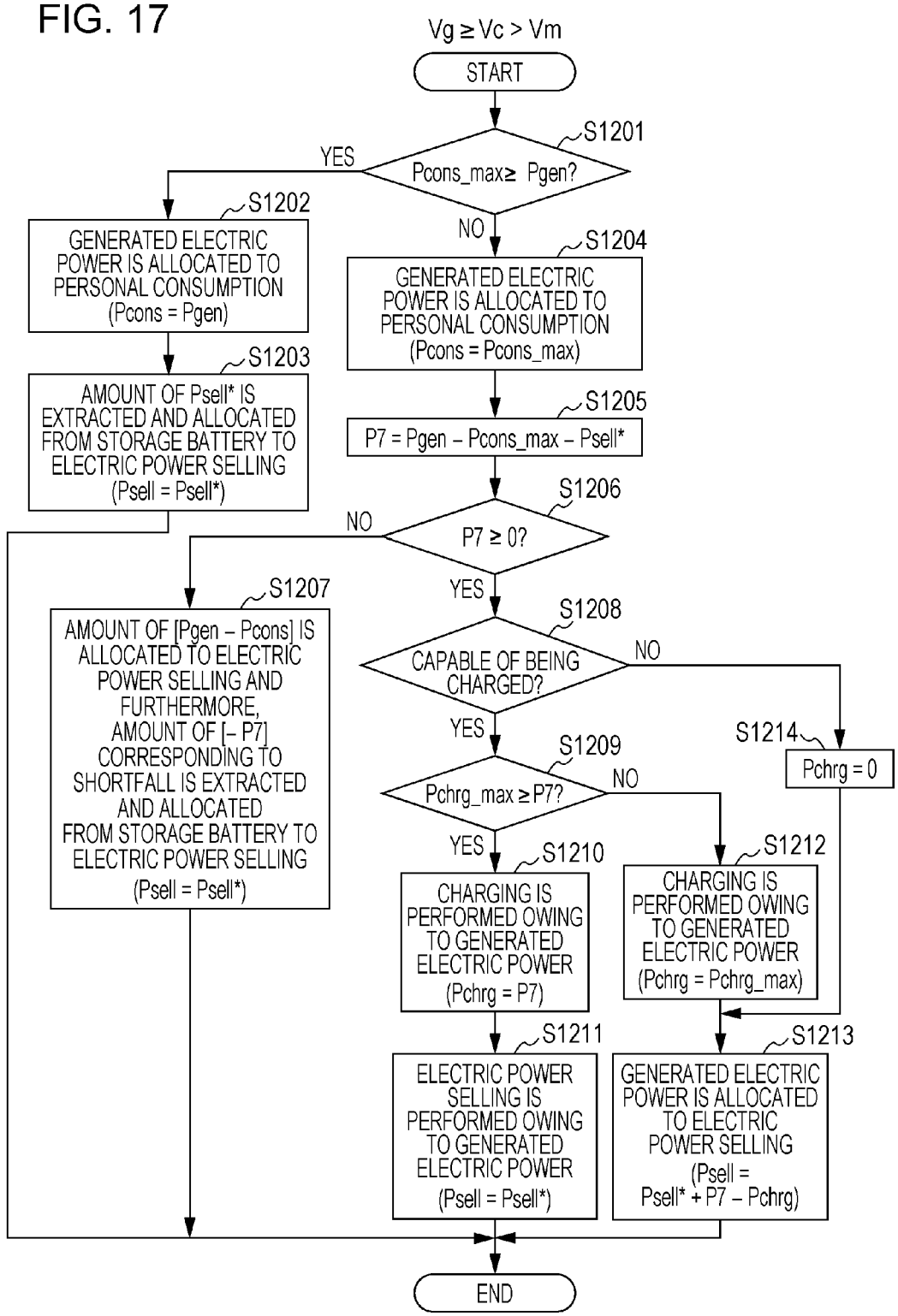
FIG. 17 is a flowchart illustrating a flow of processing performed in the electric power controller when an electric power selling instruction is issued by the electric power/point management server.

Next, a case where the electric power selling instruction has been issued from the electric power/point management server 200 and furthermore, it has been determined that the relationship between the electric power selling price Vm, the electric power purchasing price Vg, and the charging profit price Vc is "Vg≥Vc>Vm" will be described on the basis of a flowchart in FIG. 17. In addition, since Step S1214 is the same as Step S211 in the flowchart in FIG. 7, the description thereof will be omitted.

First, in Step S1201, it is determined whether or not the total personal consumption amount Pcons_max is greater than or equal to the electric power generation amount Pgen. When the total personal consumption amount Pcons_max is greater than or equal to the electric power generation amount Pgen, the processing proceeds to Step S1202 (Step S1201: Yes).

In addition, in Step S1202, the control unit 11 controls the power conditioner 13 so as to allocate the generated electric power to personal consumption. Since the total personal consumption amount Pcons_max is greater than or equal to the electric power generation amount Pgen, it may be possible to allocate the whole electric power generation amount Pgen to personal consumption. Accordingly, "the personal consumption amount Pcons=the electric power generation amount Pgen" is satisfied. This is because since the electric power selling price Vm is the lowest, allocating the generated electric power to personal consumption provides an economic benefit for the electric storage equipment holder.

Next, in Step S1203, the control unit 11 controls the power conditioner 13 so as to extract and allocate an electric power corresponding to the prescribed electric power selling amount Psell* from the storage battery module 30 to electric power selling. Accordingly, electric power selling is performed that corresponds to the prescribed electric power selling amount Psell* serving as an electric power selling amount prescribed by the electric power/point management server 200. Accordingly, "the electric power selling amount Psell=the prescribed electric power selling amount Psell*" is satisfied.

The description returns to Step S1201. When, in Step S1201, it is determined that the total personal consumption amount Pcons_max is less than the electric power generation amount Pgen, the processing proceeds to Step S1204 (Step S1201: No). In addition, in Step S1204, the control unit 11 controls the power conditioner 13 so as to allocate the generated electric power to personal consumption. In this regard, however, since the total personal consumption amount Pcons_max is less than the electric power generation amount Pgen, the generated electric power is allocated to personal consumption with the total personal consumption amount Pcons_max being set as an upper limit. Accordingly, "the personal consumption amount Pcons=the total personal consumption amount Pcons_max" is satisfied.

Next, in Step S1205, a value of "the electric power generation amount Pgen–the total personal consumption amount Pcons_max–the prescribed electric power selling amount Psell*" is calculated as P7. Next, in Step S1206, it is determined whether or not the P7 is greater than or equal to "0". When the P7 is less than "0", the processing proceeds to Step S1207 (Step S1206: No).

In addition, in Step S1207, the control unit 11 controls the power conditioner 13 so as to allocate, to electric power selling, "the electric power generation amount Pgen−the personal consumption amount Pcons" serving as the remainder of generated electric power at this time. In this regard, however, that the P7 calculated P7 in Step S1205 is less than "0" means that it is difficult to meet the prescribed electric power selling amount Psell* using "the electric power generation amount Pgen−the personal consumption amount Pcons". Accordingly, furthermore, the control unit 11 controls the power conditioner 13 so as to extract and allocate electric power corresponding to the shortfall of "−P7" from the storage battery module 30 to electric power selling. Accordingly, it may be possible to perform electric power selling corresponding to the prescribed electric power selling amount Psell* serving as an electric power selling amount prescribed by the electric power/point management server 200.

On the other hand, when, in Step S1206, it is determined that the P7 is greater than or equal to "0" (Step S1206: Yes), the processing proceeds to Step S1208, and it is determined whether or not the storage battery module 30 is capable of being charged. When the storage battery module 30 is capable of being charged, the processing proceeds to Step S1209 (Step S1208: Yes). Next, in Step S1209, it is determined whether or not the charge allowable amount Pchrg_max is greater than or equal to the P7. When the charge allowable amount Pchrg_max is greater than or equal to the P7, the processing proceeds to Step S1210 (Step S1209: Yes).

In addition, in Step S1210, the control unit 11 controls the power conditioner 13 so as to allocate, to charging, part of the generated electric power, which corresponds to the P7. Furthermore, in Step S1211, the control unit 11 controls the power conditioner 13 so as to perform electric power selling corresponding to the prescribed electric power selling amount Psell*, using the generated electric power. When having reached Step S1210, the remainder of the generated electric power corresponds to "the electric power generation amount Pgen−the total personal consumption amount Pcons_max". In addition, as described above, "the P7=the electric power generation amount Pgen−the total personal consumption amount Pcons_max−the prescribed electric power selling amount Psell*" is satisfied. Accordingly, it may be possible to perform charging corresponding to the P7 and electric power selling corresponding to the prescribed electric power selling amount Psell* using the remaining amount of the generated electric power, "the electric power generation amount Pgen−the total personal consumption amount Pcons_max".

The description returns to Step S1209. When, in Step S1209, it is determined that the charge allowable amount Pchrg_max is less than the P7, the processing proceeds to Step S1212 (Step S1209: No). In addition, in Step S1212, the control unit 11 controls the power conditioner 13 so as to allocate, to charging, the remainder of the generated electric power, "the electric power generation amount Pgen−the total personal consumption amount Pcons_max". In this regard, however, since the charge allowable amount Pchrg_max is less than the P7, charging is performed with the charge allowable amount Pchrg_max being set as an upper limit. Accordingly, "the charge amount Pchrg=the charge allowable amount Pchrg_max" is satisfied.

In addition, in Step S1213, the control unit 11 controls the power conditioner 13 so as to allocate the whole remainder of charging electric power to electric power selling. In addition, at this time, the remaining amount of the generated electric power is "the prescribed electric power selling amount Psell*+the P7−the charge amount Pchrg". Accordingly, "the electric power selling amount Psell=the prescribed electric power selling amount Psell*+P7−the charge amount Pchrg" is satisfied.

In this way, since the relationship between the electric power selling price Vm, the electric power purchasing price Vg, and the charging profit price Vc is "Vg≥Vc>Vm", the electric power purchasing price Vg is high, and the electric power selling price Vm is low, processing is performed so as to prioritize personal consumption while electric power selling is performed so as to meet the prescribed electric power selling amount Psell*.

Figure 18:
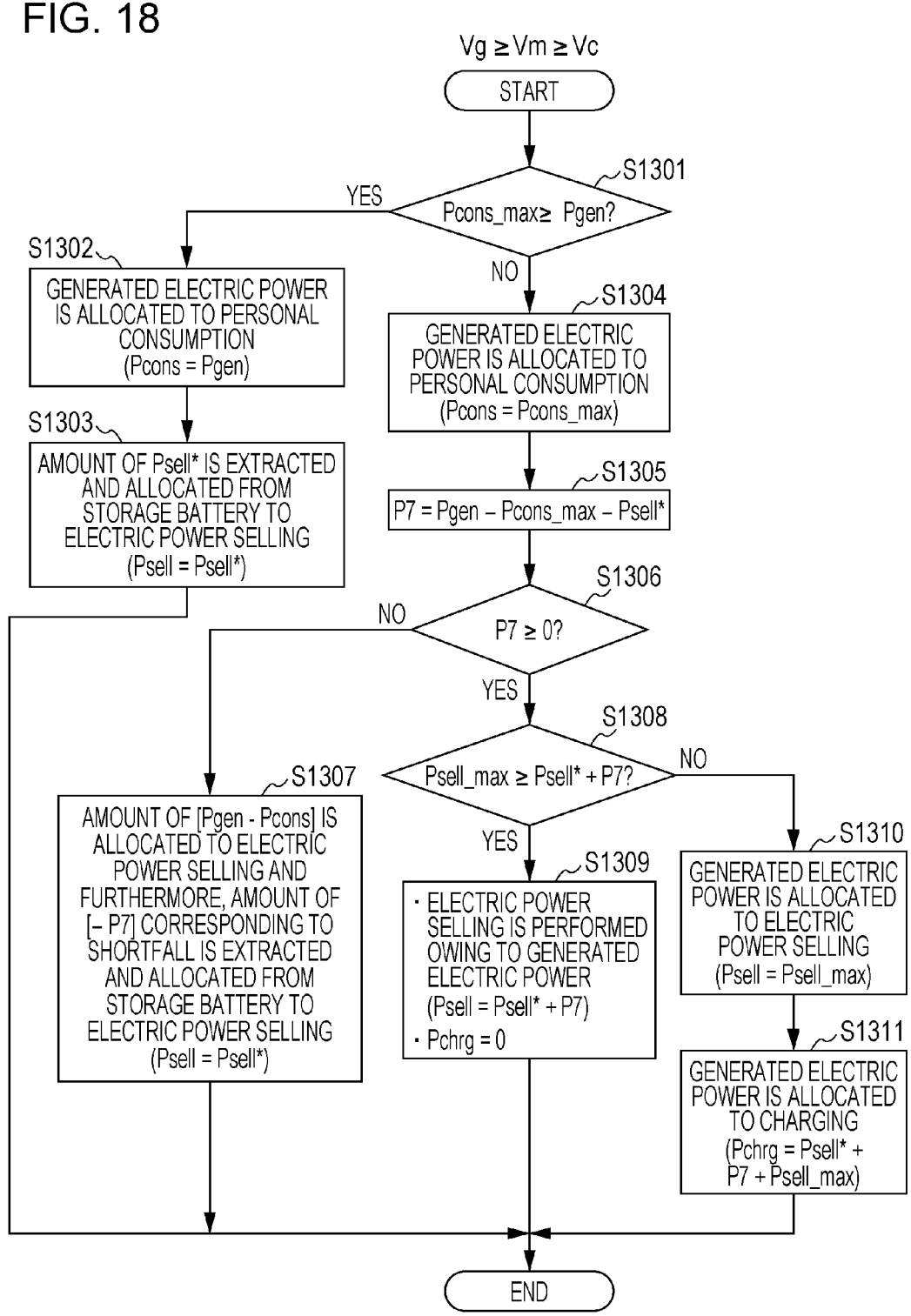
FIG. 18 is a flowchart illustrating a flow of processing performed in the electric power controller when an electric power selling instruction is issued by the electric power/point management server.

Next, a case where the electric power selling instruction has been issued from the electric power/point management server 200 and furthermore, it has been determined that the relationship between the electric power selling price Vm, the electric power purchasing price Vg, and the charging profit price Vc is "Vg≥Vm≥Vc" will be described on the basis of a flowchart in FIG. 18. In addition, since Steps S1301 to S1307 in FIG. 18 are the same as Steps S1201 to S1207 in FIG. 17, the description thereof will be omitted. The description will be performed on and after Step S1308.

In Step S1308, it is determined whether or not the electric power selling allowable amount Psell_max is greater than or equal to "the prescribed electric power selling amount Psell*+the P7". Since the remaining amount of the generated electric power at this time is "the electric power generation amount Pgen−the total personal consumption amount Pcons_max=the prescribed electric power selling amount Psell*+the P7", Step S1308 corresponds to processing for determining whether or not the it is possible to allocate the whole remaining amount of the generated electric power to electric power selling. When the electric power selling allowable amount Psell_max is greater than or equal to "the prescribed electric power selling amount Psell*+the P7", the processing proceeds to Step S1309 (Step S1308: Yes).

In addition, in Step S1309, the control unit 11 controls the power conditioner 13 so as to allocate the generated electric power to electric power selling. Since the electric power generation amount Pgen has been only allocated to personal consumption at this time, the remaining amount of the generated electric power is "the electric power generation amount Pgen−the total personal consumption amount Pcons_max=the prescribed electric power selling amount Psell*+the P7", and the electric power selling allowable amount Psell_max is greater than or equal to "the prescribed electric power selling amount Psell*+the P7", it may be possible to allocate the whole remaining amount of the generated electric power to electric power selling. In addition, since the whole remaining amount of the generated electric power is allocated to electric power selling, the charge amount Pchrg turns out to be "0".

On the other hand, when, in Step S1308, it is determined that the electric power selling allowable amount Psell_max is less than "the prescribed electric power selling amount Psell*+the P7", the processing proceeds to Step S1310 (Step S1308: No). In addition, in Step S1310, the control unit 11 controls the power conditioner 13 so as to allocate the generated electric power to electric power selling. In this regard, however, since the electric power selling allowable amount Psell_max is less than "the prescribed electric power selling amount Psell*+the P7", electric power selling is performed with the electric power selling allowable amount Psell_max being set as an upper limit. Accordingly, "the electric power selling amount Psell=the electric power selling allowable amount Psell_max" is satisfied.

Furthermore, in Step S1311, the control unit 11 controls the power conditioner 13 so as to allocate, to charging, "the prescribed electric power selling amount Psell*+the P7−the electric power selling allowable amount Psell_max" serving as the remainder of generated electric power at this time. This is because when the generated electric power has already been allocated to personal consumption and electric power selling and the remainder of electric power still occurs, it is appropriate to perform charging.

In this way, since the relationship between the electric power selling price Vm, the electric power purchasing price Vg, and the charging profit price Vc is "Vg≥Vm>Vc", the electric power purchasing price Vg is high, and the charging profit price Vc is low, processing is performed so as to prioritize personal consumption while electric power selling is performed so as to meet the prescribed electric power selling amount Psell*.

[1-8. Processing in Electric Power Controller: Processing Performed when Autonomous Operation Instruction is Received]

Next, processing performed in the electric power controller 10 when an autonomous operation instruction has been received from the electric power/point management server 200 will be described with reference to FIG. 19 to FIG. 24. When having received an instruction for an autonomous operation from the electric power/point management server 200, the electric power controller 10 performs the following processing on the basis of the magnitude relationship between the electric power selling price Vm, the electric power purchasing price Vg, and the charging profit price Vc so as to produce an economic benefit for the electric storage equipment holder.

In addition, each processing operation described later is based on the principle that (1) the number of times the storage battery module 30 is charged or discharged is preferably reduced and the life of the storage battery module 30 is preferably lengthened, and (2) undesirable processing is not executed and trouble is avoided.

Accordingly, when "the charging profit price Vc=the electric power purchasing price Vg" is satisfied, while it is possible to perform charging owing to the execution of electric power purchasing, there may not be an economic benefit. Therefore, so as to lengthen the life of the storage battery module 30, it is preferable not to perform charging owing to the execution of electric power purchasing. When "the charging profit price Vc=the electric power selling price Vm" is satisfied, even if the generated electric power due to the electric power generation equipment 40 is allocated to electric power selling or charging, an economic benefit may not vary. Accordingly, it is preferable not to perform charging, so as to lengthen the life of the storage battery module 30. In addition, even if the electric power stored in the storage battery module 30 is allocated to electric power selling, there may not be an economic benefit. Therefore, it is preferable not to perform discharging, so as to lengthen the life of the storage battery module 30. Namely, when the charging profit price Vc is equal to the electric power selling price Vm or the electric power purchasing price Vg, it is preferable not to perform charging in the storage battery module 30.

When "the electric power selling price Vm=the electric power purchasing price Vg" is satisfied, in every one of a case where the generated electric power due to the electric power generation equipment 40 is allocated to electric power selling by performing electric power selling, a case where the generated electric power due to the electric power generation equipment 40 is allocated to personal consumption, and a case where electric power to be allocated to personal consumption is purchased from the electric power company, an economic benefit may not vary. Accordingly, if the principle of (2) "undesirable processing is not executed and trouble is avoided" is followed, the personal consumption is prioritized without performing electric power selling.

Figure 19:
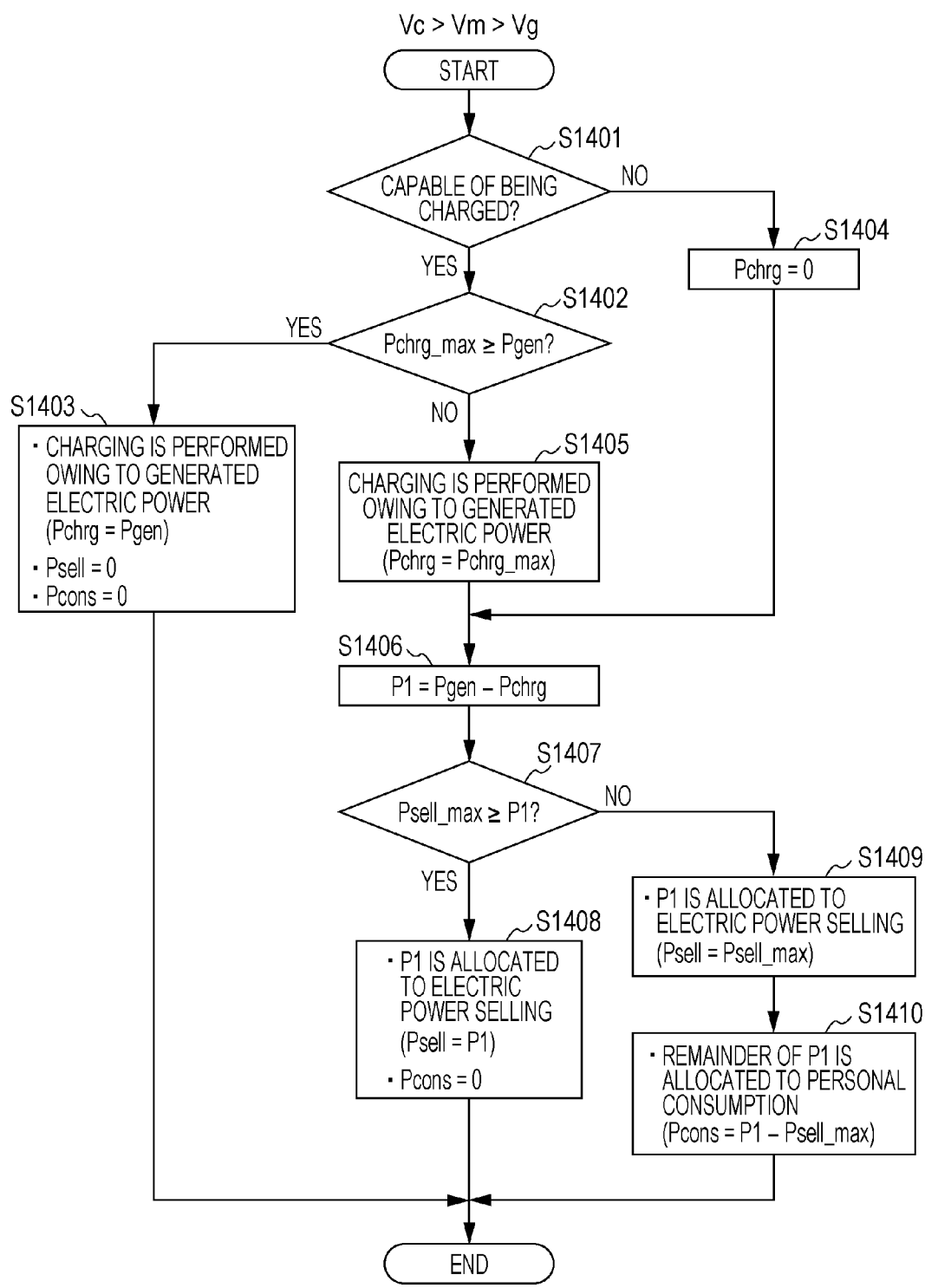
FIG. 19 is a flowchart illustrating a flow of processing performed in the electric power controller when an autonomous operation instruction is issued by the electric power/point management server.

First, a case where, in the above-mentioned processing illustrated in FIG. 5 and FIG. 6, it has been determined that the magnitude relationship between the electric power selling price Vm, the electric power purchasing price Vg, and the charging profit price Vc is "Vc>Vm>Vg" will be described on the basis of a flowchart in FIG. 19.

First, in Step S1401, it is determined whether or not the storage battery module 30 is capable of being charged. The control unit 11 acquires, from the cell control unit 32, the charge amount information indicating the current charge amount of the storage battery module 30, it is confirmed whether or not the amount of space exists, and hence it is determined whether or not the storage battery module 30 is capable of being charged. When, in Step S1401, it is determined that the storage battery module 30 is capable of being charged, the processing proceeds to Step S1402 (Step S1401: Yes).

Next, in Step S1402, it is determined whether or not the charge allowable amount Pchrg_max is greater than or equal to the electric power generation amount Pgen. When the charge allowable amount Pchrg_max is greater than or equal to the electric power generation amount Pgen, the processing proceeds to Step S1403 (Step S1402: Yes). In addition, in Step S1403, the control unit 11 controls the power conditioner 13 so as to allocate the generated electric power to charging. Since the charge allowable amount Pchrg_max is greater than or equal to the electric power generation amount Pgen, it may be possible to allocate the whole electric power generation amount Pgen to charging. Furthermore, since the charging profit price Vc is the highest, preferably performing electric storage provides an economic benefit for the electric storage equipment holder. Accordingly, "the charge amount Pchrg=the electric power generation amount Pgen" is satisfied.

Since "the charge amount Pchrg=the electric power generation amount Pgen" is satisfied, namely, the whole electric power generation amount Pgen is allocated to charging, both of the electric power selling amount Psell and the personal consumption amount Pcons turn out to be "0". In addition, in this case, since the electric power purchasing price Vg is lower than the electric power selling price Vm and the charging profit price Vc, it may also be desirable to perform charging owing to electric power purchasing in addition to the electric power generation amount Pgen due to the electric power generation equipment 40.

On the other hand, when, in Step S1401, it is determined that the storage battery module 30 is not capable of being charged, the processing proceeds to Step S1404 (Step S1401: No), and "the charge amount Pchrg=0" is set. This means that since the storage battery module 30 is not capable of being charged, the storage battery module 30 is not charged.

Next, in Step S1406, a difference between the electric power generation amount Pgen and the charge amount Pchrg is calculated as the P1. The P1 indicates surplus electric power that has remained without being used for charging when the electric power generation amount Pgen has been assumed to be the charge amount Pchrg. In addition, when the processing has proceeded from Step S1404 to Step S1406, since "the charge amount Pchrg=0" has been set in Step S1404, the P1 is equal to the electric power generation amount Pgen.

Next, in Step S1407, it is determined whether or not the electric power selling allowable amount Psell_max is greater than or equal to the P1. When the electric power selling allowable amount Psell_max is greater than or equal to the P1, the processing proceeds to Step S1408 (Step S1407: Yes). In addition, in Step S1408, the control unit 11 controls the power conditioner 13 so as to allocate the P1 to electric power selling. This is because since it is difficult to perform charging, it may be possible to perform electric power selling processing because the electric power selling allowable amount Psell_max is greater than or equal to the electric power generation amount Pgen, and furthermore, the electric power selling price Vm is higher than the electric power purchasing price Vg in the electric power market, it is appropriate to allocate the whole generated electric power to electric power selling when it is difficult to perform charging. Accordingly, "the electric power selling amount Psell=the P1" is satisfied. In addition, it is difficult to allocate the electric power generation amount Pgen to personal consumption, and "the personal consumption amount Pcons=0" is satisfied.

On the other hand, when, in Step S1407, it is determined that the electric power selling allowable amount Psell_max is less than the P1, the processing proceeds to Step S1409 (Step S1407: No). In addition, in Step S1409, the control unit 11 controls the power conditioner 13 so as to allocate the generated electric power to electric power selling. This is because since it is difficult to perform charging, and furthermore, the electric power selling price Vm is higher than the electric power purchasing price Vg in the electric power market, it is appropriate to allocate the generated electric power to electric power selling. In this regard, however, since the electric power selling allowable amount Psell_max is less than the P1, it is difficult to allocate the whole P1 to electric power selling, and "the electric power selling amount Psell=the electric power selling allowable amount Psell_max" is satisfied.

In addition, when "the electric power selling amount Psell=the electric power selling allowable amount Psell_max" is satisfied, since it is possible to only perform electric power selling corresponding to the electric power selling allowable amount Psell_max, the remainder of the P1 occurs. Therefore, next, in Step S1410, the control unit 11 controls the power conditioner 13 so as to allocate the remainder of the P1 to personal consumption. Accordingly, "the personal consumption amount Pcons=the P1−the electric power selling allowable amount Psell_max" is satisfied.

The description returns to Step S1402. When, in Step S1402, it is determined that the charge allowable amount Pchrg_max is less than the electric power generation amount Pgen, the processing proceeds to Step S1405 (Step S1402: No). In addition, in Step S1405, the control unit 11 controls the power conditioner 13 so as to allocate the generated electric power to charging. In this regard, however, since the charge allowable amount Pchrg_max is less than the electric power generation amount Pgen, it is difficult to allocate the whole electric power generation amount Pgen to charging, and charging is performed with the charge allowable amount Pchrg_max being set as an upper limit. Accordingly, "the charge amount Pchrg=the charge allowable amount Pchrg_max" is satisfied.

Next, in Step S1406, a difference between the electric power generation amount Pgen and the charge amount Pchrg is calculated as the P1. As described above, the P1 indicates surplus electric power that has remained without being used for charging when the electric power generation amount Pgen has been allocated to charging. Next, in Step S1407, it is determined whether or not the electric power selling allowable amount Psell_max is greater than or equal to the P1. When the electric power selling allowable amount Psell_max is greater than or equal to the P1, the processing proceeds to Step S1408 (Step S1407: Yes).

In addition, in Step S1408, the control unit 11 controls the power conditioner 13 so as to allocate the P1 to electric power selling. This is because surplus electric power occurs because the electric power generation amount Pgen is greater than or equal to the charge allowable amount Pchrg_max while the storage battery module 30 is capable of being charged, and furthermore selling the surplus electric power provides a benefit for the point issuer because the electric power selling price Vm is higher than the electric power purchasing price Vg.

On the other hand, when, in Step S1407, it is determined that the electric power selling allowable amount Psell_max is less than the P1, the processing proceeds to Step S1409 (Step S1407: No). Next, in Step S1409, the control unit 11 controls the power conditioner 13 so as to allocate the P1 to electric power selling. This is because since the electric power selling allowable amount Psell_max is less than the P1 and it is difficult to allocate the whole P1 to electric power selling, electric power selling is performed with the electric power selling allowable amount Psell_max being set as an upper limit. Therefore, "the electric power selling amount Psell=the electric power selling allowable amount Psell_max" is satisfied.

In addition, that electric power selling is performed with the electric power selling allowable amount Psell_max being less than the P1 means that even if the P1 is subjected to electric power selling, the remainder of electric power occurs. Accordingly, next, in Step S1410, the control unit 11 controls the power conditioner 13 so as to allocate the remainder of the P1 to personal consumption. Accordingly, "the personal consumption amount Pcons=the P1−the electric power selling allowable amount Psell_max" is satisfied.

Figure 20:
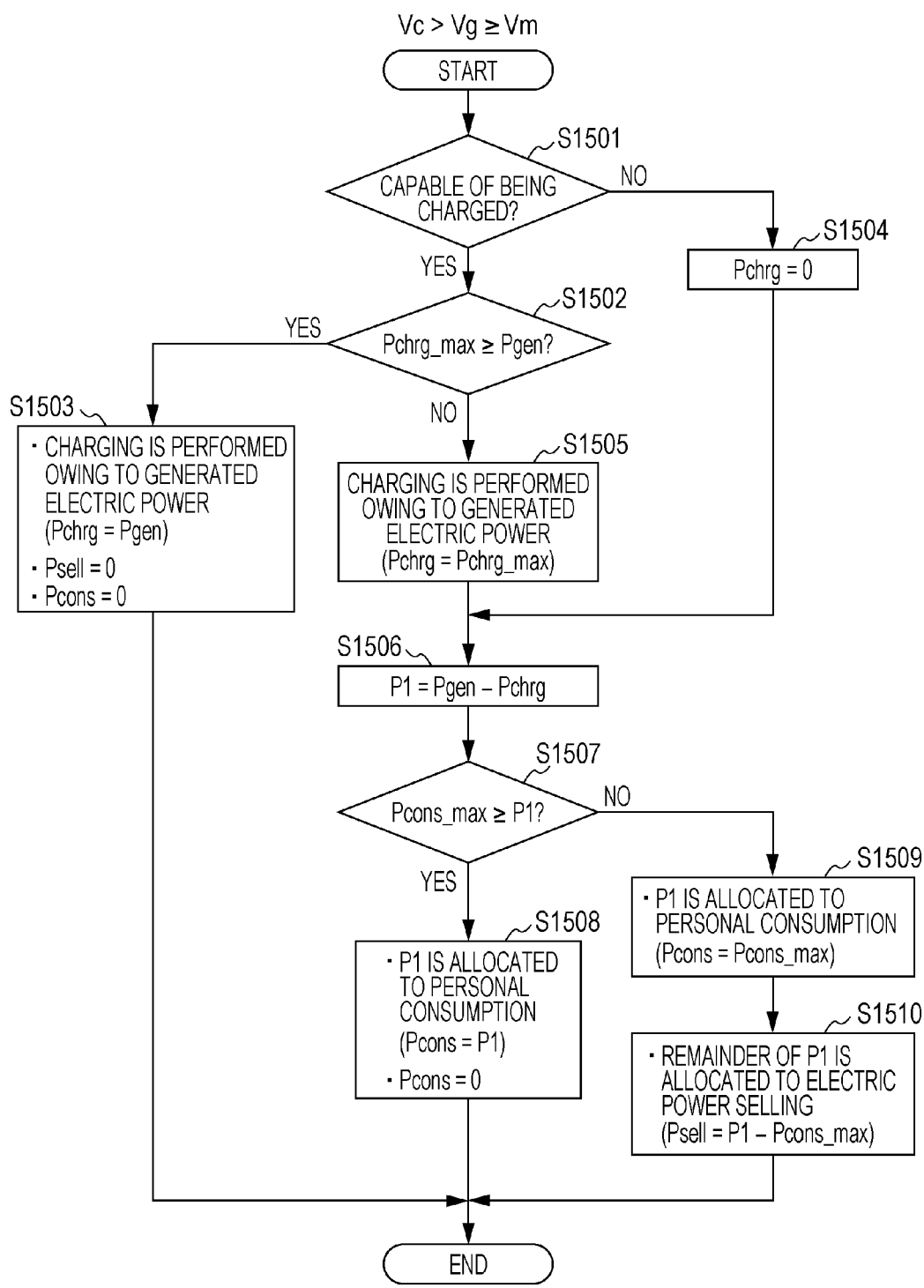
FIG. 20 is a flowchart illustrating a flow of processing performed in the electric power controller when an autonomous operation instruction is issued by the electric power/point management server.

Next, a case where it has been determined that the magnitude relationship between the electric power selling price Vm, the electric power purchasing price Vg, and the charging profit price Vc is "Vc>Vg≥Vm" will be described on the basis of a flowchart in FIG. 20. In addition, since Steps S1501 to S1506 are the same as Steps S1401 to S1406 in the flowchart illustrated in FIG. 19, the description thereof will be omitted. The description will be performed on and after Step S1507.

In Step S1507, it is determined whether or not the total personal consumption amount Pcons_max is greater than or equal to the P1. When the total personal consumption amount Pcons_max is greater than or equal to the P1, the processing proceeds to Step S1508 (Step S1507: Yes). In addition, in Step S1508, the control unit 11 controls the power conditioner 13 so as to allocate the P1 to personal consumption. This is because since it is difficult to perform charging and the electric power selling price Vm is lower than the electric power purchasing price Vg, allocating the P1 to personal consumption has an economic benefit compared with performing electric power selling. Since the total personal consumption amount Pcons_max is greater than or equal to the P1, it may be possible to regard the whole P1 as the personal consumption amount Pcons, and "the personal consumption amount Pcons=the P1" is satisfied. Accordingly, since electric power selling is not performed, "the electric power selling amount Psell=0" is satisfied.

On the other hand, when, in Step S1507, it is determined that the total personal consumption amount Pcons_max is less than the P1, the processing proceeds to Step S1509 (Step S1507: No). In addition, in Step S1509, the control unit 11 controls the power conditioner 13 so that electric power is allocated to personal consumption with "the personal consumption amount Pcons=the total personal consumption amount Pcons_max" being assumed. This is because since it is difficult to perform charging and the electric power selling price Vm is lower than the electric power purchasing price Vg, allocating electric power to personal consumption has an economic benefit compared with performing electric power selling. In this regard, however, since the total personal consumption amount Pcons_max is less than the P1, "the personal consumption amount Pcons=the total personal consumption amount Pcons_max" is satisfied.

In addition, since the total personal consumption amount Pcons_max is less than the P1, the remainder of electric power occurs even if the whole P1 is allocated to personal consumption. Therefore, next, in Step S1510, the control unit 11 controls the power conditioner 13 so as to allocate the remainder of the P1 to electric power selling.

Figure 21:
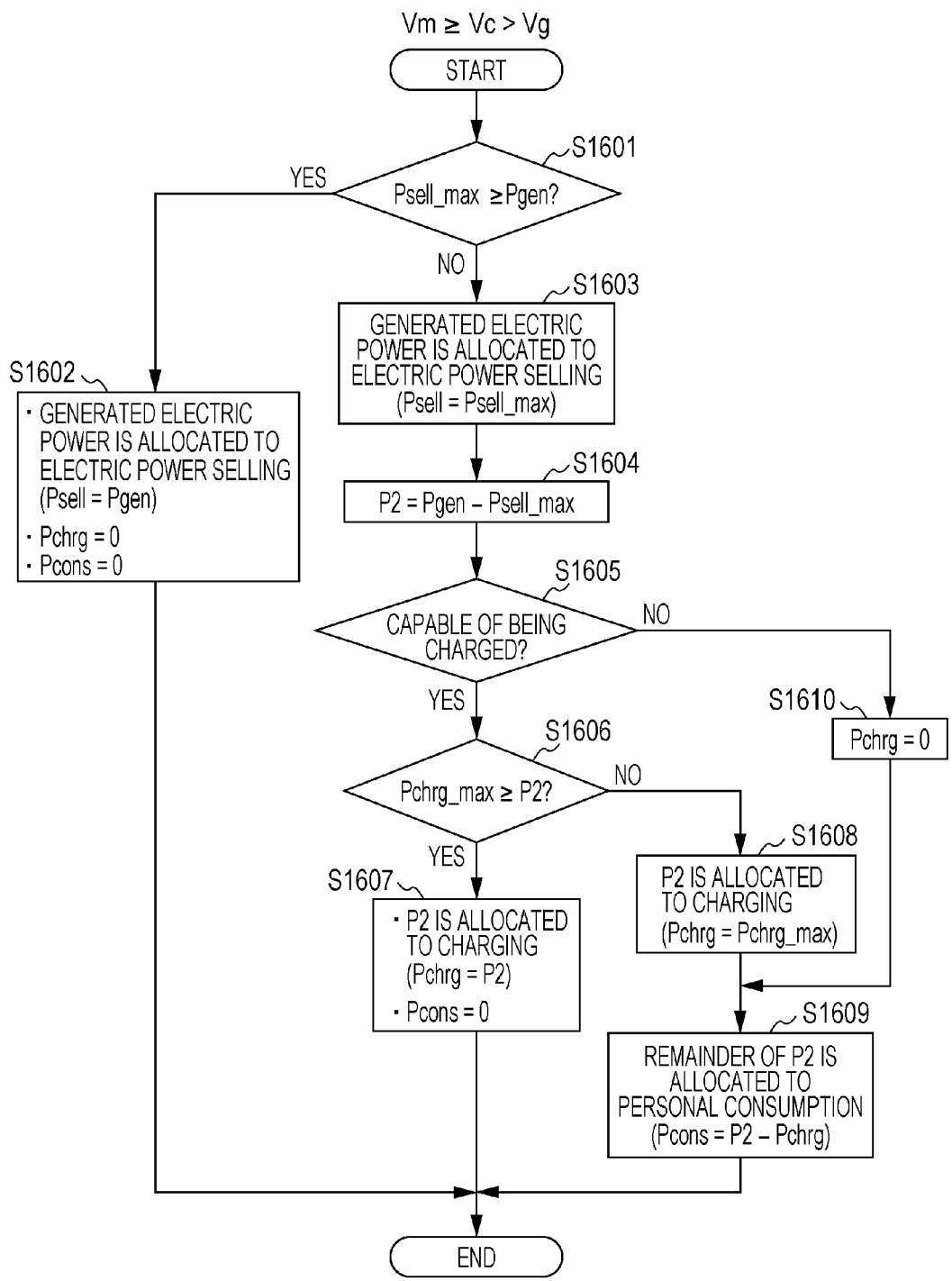
FIG. 21 is a flowchart illustrating a flow of processing performed in the electric power controller when an autonomous operation instruction is issued by the electric power/point management server.

Next, a case where it has been determined that the relationship between the electric power selling price Vm, the electric power purchasing price Vg, and the charging profit price Vc is "Vm≥Vc>Vg" will be described on the basis of a flowchart in FIG. 21.

First, in Step S1601, it is determined whether or not the electric power selling allowable amount Psell_max is greater than or equal to the electric power generation amount Pgen. When the electric power selling allowable amount Psell_max is greater than or equal to the electric power generation amount Pgen, the processing proceeds to Step S1602. In addition, in Step S1602, the control unit 11 controls the power conditioner 13 so as to allocate the generated electric power to electric power selling. Accordingly, "the electric power selling amount Psell=the electric power generation amount Pgen" is satisfied. This is because since the electric power selling price Vm is the highest, allocating the whole electric power generation amount Pgen to electric power selling provides an economic benefit for the electric storage equipment holder. In addition, since the whole electric power generation amount Pgen is regarded as the electric power selling amount Psell, "the charge amount Pchrg=0" and "the personal consumption amount Pcons=0" are satisfied.

On the other hand, when, in Step S1601, it is determined that the electric power selling allowable amount Psell_max is less than the electric power generation amount Pgen, the processing proceeds to Step S1603 (Step S1601: No). In addition, in Step S1603, the control unit 11 controls the power conditioner 13 so as to allocate the generated electric power to electric power selling. This means that while it is appropriate to perform electric power selling due to electric power selling because the electric power selling price Vm is the highest, since the electric power selling allowable amount Psell_max is less than the electric power generation amount Pgen, electric power selling is performed with the electric power selling allowable amount Psell_max being set as an upper limit. Accordingly, "the electric power selling amount Psell=the electric power selling allowable amount Psell_max" is satisfied.

In addition, since the electric power selling allowable amount Psell_max is less than the electric power generation amount Pgen, it is difficult to allocate the whole electric power generation amount Pgen to electric power selling. Therefore, next, in Step S1604, a difference between the electric power generation amount Pgen and the electric power selling allowable amount Psell_max is calculated as the P2. This P2 indicates electric power selling surplus electric power that has remained without being used for electric power selling when the electric power selling amount Psell has been set to the electric power selling allowable amount Psell_max.

Next, in Step S1605, it is determined whether or not the storage battery module 30 is capable of being charged. When the storage battery module 30 is capable of being charged, the processing proceeds to Step S1606 (Step S1605: Yes). Next, in Step S1606, it is determined whether or not the charge allowable amount Pchrg_max is greater than or equal to the P2. When the charge allowable amount Pchrg_max is greater than or equal to the P2, the processing proceeds to Step S1607 (Step S1606: Yes).

In addition, in Step S1607, the control unit 11 controls the power conditioner 13 so as to allocate the P2 to charging. As described above, since the electric power selling allowable amount Psell_max is less than the electric power generation amount Pgen, it is difficult to allocate the whole electric power generation amount Pgen to electric power selling. However, since the storage battery module 30 is capable of being charged, and furthermore, the charging profit price Vc is greater than or equal to the electric power purchasing price Vg, if it is difficult to perform electric power selling, performing charging provides an economic benefit for the electric storage equipment holder. Accordingly, "the charge amount Pchrg=the P2" is satisfied. In addition, since the whole P2 is allocated to charging, "the personal consumption amount Pcons=0" is satisfied.

On the other hand, when, in Step S1606, it is determined that the charge allowable amount Pchrg_max is less than the P2, the processing proceeds to Step S1608 (Step S1606: No). In addition, in Step S1608, the control unit 11 controls the power conditioner 13 so as to allocate the P2 to charging. In this regard, however, since the charge allowable amount Pchrg_max is less than the P2 and it is difficult to allocate the whole P2 to charging, charging is performed with the charge allowable amount Pchrg_max being set as an upper limit. Accordingly, "the charge amount Pchrg=the charge allowable amount Pchrg_max" is satisfied.

Next, in Step S1609, the control unit 11 controls the power conditioner 13 so as to allocate, to personal consumption, the remainder of the P2 with "the personal consumption amount Pcons=the P2−the charge amount Pchrg" being assumed. As described above, since the charge allowable amount Pchrg_max is less than the P2, even if charging is performed in the above-mentioned Step S1608, it is difficult to allocate the whole P2 to charging. Therefore, electric power, which indicated by "the P2−the charge amount Pchrg" is and has still remained even if electric power selling and charging, has been performed, is allocated to personal consumption.

The description returns to Step S1605. When, in Step S1605, it is determined that the storage battery module 30 is not capable of being charged (Step S1605: No), the processing proceeds to Step S1610, and "the charge amount Pchrg=0" is set.

Next, in Step S1609, the control unit 11 controls the power conditioner 13 so as to allocate, to personal consumption, electric power with "the personal consumption amount Pcons=the P2−the charge amount Pchrg" being assumed. In addition, since, in Step S1610, "the charge amount Pchrg=0"

is set, when the processing has proceeded from Step S1610 to Step S1609, "the personal consumption amount Pcons=the P2" is satisfied.

In addition, since the relationship between the electric power selling price Vm, the electric power purchasing price Vg, and the charging profit price Vc is "Vm≥Vc>Vg", and the electric power selling price Vm is the highest, when it is possible to extract electric power from the storage battery module 30, it is desirable to also allocate the electric power to electric power selling. In addition, since the electric power purchasing price Vg is the lowest, it is desirable to perform charging owing to the execution of electric power purchasing.

Figure 22:
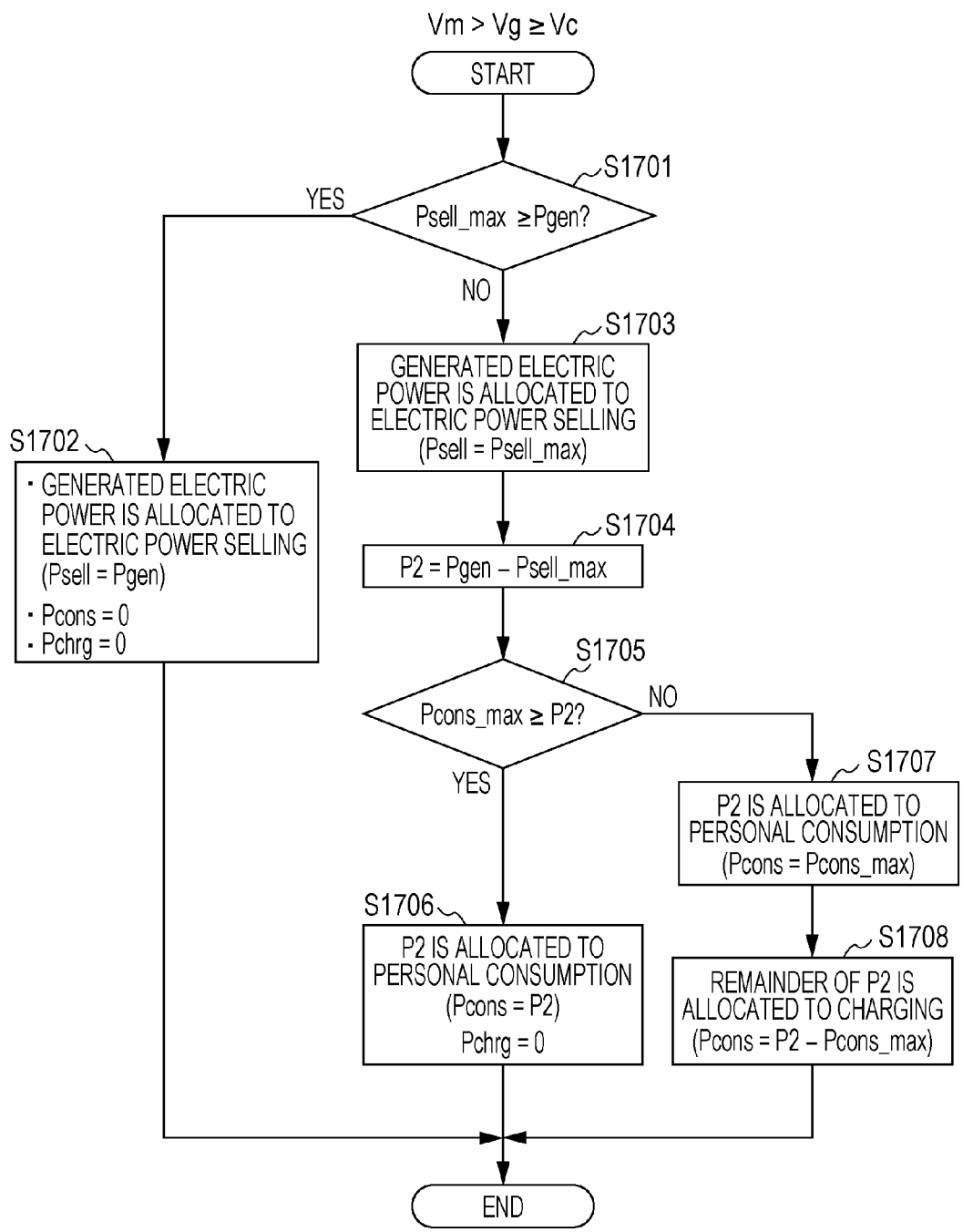
FIG. 22 is a flowchart illustrating a flow of processing performed in the electric power controller when an autonomous operation instruction is issued by the electric power/point management server.

Next, a case where it has been determined that the relationship between the electric power selling price Vm, the electric power purchasing price Vg, and the charging profit price Vc is "Vm>Vg≥Vc" will be described on the basis of a flowchart in FIG. 22.

First, in Step S1701, it is determined whether or not the electric power selling allowable amount Psell_max is greater than or equal to the electric power generation amount Pgen. When the electric power selling allowable amount Psell_max is greater than or equal to the electric power generation amount Pgen, the processing proceeds to Step S1702 (Step S1701: Yes). In addition, in Step S1702, the control unit 11 controls the power conditioner 13 so as to allocate the generated electric power to electric power selling. This is because since the electric power selling price Vm is the highest, allocating the whole electric power generation amount Pgen to electric power selling owing to the execution of electric power selling provides an economic benefit for the point issuer. Accordingly, "the electric power selling amount Psell=the electric power generation amount Pgen" is satisfied. In addition, since the whole electric power generation amount Pgen is regarded as the electric power selling amount Psell, "the charge amount Pchrg=0" and "the personal consumption amount Pcons=0" are satisfied.

On the other hand, when, in Step S1701, it is determined that the electric power selling allowable amount Psell_max is less than the electric power generation amount Pgen, the processing proceeds to Step S1703 (Step S1701: No). In addition, in Step S1702, the control unit 11 controls the power conditioner 13 so that electric power selling is performed with "the electric power selling amount Psell=the electric power selling allowable amount Psell_max" being assumed, using the generated electric power. This means that while performing electric power selling due to the execution of electric power selling provides a profit for the point issuer because the electric power selling price Vm is the highest, since the electric power selling allowable amount Psell_max is less than the electric power generation amount Pgen, electric power selling is performed with the electric power selling allowable amount Psell_max being set as un upper limit.

In this regard, however, since the electric power selling allowable amount Psell_max is less than the electric power generation amount Pgen, it is difficult to allocate the whole electric power generation amount Pgen to electric power selling. Therefore, a remainder occurs. Therefore, in Step S1704, the remainder is calculated as "the P2=the electric power generation amount Pgen-the electric power selling allowable amount Psell_max".

Next, in Step S1705, it is determined whether or not the total personal consumption amount Pcons_max is greater than or equal to the P2. When the total personal consumption amount Pcons_max is greater than or equal to the P2, the processing proceeds to Step S1706 (Step S1705: Yes).

In addition, in Step S1706, the control unit 11 controls the power conditioner 13 so as to allocate the P2 to personal consumption. This is because since the total personal consumption amount Pcons_max is greater than or equal to the P2 and the charging profit price Vc is the lowest, allocating, to personal consumption, electric power remaining owing to the execution of electric power selling without allocating the remaining electric power to charging has a benefit for the electric storage equipment holder. In addition, by directly allocating the electric power to personal consumption without performing charging, it may also be possible to lengthen the life of the storage battery module 30. Accordingly, "the personal consumption amount Pcons=the P2" is satisfied.

On the other hand, when, in Step S1705, it is determined whether or not the total personal consumption amount Pcons_max is less than the P2, the processing proceeds to Step S1707 (Step S1705: No). In addition, in Step S1707, the control unit 11 controls the power conditioner 13 so as to allocate the P2 to personal consumption. In this regard, however, since the total personal consumption amount Pcons_max is less than the P2 and it is difficult to allocate the whole P2 to personal consumption, personal consumption is performed as the total personal consumption amount Pcons_max. Accordingly, "the personal consumption amount Pcons=the total personal consumption amount Pcons_max" is satisfied.

When the total personal consumption amount Pcons_max is less than the P2 and the P2 is allocated to personal consumption with the total personal consumption amount Pcons_max being set as an upper limit, the remainder of the P2 occurs. Therefore, in Step S1708, the control unit 11 controls the power conditioner 13 so as to allocate the remainder of the P2 to charging. Accordingly, "the charge amount Pchrg=the P2-the total personal consumption amount Pcons_max" is satisfied.

Figure 23:
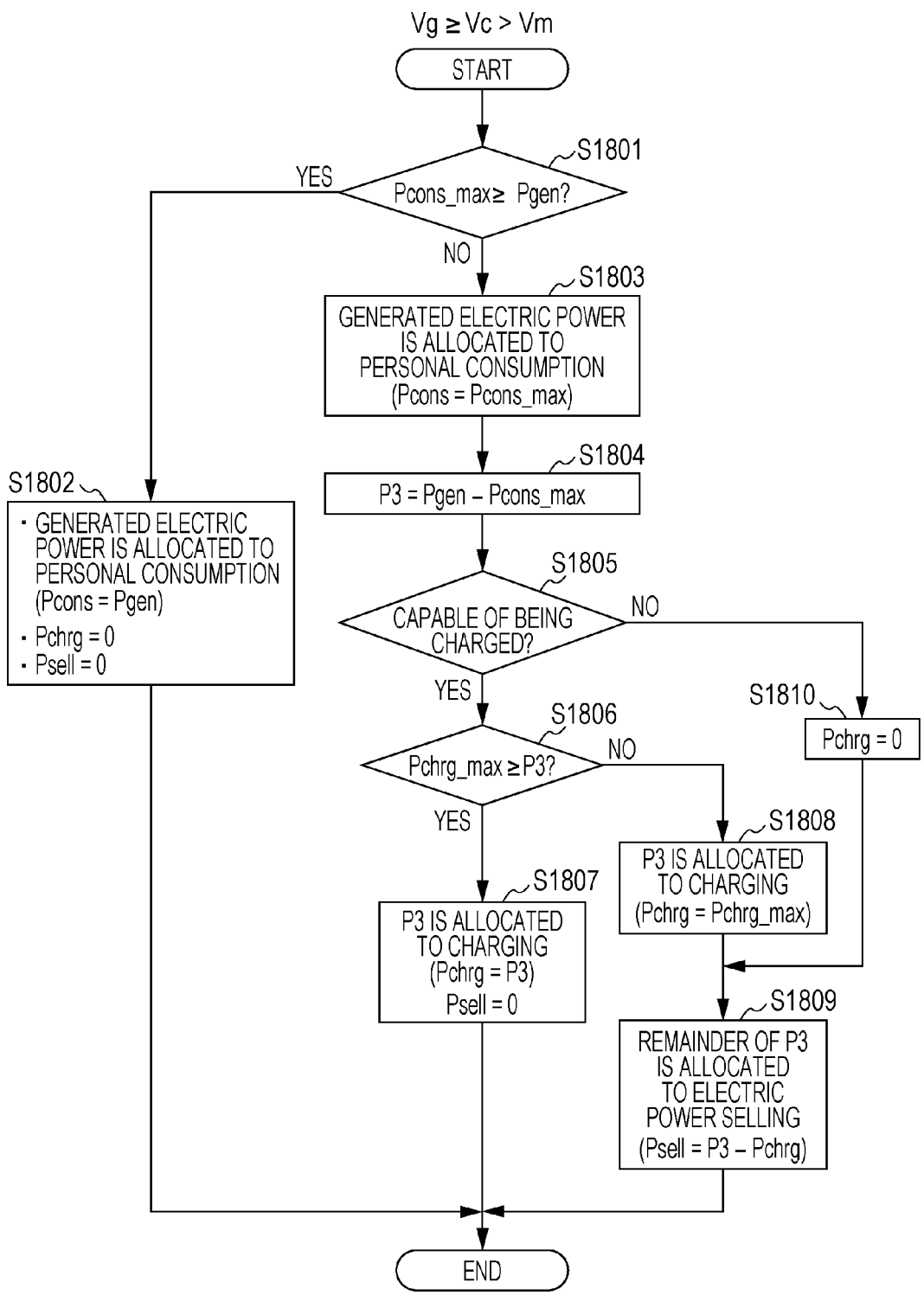
FIG. 23 is a flowchart illustrating a flow of processing performed in the electric power controller when an autonomous operation instruction is issued by the electric power/point management server.

Next, a case where it has been determined that the relationship between the electric power selling price Vm, the electric power purchasing price Vg, and the charging profit price Vc is "Vg≥Vc>Vm" will be described on the basis of a flowchart in FIG. 23.

First, in Step S1801, it is determined whether or not the total personal consumption amount Pcons_max is greater than or equal to the electric power generation amount Pgen. When the total personal consumption amount Pcons_max is greater than or equal to the electric power generation amount Pgen, the processing proceeds to Step S1802 (Step S1801: Yes). In addition, in Step S1802, the control unit 11 controls the power conditioner 13 so as to allocate the generated electric power to personal consumption. This is because since the electric power selling price Vm is the lowest, and the charging profit price Vc is the second lowest, even if the electric power generation amount Pgen is allocated to charging or electric power selling (electric power selling), the electric storage equipment holder does not obtain an economic benefit. Since the total personal consumption amount Pcons_max is greater than or equal to the electric power generation amount Pgen, it may be possible to allocate the whole electric power generation amount Pgen to personal consumption. Accordingly, "the personal consumption amount Pcons=the electric power generation amount Pgen" is satisfied.

On the other hand, when, in Step S1801, it is determined that the total personal consumption amount Pcons_max is less than the electric power generation amount Pgen, the processing proceeds to Step S1803 (Step S1801: No). In addition, in Step S1803, the control unit 11 controls the power conditioner 13 so as to allocate the generated electric power to personal consumption. In this regard, however, since the total personal consumption amount Pcons_max is less than the electric power generation amount Pgen and it is difficult to allocate the whole electric power generation amount Pgen, personal consumption is performed with the total personal consumption amount Pcons_max being set as an upper limit. Accordingly, "the personal consumption amount Pcons=the total personal consumption amount Pcons_max" is satisfied.

Next, in Step S1804, "the electric power generation amount Pgen−the total personal consumption amount Pcons_max" is calculated as the P3. Since, in the above-mentioned Step S1801, it has been determined that the total personal consumption amount Pcons_max is less than the electric power generation amount Pgen, the P3 indicates electric power, namely, personal consumption surplus electric power, which has remained with the electric power generation amount Pgen being allocated to personal consumption.

Next, in Step S1805, it is determined whether or not the storage battery module 30 is capable of being charged. When, in Step S1805, it is determined that the storage battery module 30 is capable of being charged, the processing proceeds to Step S1806 (Step S1805: Yes). Next, in Step S1806, it is determined whether or not the charge allowable amount Pchrg_max is greater than or equal to the P3.

When the charge allowable amount Pchrg_max is greater than or equal to the P3, the processing proceeds to Step S1807 (Step S1806: Yes). In addition, in Step S1807, the control unit 11 controls the power conditioner 13 so as to allocate the P3 to charging. This is because since the charging profit price Vc is higher than the electric power selling price Vm, performing charging provides an economic benefit for the electric storage equipment holder compared with performing electric power selling when the electric power generation amount Pgen is subjected to personal consumption and the P3 occurs. Accordingly, "the charge amount Pchrg=the P3" is satisfied.

On the other hand, when, in Step S1806, it is determined that the charge allowable amount Pchrg_max is less than the P3, the processing proceeds to Step S1808 (Step S1806: No). In addition, in Step S1808, the control unit 11 controls the power conditioner 13 so as to allocate the P3 to charging. This is because since the charging profit price Vc is higher than the electric power selling price Vm, allocating the P3 to charging provides a benefit for the electric storage equipment holder, compared with allocating the P3 to electric power selling. In this regard, however, since the charge allowable amount Pchrg_max is less than the P3, charging is performed with the charge allowable amount Pchrg_max being set as an upper limit. Accordingly, "the charge amount Pchrg=the charge allowable amount Pchrg_max" is satisfied.

If the P3 is allocated to charging with the charge allowable amount Pchrg_max being set as an upper limit when the charge allowable amount Pchrg_max is less than the P3, the remainder of the P3 occurs. In addition, next, in Step S1809, the control unit 11 controls the power conditioner 13 so as to allocate "the P3−the charge amount Pchrg" serving as the remainder to charging. This means that when the remainder of electric power still occurs even if the electric power generation amount Pgen has been allocated to personal consumption and furthermore, the P3 has been allocated to charging, electric power selling is performed.

The description returns to Step S1805. When, in Step S1805, it is determined that the storage battery module 30 is not capable of being charged, the processing proceeds to Step S1810 (Step S1805: No). Next, in Step S1810, "the charge amount Pchrg=0" is satisfied. This is due to the fact that the storage battery module 30 is not capable of being charged.

In addition, in Step S1809, the control unit 11 controls the power conditioner 13 so that electric power selling is performed with "the electric power selling amount Psell=the P3−the charge amount Pchrg" being assumed. This means that since it is difficult to allocate, to charging, the P3 still remaining even if the electric power generation amount Pgen has been allocated to personal consumption, electric power selling is performed. In this regard, however, when the processing has proceeded from Step S1810 to Step S1809, "the charge amount Pchrg=0" is satisfied. Therefore, "the electric power selling amount Psell=the P3" is satisfied.

Figure 24:
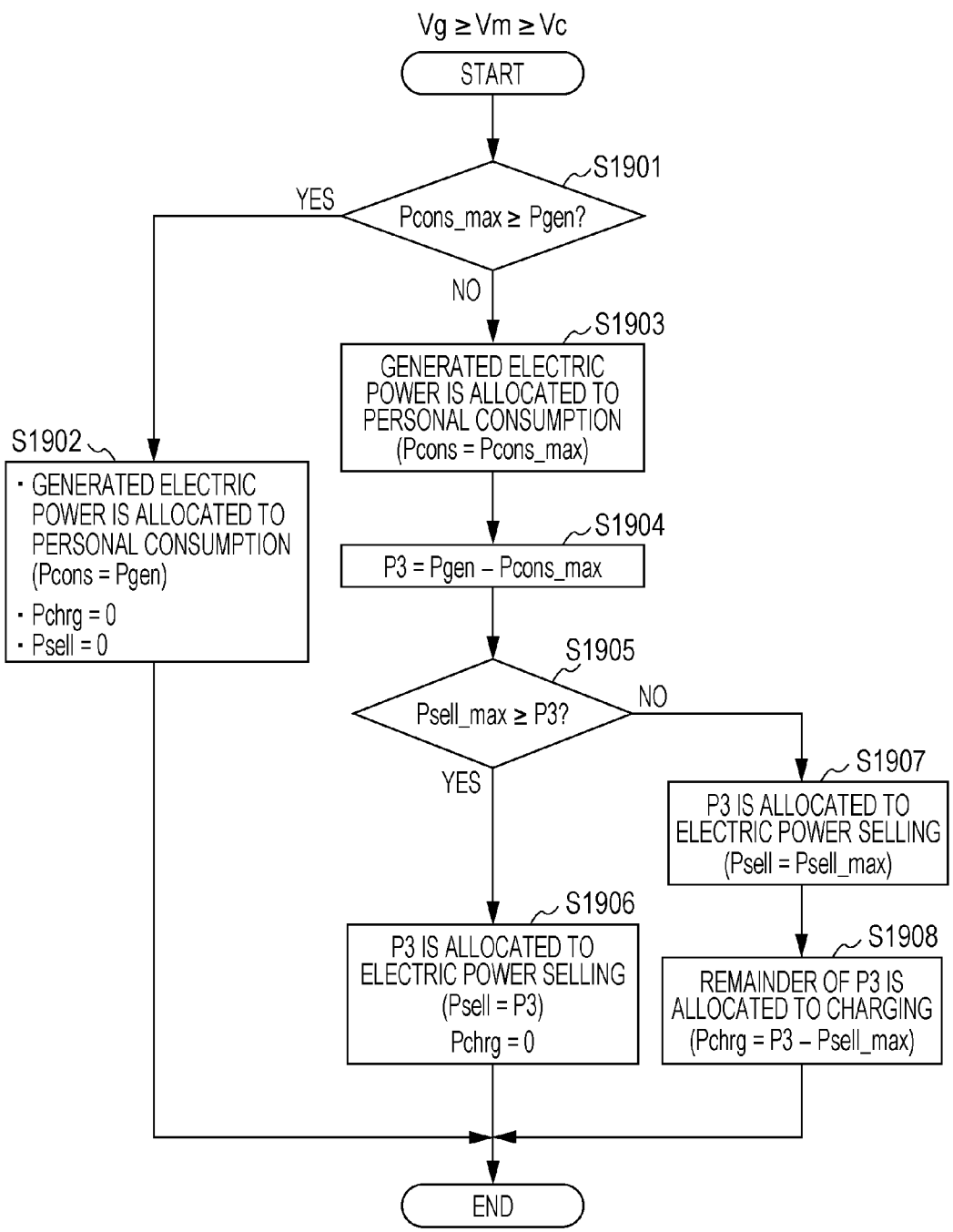
FIG. 24 is a flowchart illustrating a flow of processing performed in the electric power controller when an autonomous operation instruction is issued by the electric power/point management server.

Next, a case where it has been determined that the relationship between the electric power selling price Vm, the electric power purchasing price Vg, and the charging profit price Vc is "Vg≥Vm≥Vc" will be described on the basis of a flowchart in FIG. 24. In addition, since Steps S1901 to S1904 are the same as Steps S1801 to S1804 in the flowchart in FIG. 23, the description thereof will be omitted. The description will be performed on and after Step S1905.

In Step S1905, it is determined whether or not the electric power selling allowable amount Psell_max is greater than or equal to the P3. When the electric power selling allowable amount Psell_max is greater than or equal to the P3, the processing proceeds to Step S1906 (Step S1905: Yes).

In addition, in Step S1906, the control unit 11 controls the power conditioner 13 so as to allocate the P3 to electric power selling. Since the electric power selling allowable amount Psell_max is greater than or equal to the P3 and it may be possible to allocate the whole P3 to electric power selling, "the electric power selling amount Psell=the P3" is satisfied. This is because since the electric power selling price Vm is higher than the charging profit price Vc, allocating the P3 to electric power selling due to the execution of electric power selling provides a profit for the point issuer.

On the other hand, when, in Step S1905, it is determined that the electric power selling allowable amount Psell_max is less than the P3, the processing proceeds to Step S1907 (Step S1905: No). In addition, in Step S1907, the control unit 11 controls the power conditioner 13 so as to allocate the P3 to electric power selling. In this regard, however, since the electric power selling allowable amount Psell_max is less than the P3 and it is difficult to allocate the whole P3 to electric power selling, electric power selling is performed with the electric power selling allowable amount Psell_max being set as an upper limit. Accordingly, "the electric power selling amount Psell=the electric power selling allowable amount Psell_max" is satisfied.

When electric power selling is performed with the electric power selling allowable amount Psell_max being set as an upper limit, a remainder corresponding to "the P3−the electric power selling allowable amount Psell_max" occurs. Therefore, in Step S1908, the control unit 11 controls the power conditioner 13 so as to allocate, to charging, the remainder with "the charge amount Pchrg=the P3−the electric power selling allowable amount Psell_max" being assumed.

[1-9. Processing in Electric Power/Point Management Server: Point Issuing Processing]

{1-9-1. Point Issuing Processing Performed when Generated Electric Power is not Allocated to Electric Power Selling}

Figure 25:
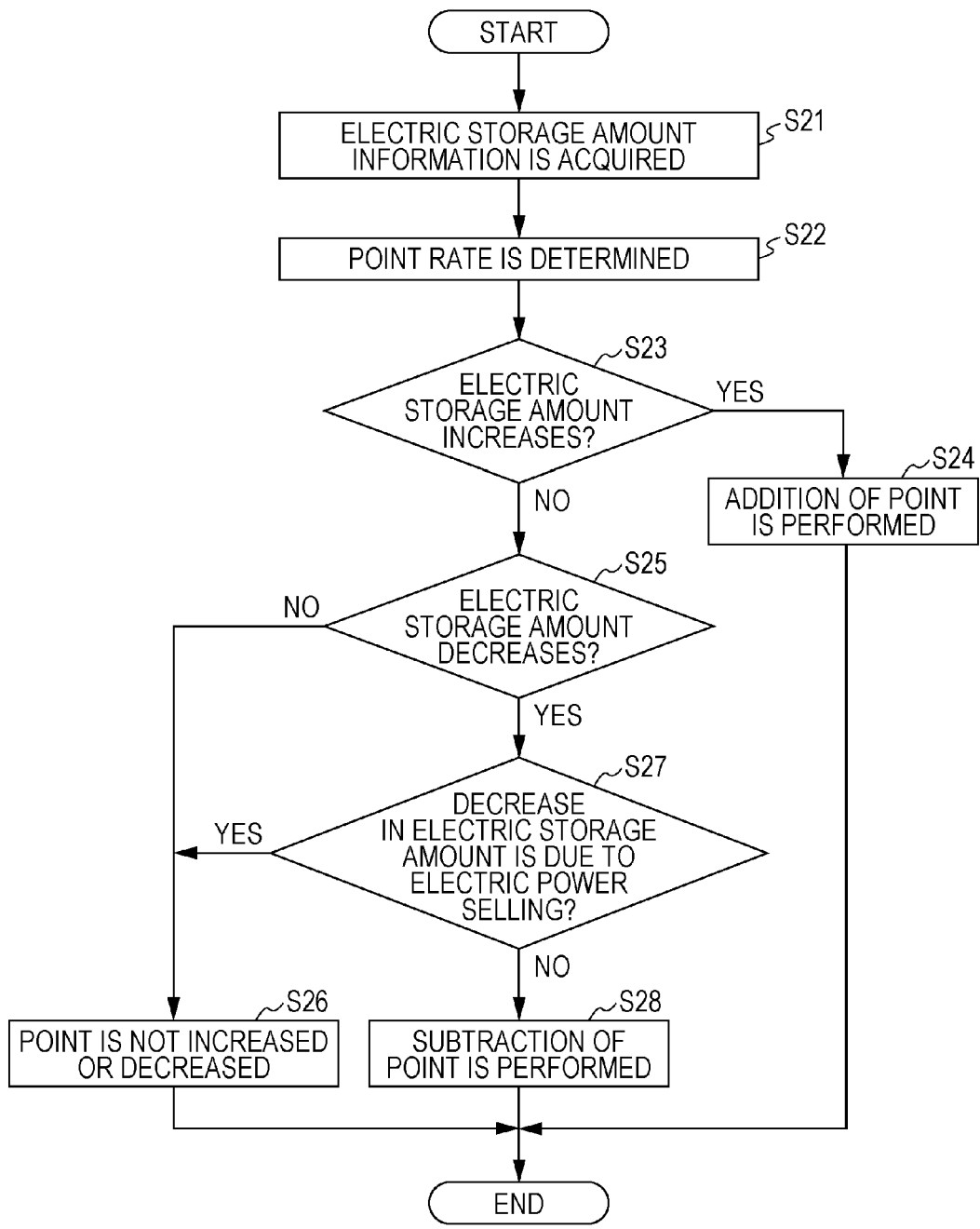
FIG. 25 is a flowchart illustrating a flow of point issuing processing performed in the electric power/point management server when generated electric power is not allocated to electric power selling.

Next, point issuing processing will be described. First, with reference to FIG. 25 to FIG. 28, point issuing processing will be described that is performed when an instruction for electric power selling has been issued from the electric power/point management server 200 and electric power selling processing has not been performed owing to generated electric power due to the electric power generation equipment 40. FIG. 25 is a flowchart illustrating the flow of the point issuing processing, and this processing is performed by the point rate determination unit 222 and the point issuing unit 223. The point issuing processing is processing for giving a point to the electric storage equipment holder in response to an electric storage amount in the storage battery module 30.

First, in Step S21, the acquisition of the electric storage amount information in the storage battery module 30 is performed. In addition, the acquisition of the electric storage amount information is not only performed when the point issuing processing is performed, but may also be continuously performed on a periodic basis. In that case, in the point issuing processing, processing is performed on the basis of an electric storage amount indicated by the latest electric storage amount information at that time.

Next, in Step S22, a point rate is determined. Here, a determination method for the point rate will be described. First, a rate (referred to as a goods/service rate) between the price of goods/service provided by the goods/service provider and a point necessary for obtaining the goods/service is fixed.

Next, the average price of electric power market prices is calculated. This average electric power price is the basis of calculating the point rate. For example, the average electric power price is calculated as a unit price per unit electric power amount.

Figure 26:
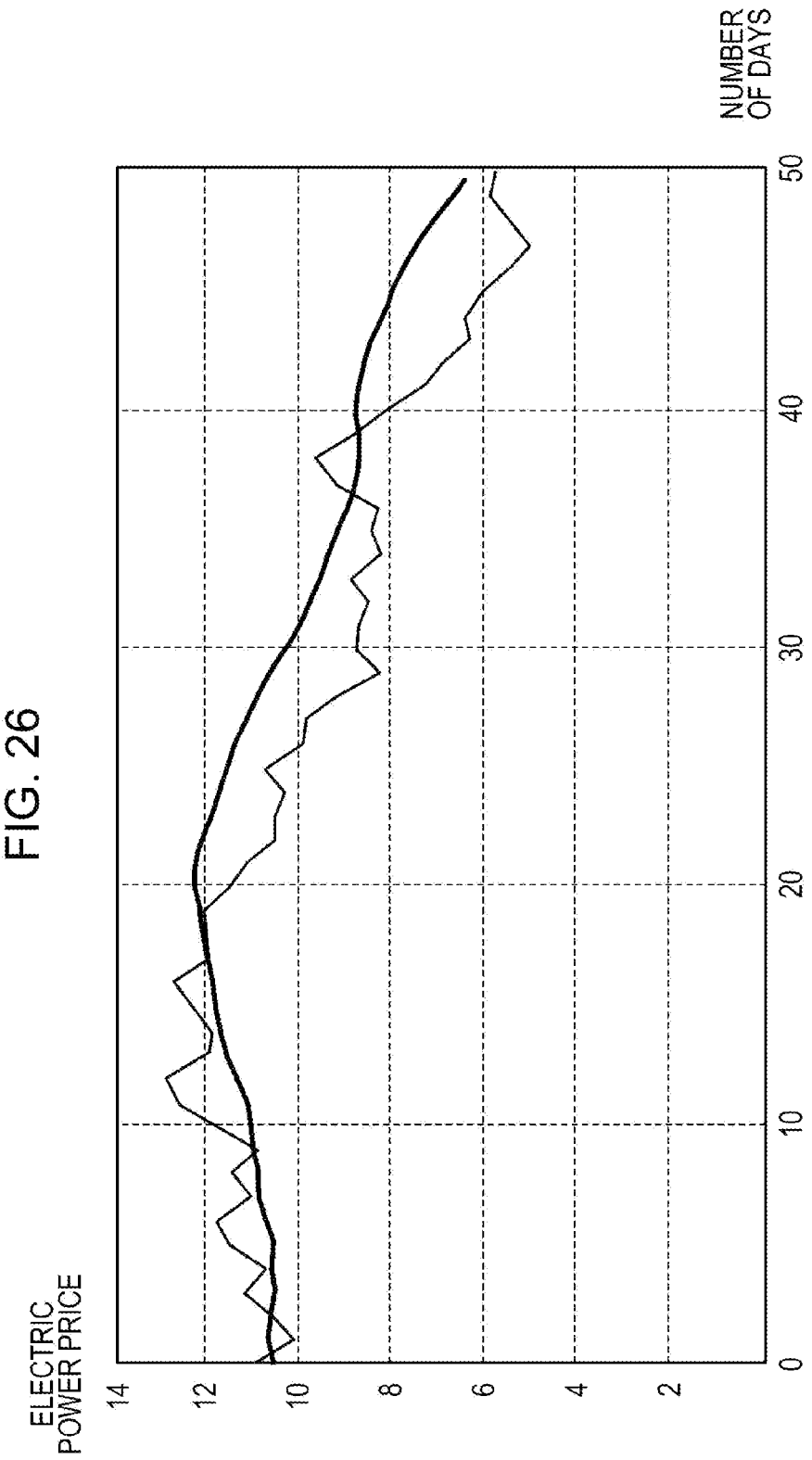
FIG. 26 is a diagram for explaining an example of calculating an average electric power price.
Figure 27:
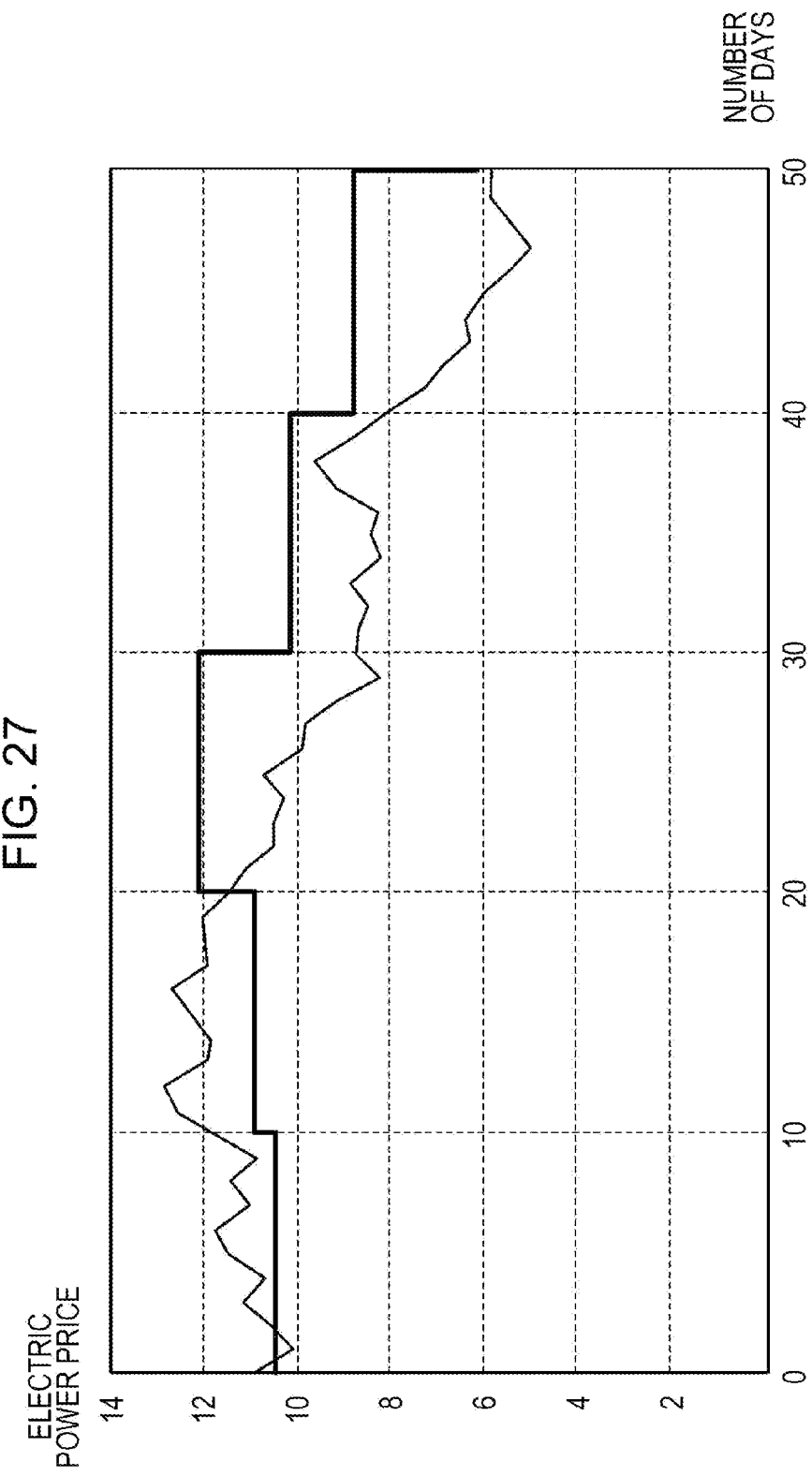
FIG. 27 is a diagram for explaining another example of calculating an average electric power price.

It may be possible to perform the calculation of the average electric power price using various methods. The examples thereof are illustrated in FIG. 26 and FIG. 27. FIG. 26 illustrates an example in which a moving average for a period of 10 days is calculated, with the vertical axis thereof indicating an electric power price and the horizontal axis thereof indicating the number of days. A thin line indicates the electric power market price, and a solid line indicates the moving average. In this case, while the point rate also fluctuates, the magnitude of the fluctuation is small compared with the fluctuation of the electric power market price. Accordingly, it may be possible to reduce a price fluctuation risk due to the fluctuation of the electric power market price.

For example, the determination of the point rate may be performed midnight every day, and for 24 hours thereafter, this point rate may be used. In addition, it is desirable that the determination of the point rate is performed at a predetermined time interval, for example, once a week, once a month, once a year, and the like, and this point rate may be used until the next determination of the point rate.

In addition, FIG. 27 illustrates a case where an average electric power price corresponding to past 10 days of daily electric power market prices is calculated every 10 days and that average electric power price is defined as the reference for calculating the point rate during subsequent 10 days. A thin line indicates the electric power price, and a solid line indicates the average electric power price. In this case, the magnitude of the fluctuation of the point rate is also small compared with the fluctuation of the electric power market price. Accordingly, it may be possible to reduce a price fluctuation risk due to the fluctuation of the electric power market price. A time period during which the average electric power price is calculated is not limited to 10 days, and may be one week, one month, one year, or the like.

In addition, the average electric power price calculated in such a way is converted into a point on the basis of the goods/service rate. Accordingly, the point rate between the electric storage amount and the point is determined.

For example, when points necessary for being exchanged for a gift coupon worth 1000 yen are 100 points, the goods/service rate is 10 yen per 1 point. In addition, if the average electric power price of the electric power market price in a predetermined time period is 10 yen per 1 kwh, the point rate is 1 point per 1 kwh. When 1 kwh of electric power is stored in the electric storage equipment 100, 1 point is given to the electric storage equipment holder. In this regard, however, this rate is an example illustrated for description.

In this way, the point rate is set on the basis of the average electric power price obtained by averaging the electric power market price fluctuating in the electric power market, and hence the fluctuation of the point rate is smaller than the fluctuation of the electric power market price. Accordingly, it may be possible to avoid the electric storage equipment holder form being subjected to the electric power price fluctuation risk. Accordingly, it may be possible to provide standard homes and companies with incentives to introduce the electric storage equipment and also incentives to participate in the electric power market through the system according to an embodiment of the present application.

In addition, when, as described above, there is an individual contract between the electric storage equipment holder and the point issuer, the content of that contract may also be regarded as the basis for the determination of the point rate. For example, the individual contract indicates whether or not it is possible for the electric storage equipment holder to subject electric power stored in the storage battery module 30 to personal consumption, whether or not it is possible to freely perform electric power selling on the basis of the intention of the holder, or the like.

Basically, it is desirable that, in the case of a contract where the degree of freedom of the electric storage equipment holder is low, the point rate is set to a high rate so that it is possible for the electric storage equipment holder to obtain more benefits. For example, the case where the degree of freedom is low is the case of a contract where it is difficult for the electric storage equipment holder to subject electric power from the electric power generation equipment 40 to personal consumption and freely sell or purchase the electric power (namely, the whole stored electric power is only used for electric power selling under the control of the electric power/point management server 200 on the point issuer side). In this case, since the whole determination of electric power selling or purchasing is performed in the electric power/point management server 200 and the intention of the electric storage equipment holder is not reflected, it is desirable that a high point rate is set.

On the other hand, in a case where the degree of freedom is high, it is desirable that the point rate is set to a low rate so that the point issuer has an advantage. For example, in the case of a contract where it is possible for the electric storage equipment holder to subject the electric power from the electric power generation equipment 40 to personal consumption, a case is likely to occur where even if the point issuer intends to perform electric power selling, the electric storage amount of the storage battery module 30 is less than an intended electric power selling amount. Accordingly in such a case, it is desirable that the point rate is set so that the point issuer has an advantage.

The description returns to the flowchart in FIG. 25. Next, in Step S23, it is determined whether or not the electric storage amount in the storage battery module 30 has increased compared with the previously acquired electric storage amount. When it is determined that the electric storage amount has increased, the processing proceeds to Step S24 (Step S23: Yes).

In addition, in Step S24, on the basis of the point rate determined in Step S22, the point issuing unit 223 issues a point, and the point is added. In addition, the point is not added with respect to the electric storage amount itself, but added with respect to an increase from the electric storage amount at the time of previous point issuing. The point issuing unit 223 manages point information indicating the number of current points, and may also manage the history of a decrease or an increase in a point. In addition, the point information may also be transmitted to the electric power controller 10 through the network and the communication unit 12.

On the other hand, when, in Step S23, it is determined that the electric storage amount has not increased, the processing proceeds to Step S25 (Step S23: No). Next, in Step S25, it is determined whether or not the electric storage amount has decreased compared with the previously acquired electric storage amount. When it is determined that the electric storage amount has not decreased, the processing proceeds to Step S26 (Step S25: No).

A case where, in the above-mentioned Step S23, it has been determined that the electric storage amount has not increased and furthermore, in Step S25, it has been determined that the electric storage amount has not decreased means namely that the electric storage amount has not changed. Accordingly, namely, in Step S26, the point is not decreased or increased.

The description returns to Step S25. When, in Step S25, it is determined that the electric storage amount has decreased compared with the previously acquired electric storage amount, the processing proceeds to Step S27 (Step S25: Yes). Next, in Step S27, it is determined whether or not a decrease in the electric storage amount is based on electric power selling due to the instruction of the electric power/point management server 200.

When it is determined that a decrease in the electric storage amount is not based on electric power selling due to the instruction of the electric power/point management server 200 (Step S27: No), the processing proceeds to Step S28. In addition, in Step S28, the point issuing unit 223 issues a negative point, and hence the subtraction of a point is performed. A case where a decrease in the electric storage amount is not based on electric power selling due to the instruction of the electric power/point management server 200 is a case where the electric storage equipment holder has consumed the electric power owing to personal consumption and hence the electric storage amount decreases. Alternatively, the case where a decrease in the electric storage amount is not based on electric power selling due to the instruction of the electric power/point management server 200 is a case where the electric storage equipment holder has performed electric power selling on a voluntary basis. Since it is considered that, in this case, electric power on which it is possible for the point issuer to perform electric power selling has been decreased by the electric storage equipment holder, the point is subjected to subtraction. The subtraction of the point is performed on a decrease from the electric storage amount at the time of previous point issuing.

On the other hand, when it is determined that a decrease in the electric storage amount is based on electric power selling due to the instruction of the electric power/point management server 200 (Step S27: Yes), the processing proceeds to Step S26, and the point is not decreased or increased. Since a case where the electric storage amount has decreased owing to electric power selling is a case where the point issuer has obtained a profit owing to electric power selling, it is undesirable that, in such a case, the point of the electric storage equipment holder is decreased. In addition, in the case of a contract where it is difficult for the electric storage equipment holder to perform personal consumption, processing in Step S27 may not be necessary.

In this way, the point issuing processing is performed. Next, with reference to FIG. 28, the above-mentioned point issuing processing will be described with a specific example being cited.

Figure 28:
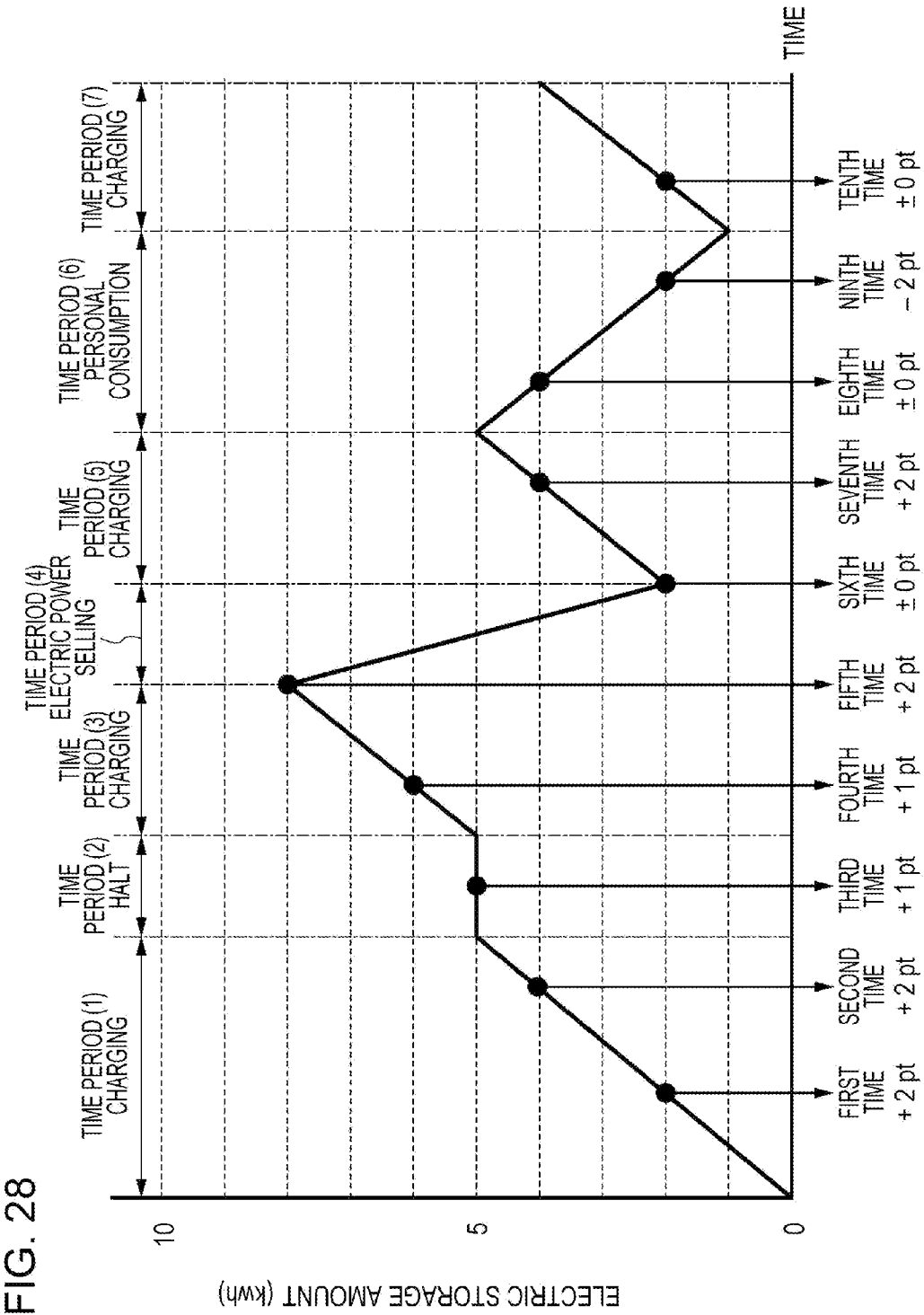
FIG. 28 is a diagram illustrating a specific example of point issuing processing performed when generated electric power is not allocated to electric power selling.

FIG. 28 is a graph illustrating the change of the electric storage amount within a time period with the vertical axis thereof indicating an electric storage amount and the horizontal axis thereof indicating a time. An arrow extending in a downward direction in response to the horizontal axis indicates a time point when the point issuing processing is performed. As illustrated by this arrow, the acquisition of the electric storage amount and point issuing based thereon are regularly performed. In addition, so as to facilitate understanding of the description, it is assumed that the point rate is 1 point per electric storage amount 1 kwh.

First, when a charging command instructing to perform charging has been transmitted from the electric power/point management server 200 to the electric power controller 10, charging based on electric power from the electric power generation equipment 40 is performed (a time period (1)). In this regard, however, charging may be performed owing to electric power purchasing. In addition, when an autonomous operation command instructing to perform autonomous operation has been transmitted from the electric power/point management server 200 to the electric power controller 10 and the electric storage equipment 30 has not been charged with the electric power from the electric power generation equipment 40, the electric power from the electric power generation equipment 40 is directly allocated to charging or personal consumption. Accordingly, the electric storage amount does not change (a time period (2)). Second point issuing processing is performed until the charging illustrated in the time period (1) is halted.

Since, at the first point issuing, the electric storage amount has increased by 2 kwh from an initial value (0 kwh), 2 points are added. Next, since, at the time of the second point issuing, the electric storage amount has increased by 2 kwh compared with the time of the first point issuing, 2 points are added.

In addition, third point issuing processing is performed during halt illustrated in the time period (2). Since, at the time of the third point issuing, the electric storage amount has increased by 1 kwh compared with the time of the second point issuing, +1 point is added.

When a charging command has been transmitted from the electric power/point management server 200 again, charging based on electric power from the electric power generation equipment 40 is performed (a time period (3)). During the time period (3) when charging is performed, two point issuing processing operations are performed. Since, at the time of the fourth point issuing, the electric storage amount has increased by 1 kwh compared with the time of the third point issuing, 1 point is added. Next, since, at the time of the fifth point issuing, the electric storage amount has increased by 2 kwh compared with the time of the fourth point issuing, +2 points are added.

Next, a discharging command instructing to perform discharging has been transmitted from the electric power/point management server 200, and the electric storage amount decreases owing to discharging (electric power selling) from the storage battery module 30 (a time period (4)). In addition, when discharging is prescribed, it is desirable that, so as to correctly understand an electric storage amount capable of being discharged and an electric power amount subjected to electric power selling, the electric power/point management server 200 acquires electric storage amounts immediately before the start of electric power selling and immediately after the termination of electric power selling, separately from the acquisition of an electric storage amount for point issuing.

Sixth point issuing processing is performed during a time period illustrated in the time period (4). At the time of the sixth point issuing, the electric storage amount has decreased by 6 kwh compared with the time of the fifth point issuing. However, since this decrease has occurred owing to discharging based on the instruction from the electric power/point management server 200, the point is not decreased or increased.

When a charging command has been transmitted from the electric power/point management server 200 again, charging is performed and the electric storage amount increases (a time period (5)). During the time period (5), seventh point issuing processing is performed. Since, at the time of the seventh point issuing, the electric storage amount has increased by 2 kwh compared with the time of the sixth point issuing, 2 points are added.

During a subsequent time period (6), personal consumption is performed where the electric storage equipment holder uses electric power stored in the electric storage equipment 100. During this time period (6), two point issuing processing operations are performed. Since, at the time of eighth point issuing, the electric storage amount remains the same, compared with the time of the seventh point issuing, the point is not decreased or increased. Subsequently, at the time of ninth point issuing, the electric storage amount has decreased by 2 kwh compared with the time of the eighth point issuing. Since this is a decrease due to personal consumption, 2 points are subtracted. Namely, the point the electric storage equipment holder has held is reduced by 2 point.

In addition, when a charging command has been transmitted from the electric power/point management server 200, charging is performed and the electric storage amount continues to increase (a time period (7)). In addition, when an operation mode is switched to the autonomous operation mode, the control unit 11 may memorize the operation mode before the autonomous operation mode, and when the personal consumption is terminated, the control unit 11 may return to the operation mode before the autonomous operation mode, with no command from the electric power/point management server 200.

During the time period (7), tenth point issuing processing is performed. Since, at the time of the tenth point issuing, the electric storage amount remains the same, compared with the time of the ninth point issuing, the point is not decreased or increased.

In such a way as described above, the point issuing processing when no generated electric power is allocated to electric power selling is performed.

{1-9-2. Point Issuing Processing Performed when Generated Electric Power is Allocated to Electric Power Selling}

Next, point issuing processing will be described that is performed when an electric power selling instruction has been issued from the electric power/point management server 200 and generated electric power due to the electric power generation equipment 40 is allocated to the electric power selling of the storage battery module 30. First, the desirability of performing different point issuing processing when the electric power selling instruction has been issued from the electric power/point management server 200 and the generated electric power has been allocated to electric power selling will be described with reference to FIG. 29.

Figure 29:
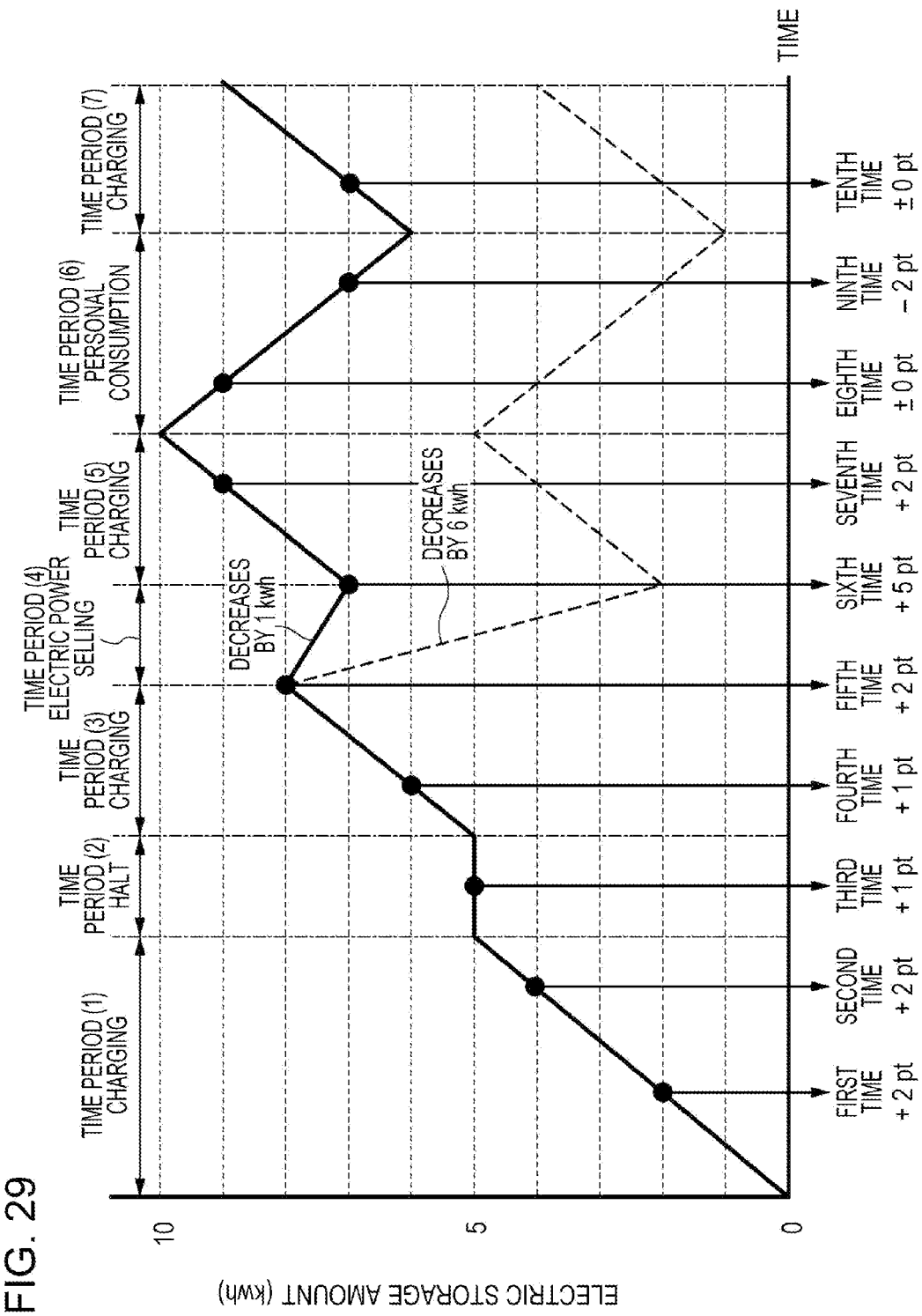
FIG. 29 is a diagram for explaining desirability of performing different point issuing processing when generated electric power is allocated to electric power selling.

In the same way as FIG. 28, FIG. 29 is a graph illustrating the change of the electric storage amount within a time period with the vertical axis thereof indicating an electric storage amount and the horizontal axis thereof indicating a time. An arrow extending in a downward direction in response to the horizontal axis indicates a time point when the point issuing processing is performed. As illustrated by this arrow, point issuing is regularly performed. In addition, so as to facilitate understanding of the description, it is assumed that the point rate is 1 point per electric storage amount 1 kwh.

In FIG. 29, in a time period (4), 6 kwh of electric power selling is performed on the basis of an electric power selling instruction from the electric power/point management server 200. It is assumed that, in this electric power selling, 5 kwh is supplied owing to generated electric power and 1 kwh is supplied owing to discharging from the storage battery module 30. Accordingly, in FIG. 29, a decrease in the electric storage amount in the storage battery module 30 is not 6 kwh illustrated by a dashed line but 1 kwh illustrated by a solid line. In addition, the dashed line indicates a case where the whole 6 kwh of electric power selling is supplied owing to discharging from the storage battery module 30.

It might be possible to allocate 5 kwh of generated electric power, allocated to electric power selling, to charging if the electric power selling instruction were not issued from the electric power/point management server 200. If it is possible to allocate 5 kwh of generated electric power to charging, it may be possible for the electric storage equipment holder to obtain a point corresponding to 5 kwh. Accordingly, when the electric power selling instruction has been issued from the electric power/point management server 200 and the generated electric power is allocated to electric power selling, the generated electric power, which might be capable of being allocated to charging if the electric power selling instruction were not issued, is allocated to electric power selling. Therefore, if point issuing corresponding to that amount is not performed, the electric storage equipment holder suffers a disadvantage. Therefore, assuming that the storage battery module 30 is charged with 5 kwh of generated electric power once, and 5 kwh of generated electric power is extracted from the storage battery module 30 to be allocated to electric power selling, it is assumed that a point corresponding to 5 kwh is issued. Accordingly, at the time of sixth point issuing, 5 points turn out to be added.

Figure 30:
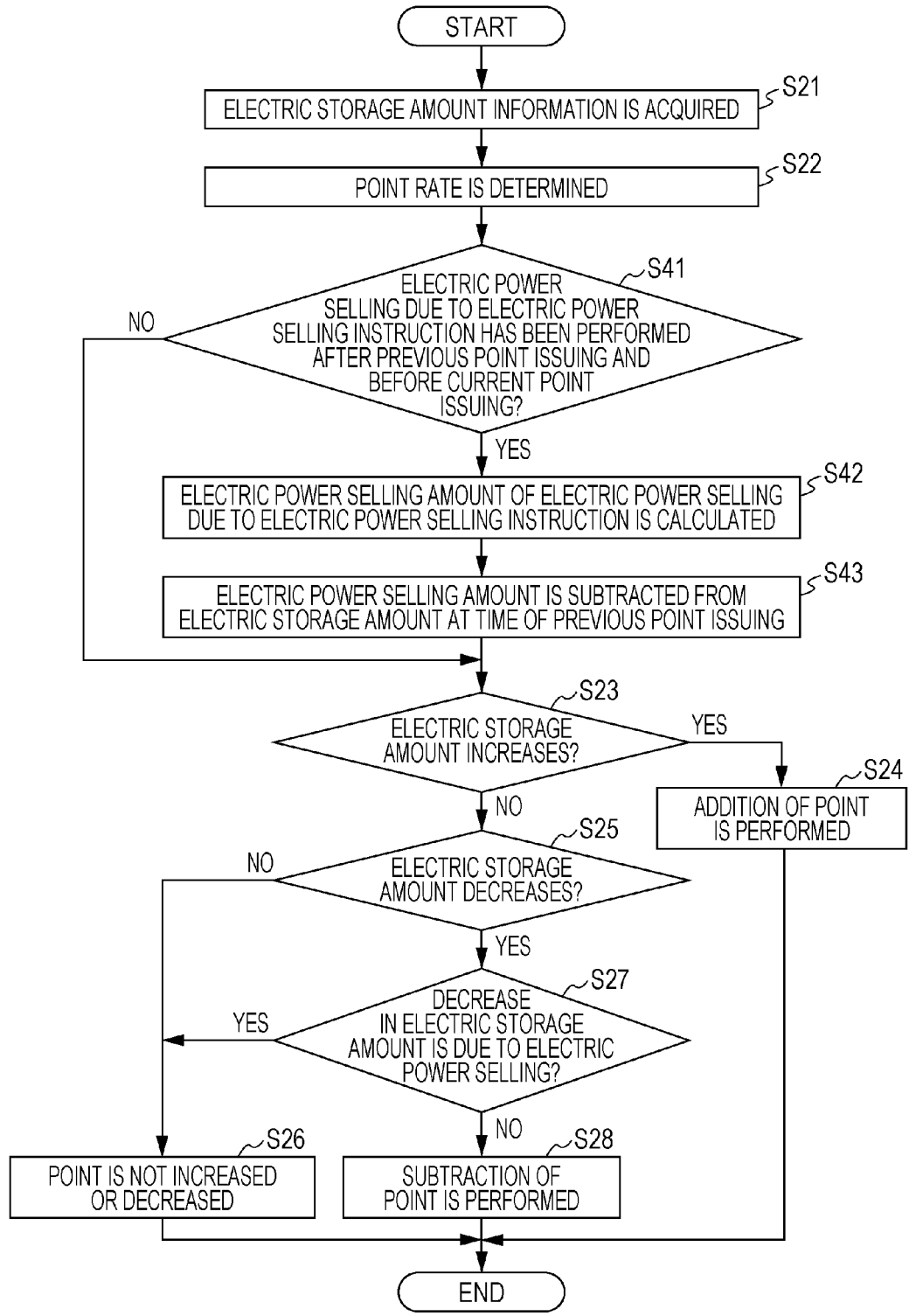
FIG. 30 is a flowchart illustrating a flow of point issuing processing performed when generated electric power is allocated to electric power selling.

Next, with reference to FIG. 30, the point issuing processing will be described that is performed when the electric power selling instruction has been issued from the electric power/point management server 200 and the generated electric power has been allocated to electric power selling. This processing is performed by the point rate determination unit 222 and the point issuing unit 223. Step S21 and Step S22 are the same as those illustrated in FIG. 25, the electric storage amount information in the storage battery module 30 is acquired in Step S21, and next, in Step S22, a point rate is determined.

Next, in Step S41, it is determined whether or not an electric power selling instruction has been issued from the electric power/point management server 200 after previous point issuing and before current point issuing and electric power selling has been performed. When the electric power selling instruction has been issued from the electric power/point management server and the generated electric power has been allocated to electric power selling, the processing proceeds to Step S42 (Step S42: Yes).

Next, in Step S42, the electric power selling amount of electric power selling performed on the basis of the electric power selling instruction from the electric power/point management server 200 is acquired. It is desirable that the control unit 11 in the electric power controller 10 is inquired and the electric power selling amount is acquired on the basis of an answer from the control unit 11.

Next, in Step S43, the electric power selling amount acquired in Step S42 is subtracted from an electric storage amount at the time of previous point issuing. In addition, the processing proceeds to Step S23. Operations in and after Step S23 are the same as those illustrated in FIG. 25. In this regard, however, since, in Step S43, the electric power selling amount has been subtracted from the electric storage amount at the time of the previous point issuing, it is determined on the basis of the electric storage amount subjected to the subtraction whether or not an electric storage amount increases or decreases, in or after Step S23.

Figure 31:
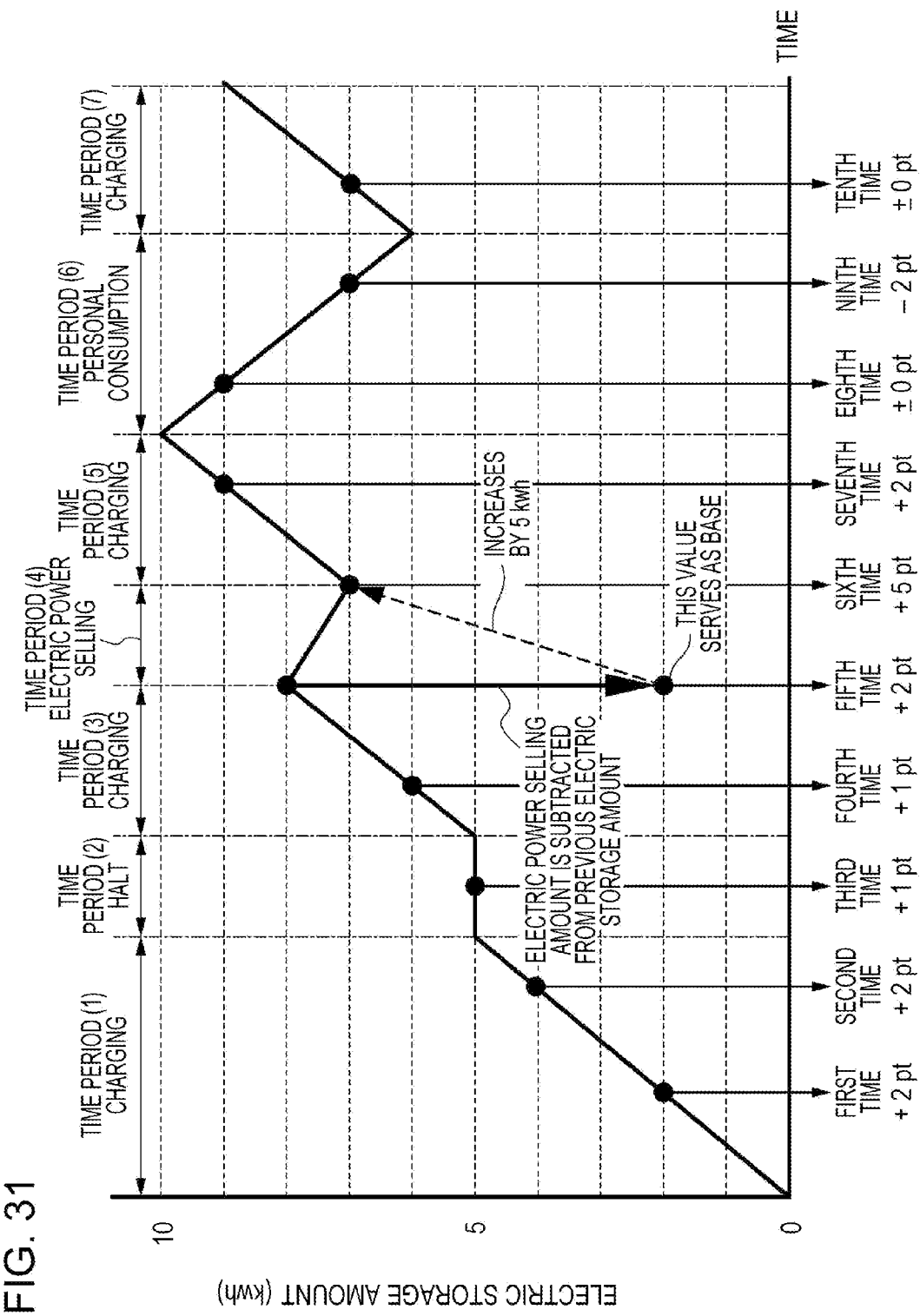
FIG. 31 is a diagram illustrating a specific example of point issuing processing performed when generated electric power is allocated to electric power selling.

This point will be described with reference to FIG. 31. It is assumed that, in a time period (4), an electric power selling instruction has been issued from the electric power/point management server 200 and electric power selling has been performed owing to generated electric power. In this case, in sixth point issuing processing, the processing illustrated in the flowchart in FIG. 30 is performed. In this case, an electric power selling amount is subtracted from an electric storage amount at the time of fifth point issuing which corresponds to previous point issuing. In this regard, however, this does not influence the fifth point issuing. Since the electric storage amount at the time of the fifth point issuing is 8 kwh and the electric power selling amount is 6 kwh, the electric storage amount turns out to be 2 kwh owing to the subtraction. In addition, on the basis of the 2 kwh, sixth point issuing processing is performed. When doing so, the electric storage amount at the time of the sixth point issuing is 7 kwh, and the electric storage amount has increased by 5 kwh from 2 kwh serving as a reference. Accordingly, 5 points are added.

In such a way as described above, the point issuing processing in the electric power/point management server 200 is performed.

[1-10. Electric Power Control Processing Performed when it is Possible for Electric Power Controller Side to Determine Intended Use of Electric Power]

Figure 32:
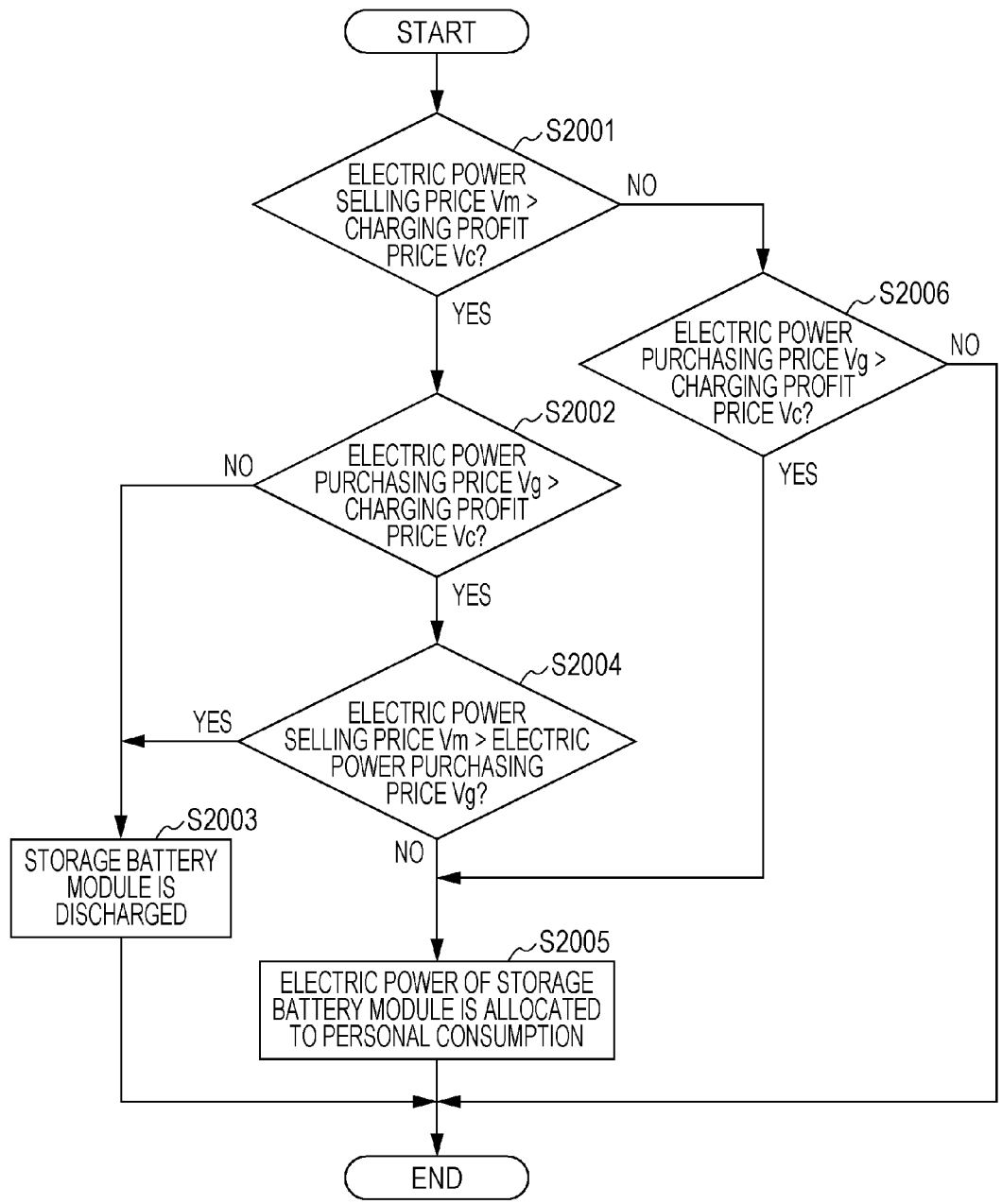
FIG. 32 is a flowchart illustrating a flow of electric power control processing performed when it is possible for an electric power controller side to determine an intended use of electric power stored in the electric storage equipment.

Next, with reference to FIG. 32, electric power control processing will be described that is performed when it is possible for the electric power controller 10 side to determine an intended use of electric power stored in the electric storage equipment 100. This processing is performed when a contract is concluded where it is possible for the electric storage equipment holder side to determine an intended use of electric power. This processing is performed by the control unit 11 in the electric power controller 10. In addition, the electric storage equipment holder may preliminarily perform the setting of the electric power controller 10 so that the control unit 11 performs this processing, or this processing may be performed when the electric storage equipment holder issues an input instruction using the input unit 21.

First, in Step S2001, it is determined whether or not the electric power selling price Vm is larger than the charging profit price Vc. In addition, it may be possible to acquire the electric power selling price Vm and the electric power purchasing price Vg by receiving the electric power price information from the electric power/point management server 200 through the network. In addition, the electric power controller 10 may be connected to the server of an electric power company in the electric power market or the server of a broker mediating electricity trading in the electric power market, and hence, the electric power price information may also be directly acquired. The charging profit price Vc may also be acquired from the electric power/point management server 200 through the network, and may also be calculated on the electric power controller 10 side, using the above-mentioned method.

When the electric power selling price Vm is larger than the charging profit price Vc (Step S2001: Yes), the processing proceeds to Step S2002, and it is determined whether or not the electric power purchasing price Vg is larger than the charging profit price Vc. Next, when the electric power purchasing price Vg is less than or equal to the charging profit price Vc, the processing proceeds to Step S2003 (Step S2002: No). In this case, a relationship between the individual prices is "the electric power selling price Vm>the charging profit price Vc≥the electric power purchasing price Vg".

In addition, in Step S2003, the control unit 11 controls the power conditioner 13 so as to extract electric power stored in the storage battery module 30 and perform discharging. This is because since the electric power selling price Vm is the highest, performing electric power selling owing to discharging provides a profit for the electric storage equipment holder.

On the other hand, when, in Step S2002, it is determined that the electric power purchasing price Vg is larger than the charging profit price Vc, the processing proceeds to Step S2004 (Step S2002: Yes).

Next, in Step S2004, it is determined whether or not the electric power selling price Vm is larger than the electric power purchasing price Vg. When the electric power selling price Vm is larger than the electric power purchasing price Vg, the processing proceeds to Step S2003 (Step S2004: Yes). In this case, a relationship between the individual prices is "the electric power selling price Vm>the electric power purchasing price Vg>the charging profit price Vc".

In addition, in Step S2003, the control unit 11 controls the power conditioner 13 so as to extract electric power stored in the storage battery module 30 and perform discharging. This is because since the electric power selling price Vm is the highest, performing electric power selling owing to discharging provides a profit for the electric storage equipment holder.

On the other hand, when, in Step S2004, the electric power selling price Vm is less than or equal to the electric power purchasing price Vg, the processing proceeds to Step S2005 (Step S2004: No). In this case, a relationship between the individual prices is "the electric power purchasing price Vg≥the electric power selling price Vm>the charging profit price Vc".

In addition, in Step S2005, the control unit 11 controls the power conditioner 13 so as to extract and allocate electric power stored in the storage battery module 30 to personal consumption. This is because since the electric power purchasing price Vg is the highest and the charging profit price Vc is the lowest, performing personal consumption using the electric power stored in the storage battery module 30 provides a profit for the electric storage equipment holder.

The description returns to Step S2001. When, in Step S2001, it is determined that the electric power selling price Vm is less than or equal to the charging profit price Vc, the processing proceeds to Step S2006 (Step S2001: No). Next, in Step S2006, it is determined whether or not the electric power purchasing price Vg is larger than the charging profit price Vc. When the electric power purchasing price Vg is larger than the charging profit price Vc, the processing proceeds to Step S2005 (Step S2006: Yes). In this case, a relationship between the individual prices is "the electric power purchasing price Vg>the charging profit price Vc≥the electric power selling price Vm".

In addition, in Step S2005, the control unit 11 controls the power conditioner 13 so as to extract and allocate electric power stored in the storage battery module 30 to personal consumption. This is because since the electric power purchasing price Vg is the highest, performing personal consumption using the electric power stored in the storage battery module 30 without performing charging owing to electric power purchasing provides a profit for the electric storage equipment holder.

On the other hand, when, in Step S2006, the electric power purchasing price Vg is less than or equal to the charging profit price Vc, the processing is terminated without being performed (Step S2006: No).

In such a way as described above, the electric power control processing is performed that is performed on the electric power controller 10 side and determines an intended use of electric power stored in the storage battery module 30. In this processing, when the electric power purchasing price Vg is higher than the charging profit price Vc, the control unit 11 controls the power conditioner 13 so as to extract and allocate electric power stored in the storage battery module 30 to personal consumption. In addition, when the electric power selling price Vm is higher than the charging profit price Vc, the control unit 11 controls the power conditioner 13 so as to extract electric power stored in the storage battery module 30 and perform electric power selling owing to discharging. Namely, on the basis of the magnitude relationship between the electric power purchasing price Vg and the electric power selling price Vm, the intended purpose of electric power, which provides a profit for the electric storage equipment holder, is determined.

In addition, when "the charging profit price Vc>the electric power purchasing price Vg" is satisfied, it is desirable to perform charging owing to electric power purchasing. In addition, when "the electric power selling price Vm>the electric power purchasing price Vg" is satisfied, it is desirable to purchase electric power from the electric power market and sell electric power on the electric power market. In this regard, however, it may be considered that such a situation does not occur. Furthermore, when "the electric power selling price Vm the electric power purchasing price Vg" is satisfied, if it is possible for the electric storage equipment holder to purchase electric power from the electric power market, it is desirable to perform electric power purchasing.

2. Advantageous Effect Obtained Owing to Embodiment of Present Application

In such a way as described above, the electric power control and the point issuing in an embodiment of the present application are performed. A current electric power market is limited to large amount transactions, and for example, it is difficult for an electric power amount, stored in such small electric storage equipment 100 to be set up in a standard home, to participate in electricity trading. For example, a trading unit in Japan Electric Power Exchange corresponds to 1000 kw of electric power and 30 minutes of time. Accordingly, a tradable minimal electric power amount is 500 kwh. On the other hand, the electric storage capacity of a household storage battery is about several tens of kwh at a maximum, and the output thereof is about several kw at a maximum. Accordingly, even if the introduction of the electric power generation equipment and the electric storage equipment prevails in standard homes or the like, it is difficult for a standard home to participate in the electricity trading alone. This is a factor in interfering with participating in the electricity trading.

In an embodiment of the present application, it is desirable that the point issuer including the electric power/point management server 200 puts many electric storage equipment holders holding the electric power generation equipment and the electric storage equipment under control. In addition, electricity trading between many pieces of electric storage equipment 100 and the electric power market is performed under the control of the electric power/point management server 200. Accordingly, by collectively performing a plurality of electricity deals, the trading amount of electric power becomes large, and it seems as if a large amount transaction is performed. Accordingly, even if it is difficult for a small amount transaction to participate in the electric power market, it may be possible to perform a large amount transaction on favorable terms by bundling many electric storage equipment holders.

While the electric storage equipment 100 is held by the electric storage equipment holder, electric power control in the electric storage equipment 100 is performed under the control of the electric power/point management server 200. In addition, the electric power/point management server 200 performs electric power selling and purchasing on the basis of the electric power price in the electric power market. Furthermore, a point corresponding to an electric storage amount is issued to the electric storage equipment holder. Accordingly, it may be possible for the electric storage equipment holder to obtain a profit due to the point corresponding to the electric storage amount without paying attention to the electric power price in the electric power market and suffering the price fluctuation risk. Accordingly, since it may be possible to suppress the price fluctuation risk of the electric power price to the electric storage equipment holder, it may be possible to promote the introduction of the electric power generation equipment and the electric storage equipment in the whole society.

In addition, even if, in the past, companies and homes have considered introduction of the electric power generation equipment based on natural energy so as to contribute to the environment, since locational conditions have been bad (the rate of fine weather has been too low in the case of solar photovoltaic power generation, the winds have been too light or too strong in the case of wind-power generation, or the like), the introduction of the natural energy electric power generation equipment has not met an economic condition, and the introduction has been abandoned in some cases. However, even if the introduction of the natural energy electric power generation equipment does not meet an economic condition, instead, it may be possible to reduce an economic risk by introducing the electric power management system according to an embodiment of the present application. Accordingly, it may be possible to promote the introduction of the electric power generation equipment and the electric storage equipment. In addition, the prevalence of the electric power management system according to an embodiment of the present application results in contributing to the load leveling of an electric power plant and reducing an environmental load in the whole society.

In addition, in an embodiment of the present application, the point issuer sells electric power at an adequate price with adequate timing, and hence it may be possible to create a profit. Accordingly, using the system according to an embodiment of the present application, it may be possible for the point issuer to cover a system operation cost.

In addition, using an embodiment of the present application, it may also be possible to provide many benefits to the goods/service provider providing goods/service. Typically, an environmentally-friendly commercial product or service is more expensive than a usual commercial product or service. It may be considered that customers purchasing these expensive commercial products and services are ecologically minded customers.

Since the electric storage equipment holders participating in the system according to an embodiment of the present application are ecologically-minded, if companies intending to sell environment-conscious products/services becomes the goods/service provider, it may be possible to expect more sales growth. In addition, since even a company who does not treat environment-conscious products/services participates in the system according to an embodiment of the present application, which itself contributes to an environmental practice, it may be possible to promote, in the society, the environmental consciousness of the company.

Since an embodiment of the present application obtains such various advantageous effects as described above and hence, it may be possible to provide a profit for each of persons participating in the system according to an embodiment of the present application, it may be possible to promote the introduction of the electric storage equipment.

3. Example of Modification

While, as described above, one embodiment of the present application has been described, the embodiment of the present application is not limited to the above-mentioned embodiment, and various modifications may occur depending on the technical ideas of an embodiment of the present application, and an embodiment of the present application may also have the following configurations.

In an embodiment, an energy control device includes a power conditioner configured to distribute electric power generated by an electric power generator to a supply destination, and a control unit configured to control an operation of the power conditioner.

In the energy control device, the supply destination may be at least one of a battery, an electric power network, and electric power equipment.

The energy control device may further include a communication unit configured to receive an instruction specifying the supply destination, wherein the control unit controls distribution of the electric power by the power conditioner based on the instruction.

In the energy control device, the communication unit may receive the instruction via a network.

In the energy control device, the communication unit may be configured to transmit electric storage amount information indicating an electric storage amount stored in a battery.

In the energy control device, the control unit may switch the operation of the power conditioner between a plurality of modes including i) a charging mode in which the electric power is output to a battery connected to the power conditioner, ii) a discharging mode in which electric power stored in the battery is extracted and output to at least one of an electric power market and electric power equipment, and iii) an autonomous operation mode.

In the energy control device, the control unit may control the operation of the power conditioner based on an electric power price in an electric power market.

In another embodiment, an energy management device includes an electric power management unit configured to generate an instruction specifying a supply destination for electric power generated by an electric power generator, and a communication unit configured to transmit the instruction to an energy control device that at least controls supplying the electric power to the supply destination.

In the energy management device, the supply destination may be at least one of a battery, an electric power network, and electric power equipment.

In the energy management device, the communication unit may transmit the instruction to the energy control device via a network.

In the energy management device, the communication unit may be configured to receive electric storage amount information indicating an electric storage amount stored in a battery connected to the energy control device, and wherein the electric power management unit specifies the supply destination based on the electric storage amount information.

In the energy management device, the communication unit may be configured to receive electric power price information in an electric power market, and wherein the electric power management unit specifies the supply destination based on the electric storage amount information and the electric power price information.

In another embodiment, an energy control method includes receiving an instruction from an electric power management device, the instruction specifying a supply destination of electric power generated by an electric power generator, and distributing the electric power to the supply destination based on the instruction.

In the energy control method, the supply destination may be at least one of a battery, an electric power network, and electric power equipment.

In the energy control method, the instruction may be received via a network.

The energy control method may further include transmitting electric storage amount information indicating an electric storage amount stored in a battery.

The energy control method may further include switching an operation of a power conditioner configured to distribute the electric power to the supply destination between a plurality of modes including i) a charging mode in which the electric power is output to a battery connected to the power conditioner, ii) a discharging mode in which electric power stored in the battery is extracted and output to at least one of an electric power market and electric power equipment, and iii) an autonomous operation mode.

In the energy control method, distributing the electric power may be based on an electric power price in an electric power market.

In another embodiment, an energy management system includes an energy management device and an energy control device. The energy management device includes an electric power management unit configured to generate an instruction specifying a supply destination for electric power generated by an electric power generator, and a communication unit configured to transmit the instruction to an energy control device. The energy control device includes a power conditioner configured to distribute the electric power to the supply destination based on the instruction, and a control unit configured to control an operation of the power conditioner.

In the energy management system, the supply destination may be at least one of a battery, an electric power network, and electric power equipment.

In the energy management system, the energy control device may include a communication unit configured to transmit electric storage amount information to the energy management device indicating an electric storage amount stored in a battery connected to the power conditioner, and wherein the electric power management unit specifies the supply destination based on the electric storage amount information.

In the energy management system, the communication unit included in the energy management device may be configured to receive electric power price information in an electric power market, and wherein the electric power management unit specifies the supply destination based on the electric storage amount information and the electric power price information.

In the energy management system, the control unit may switch the operation of the power conditioner between a plurality of modes including i) a charging mode in which the electric power is output to a battery connected to the power conditioner, ii) a discharging mode in which electric power stored in the battery is extracted and output to at least one of an electric power market and electric power equipment, and iii) an autonomous operation mode.

In the energy management system, the control unit may control the operation of the power conditioner based on an electric power price in an electric power market.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An energy control device, comprising:
 a power conditioner configured to:
  output electric power generated by an electric power generator to a storage battery module;
  measure an amount of the electric power output to the storage battery module; and
  measure a discharge amount of the electric power discharged from the storage battery module; and
 a control unit configured to:
  determine a surplus power based on a difference between a generation amount of the electric power generated by the electric power generator and a charge amount of the electric power required to charge the storage battery module; and
  control the power conditioner to distribute a first amount of the surplus power for personal consumption and a second amount of the surplus power for sale to a supply destination based on a determination that a maximum amount of the electric power required for the personal consumption is less than the surplus power.

2. The energy control device of claim 1, wherein the supply destination is at least one of an electric power network or electric power equipment of an electric power market.

3. The energy control device of claim 1, further comprising:
 a communication unit configured to receive an instruction that indicates the supply destination,
 wherein the control unit is further configured to control the distribution of the electric power by the power conditioner based on the instruction.

4. The energy control device of claim 3, wherein the communication unit is further configured to receive the instruction via a network.

5. The energy control device of claim 3, wherein the communication unit is further configured to transmit electric storage amount information that indicates an electric storage amount stored in the storage battery module.

6. The energy control device of claim 1, wherein the control unit is further configured to switch a mode of the power conditioner between a plurality of modes including:
 a charging mode in which the electric power is output to the storage battery module connected to the power conditioner,
 a discharging mode in which the electric power stored in the storage battery module is extracted and output to at least one of an electric power market or electric power equipment, and
 an autonomous operation mode.

7. The energy control device of claim 1, wherein the control unit is further configured to acquire an electric power selling price and an electric power purchasing price in an electric power market.

8. An energy management device, comprising:
 an electric power management unit configured to generate an instruction that indicates a supply destination for electric power generated by an electric power generator; and
 a communication unit configured to:
  transmit the instruction to an energy control device that controls supply of the electric power to the supply destination, wherein the energy control device is connected to a storage battery module,
  receive electric storage amount information that indicates an electric storage amount stored in the storage battery module,
  wherein the energy control device determines a surplus power based on a difference between a generation amount of the electric power generated by the electric power generator and a charge amount of the electric power to charge the storage battery module; and
  wherein the energy control device distributes a first amount of the surplus power for personal consumption and a second amount of the surplus power for sale to the supply destination based on a determination that a maximum amount of the electric power required for the personal consumption is less than the surplus power.

9. The energy management device of claim 8, wherein the supply destination is at least one of an electric power network or electric power equipment of an electric power market.

10. The energy management device of claim 8, wherein the communication unit is further configured to transmit the instruction to the energy control device via a network.

11. The energy management device of claim 8, wherein the electric power management unit is further configured to specify the supply destination based on the electric storage amount information.

12. The energy management device of claim 11, wherein the communication unit is further configured to acquire an electric power selling price and an electric power purchasing price in an electric power market based on a connection to at least one of a first server of an electric power company or a second server of a broker mediating electricity trading in the electric power market, and
wherein the electric power management unit is further configured to specify the supply destination based on the electric storage amount information and the electric power selling price and the electric power purchasing price.

13. An energy control method, comprising:
receiving an instruction from an electric power management device, the instruction indicating a supply destination of electric power generated by an electric power generator;
receiving electric storage amount information indicating an electric storage amount stored in a storage battery module;
receiving a discharge amount discharged from the storage battery module to an electric power market;
determining a surplus power based on a difference between a generation amount of the electric power generated by the electric power generator and a charge amount of the electric power required to charge the storage battery module; and
distributing a first amount of the surplus power for personal consumption and a second amount of the surplus power for sale to the supply destination based on a determination that a maximum amount of the electric power required for the personal consumption is less than the surplus power.

14. The energy control method of claim 13, wherein the supply destination is at least one of an electric power network or electric power equipment of the electric power market.

15. The energy control method of claim 13, wherein the instruction is received via a network.

16. The energy control device of claim 1, wherein the power conditioner includes an electric power meter configured to measure the electric power passing through the storage battery module.

17. The energy control method of claim 13, further comprising:
switching a mode of a power conditioner configured to distribute the electric power to the supply destination between a plurality of modes including:
a charging mode in which the electric power is output to the storage battery module connected to the power conditioner,
a discharging mode in which the electric power stored in the storage battery module is extracted and output to at least one of the electric power market or an electric power equipment, and
an autonomous operation mode.

18. The energy control method of claim 13, further comprising acquiring an electric power price in the electric power market by connecting to at least one of a first server of an electric power company or a second server of a broker mediating electricity trading in the electric power market.

19. An energy management system, comprising:
an energy management device including:
an electric power management unit configured to generate an instruction that indicates a supply destination for electric power generated by an electric power generator; and
a first communication unit configured to transmit the instruction to an energy control device;
the energy control device including:
a power conditioner configured to:
output the electric power generated by the electric power generator to a storage battery module;
measure an amount of the electric power output to the storage battery module; and
measure discharge amount of electric power discharged from the storage battery module; and
a control unit configured to:
determine a surplus power based on a difference between a generation amount of the electric power generated by the electric power generator and a charge amount of the electric power required to charge the storage battery module; and
control the power conditioner to distribute a first amount of the surplus power for personal consumption and a second amount of the surplus power for sale to the supply destination based on a determination that a maximum amount of the electric power required for the personal consumption is less than the surplus power.

20. The energy management system of claim 19, wherein the supply destination is at least one of an electric power network or electric power equipment of an electric power market.

21. The energy management system of claim 19, wherein the energy control device includes a second communication unit configured to transmit electric storage amount information to the energy management device that indicates an electric storage amount stored in the storage battery module, and
wherein the electric power management unit is further configured to specify the supply destination based on the electric storage amount information.

22. The energy management system of claim 21, wherein the first communication unit is further configured to acquire an electric power selling price and an electric power purchasing price in an electric power market from at least one of a first server of an electric power company or a second server of a broker mediating electricity trading in the electric power market,
wherein the electric power management unit is further configured to specify the supply destination based on the electric storage amount information and the electric power selling price and the electric power purchasing price.

23. The energy management system of claim 19, wherein the control unit is further configured to switch a mode of the power conditioner between a plurality of modes including:
a charging mode in which the electric power is output to the storage battery module connected to the power conditioner,
a discharging mode in which the electric power stored in the storage battery module is extracted and output to at least one of an electric power market or an electric power equipment, and
an autonomous operation mode.

* * * * *